US010782701B2

(12) United States Patent
Cronin et al.

(10) Patent No.: US 10,782,701 B2
(45) Date of Patent: Sep. 22, 2020

(54) AUTONOMOUS VEHICLE AND METHOD OF CONTROLLING THE SAME

(71) Applicant: SAMSUNG ELECTRONICS CO., LTD., Suwon-si (KR)

(72) Inventors: John Cronin, Suwon-si (KR); Dylan Jonathan Wilson, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 350 days.

(21) Appl. No.: 15/744,330

(22) PCT Filed: Jul. 29, 2016

(86) PCT No.: PCT/KR2016/008351
§ 371 (c)(1),
(2) Date: Jan. 12, 2018

(87) PCT Pub. No.: WO2017/018850
PCT Pub. Date: Feb. 2, 2017

(65) Prior Publication Data
US 2018/0203455 A1  Jul. 19, 2018

Related U.S. Application Data

(60) Provisional application No. 62/199,180, filed on Jul. 30, 2015.

(30) Foreign Application Priority Data

May 2, 2016 (KR) ......................... 10-2016-0054125
Jul. 29, 2016 (KR) ......................... 10-2016-0096661

(51) Int. Cl.
G05D 1/02 (2020.01)
G05D 1/00 (2006.01)
(Continued)

(52) U.S. Cl.
CPC ........... *G05D 1/0217* (2013.01); *B60W 50/14* (2013.01); *G01C 21/00* (2013.01);
(Continued)

(58) Field of Classification Search
None
See application file for complete search history.

(56) References Cited

U.S. PATENT DOCUMENTS 5,938,710 A * 8/1999 Lanza ..................... B66F 9/063
180/169
6,459,955 B1 * 10/2002 Bartsch ..................... A47L 9/00
700/245
(Continued)

FOREIGN PATENT DOCUMENTS

EP  2169502 A1  3/2010
JP  2002-236993 A  8/2002
(Continued)

OTHER PUBLICATIONS

Communication dated Jul. 22, 2019, from the European Patent Office in counterpart European Application No. 16830883.1.
(Continued)

Primary Examiner — Richard M Camby
(74) Attorney, Agent, or Firm — Sughrue Mion, PLLC

(57) ABSTRACT

Provided is a method including monitoring an event occurring on a path along which an autonomous vehicle is currently travelling by using information obtained while the autonomous vehicle is travelling and determining whether to travel along a detour path when the event is detected. In particular, the method includes determining whether to travel along the detour path according to a cost incurred when the autonomous vehicle travels along the detour path.

17 Claims, 32 Drawing Sheets

(51) Int. Cl.
*G01C 21/34* (2006.01)
*G01C 21/00* (2006.01)
*B60W 50/14* (2020.01)

(52) U.S. Cl.
CPC ..... *G01C 21/3415* (2013.01); *G01C 21/3461* (2013.01); *G01C 21/3492* (2013.01); *G05D 1/0061* (2013.01); *G05D 1/0246* (2013.01); *G05D 1/0276* (2013.01); *B60W 2050/146* (2013.01); *B60W 2530/209* (2020.02); *B60W 2540/26* (2013.01); *B60W 2552/00* (2020.02); *B60W 2555/20* (2020.02); *B60W 2555/60* (2020.02); *B60W 2556/45* (2020.02); *B60W 2556/50* (2020.02); *G05D 2201/0213* (2013.01)

(56) References Cited

U.S. PATENT DOCUMENTS

| | | | |
|---|---|---|---|
| 6,560,529 B1 | 5/2003 | Janssen | |
| 7,211,980 B1* | 5/2007 | Bruemmer | G05D 1/0246 318/567 |
| 7,840,352 B2 | 11/2010 | Strelow et al. | |
| 8,031,114 B2 | 10/2011 | Kellermeier et al. | |
| 8,121,749 B1 | 2/2012 | Agrawal et al. | |
| 8,346,480 B2 | 1/2013 | Trepagnier et al. | |
| 8,391,615 B2 | 3/2013 | Wu et al. | |
| 8,442,713 B2 | 5/2013 | Kim et al. | |
| 8,633,979 B2 | 1/2014 | Szczerba et al. | |
| 8,700,251 B1* | 4/2014 | Zhu | G01C 21/34 701/25 |
| 8,812,024 B2 | 8/2014 | Obermeyer et al. | |
| 8,838,321 B1 | 9/2014 | Ferguson | |
| 8,874,301 B1 | 10/2014 | Rao et al. | |
| 8,880,240 B2 | 11/2014 | Grimm et al. | |
| 9,063,543 B2 | 6/2015 | An et al. | |
| 9,315,151 B2* | 4/2016 | Taylor | B60C 23/0408 |
| 9,911,030 B1 | 3/2018 | Zhu et al. | |
| 2004/0068366 A1 | 4/2004 | Nisiyama | |
| 2014/0236414 A1 | 8/2014 | Droz et al. | |
| 2014/0297116 A1 | 10/2014 | Anderson et al. | |
| 2015/0097863 A1 | 4/2015 | Alaniz et al. | |
| 2015/0149018 A1 | 5/2015 | Attard et al. | |
| 2017/0219364 A1 | 8/2017 | Lathrop et al. | |
| 2018/0203451 A1 | 7/2018 | Cronin et al. | |
| 2018/0211414 A1 | 7/2018 | Cronin et al. | |
| 2018/0266834 A1 | 9/2018 | Cronin et al. | |

FOREIGN PATENT DOCUMENTS

| | | |
|---|---|---|
| JP | 2008-9913 A | 1/2008 |
| JP | 2011-240816 A | 12/2011 |
| JP | 2014-219723 A | 11/2014 |
| KR | 10-0946723 B1 | 3/2010 |
| KR | 10-1063302 B1 | 9/2011 |
| KR | 10-2013-0132790 A | 12/2013 |
| KR | 10-2014-0085139 A | 7/2014 |
| KR | 10-2014-0106939 A | 9/2014 |
| KR | 10-2017-0015213 A | 2/2017 |
| KR | 10-2017-0015214 A | 2/2017 |
| KR | 10-2017-0015240 A | 2/2017 |
| WO | 2014139821 A1 | 9/2014 |

OTHER PUBLICATIONS

International Search Report dated Oct. 31, 2016 in counterpart International Patent Application No. PCT/KR2016/008351 (5 pages, in Korean with English translation).

Notification and Opinion for International Search Report dated Oct. 31, 2016 in counterpart International Patent Application No. PCT/KR2016/008351 (10 pages, in Korean).

* cited by examiner

FIG. 8

| IMAGE FILE | IMAGE FILE | LABEL |
|---|---|---|
| 810 | Blind001.jpg ...... Blind00n.jpg | A blind sign on the road has been detected. Please prepare manual driving. If there is no manual driving acknowledgement input, the vehicle is to stop after 10 seconds. | BLIND ZONE |
| 820 | Construction001.jpg ...... Construction00n.jpg | A construction sign on the road has been detected. Please prepare manual driving. Please travel at a speed of 40 km/h or less during manual driving. | CONSTRUCTION ZONE |
| 830 | Railroad001.jpg ...... Railroad00n.jpg | A railroad sign on the road has been detected. Please prepare manual driving if a train approaches. | RAILROAD ZONE |
| 840 | School_zone001.jpg ...... School_zone00n.jpg | You've entered a school zone. The vehicle is to change to a manual driving mode after 10 seconds. | SCHOOL ZONE |
| 850 | Toll_booth001.jpg ...... Toll_booth00n.jpg | You've entered a tollgate zone. The vehicle is to change to a manual driving mode after 10 seconds. | TOLLGATE ZONE |
| 860 | Deaf001.jpg ...... Deaf00n.jpg | A deaf zone sign on the road has been detected. Please prepare manual driving. When there is no manual driving acknowledgement input, the vehicle is to stop after 10 seconds. | DEAF ZONE |
| 870 | Dead_End001.jpg ...... Dead_End00n.jpg | A dead end zone sign has been detected. The vehicle may change to a manual driving mode. | DEAD END ZONE |
| 880 | Detour001.jpg ...... Detour00n.jpg | A detour sign has been detected. Please prepare manual driving. When there is no manual driving acknowledgement input, the vehicle is to stop after 10 seconds. | DETOUR ZONE |

FIG. 13

| | GPS POSITION | ALERT COMMAND | LABEL | SERVER |
|---|---|---|---|---|
| 1310 | XX1, YY1 | NOTIFY THAT VEHICLE ENTERS SPEED LIMIT ZONE | SPEED LIMIT ZONE | CITY SERVER |
| 1320 | XX2, YY2 | CHANGE DRIVING MODE OF AUTONOMOUS VEHICLE TO MANUAL DRIVING MODE WITHIN 10 SECONDS | LIQUOR-FREE ZONE | CITY SERVER |
| 1330 | XX3, YY3 | PROVIDE NOTICE REQUESTING FOR MANUAL DRIVING MODE. WHEN MANUAL DRIVING MODE ACKNOWLEDGEMENT RESPONSE IS RECEIVED, TRAVEL IN MANUAL DRIVING MODE. WHEN MANUAL DRIVING MODE ACKNOWLEDGEMENT RESPONSE IS NOT RECEIVED, CONTINUOUSLY AUTONOMOUSLY TRAVEL AT SPEED THAT IS BY 20 KM/H LESS THAN SPEED LIMIT | BAD WEATHER ZONE | WEATHER SERVER |
| 1340 | XX4, YY4 | PROVIDE NOTICE REQUESTING FOR MANUAL DRIVING MODE. WHEN MANUAL DRIVING MODE ACKNOWLEDGEMENT RESPONSE IS RECEIVED WITHIN 10 SECONDS, TRAVEL IN MANUAL DRIVING MODE. WHEN MANUAL DRIVING MODE ACKNOWLEDGEMENT RESPONSE IS NOT RECEIVED WITHIN 10 SECONDS, STOP TRAVELLING | CONSTRUCTION ZONE | CONSTRUCTION SERVER |
| 1350 | XX5, YY5 | PROVIDE NOTICE REQUESTING FOR MANUAL DRIVING MODE. WHEN MANUAL DRIVING MODE ACKNOWLEDGEMENT RESPONSE IS RECEIVED, TRAVEL IN MANUAL DRIVING MODE. WHEN MANUAL DRIVING MODE ACKNOWLEDGEMENT RESPONSE IS NOT RECEIVED WITHIN 10 SECONDS, CONTINUOUSLY AUTONOMOUSLY TRAVEL AT SPEED THAT IS BY 30 KM/H LESS THAN SPEED LIMIT | BLIND ZONE | OTHER SERVER (CITY SERVER) |
| 1360 | XX6, YY6 | PROVIDE NOTICE INDICATING THAT VEHICLE IS TO CHANGE TO MANUAL DRIVING MODE. CHANGE TO MANUAL DRIVING MODE 10 SECONDS AFTER NOTICE IS PROVIDED. | SCHOOL ZONE | OTHER SERVER (CITY SERVER) |
| 1370 | XX7, YY7 | PROVIDE NOTICE INDICATING THAT VEHICLE IS TO CHANGE TO MANUAL DRIVING MODE. CHANGE TO MANUAL DRIVING MODE 10 SECONDS AFTER NOTICE IS PROVIDED. | TOLLGATE ZONE | OTHER SERVER |
| 1380 | XX8, YY8 | PROVIDE NOTICE INDICATING THAT VEHICLE IS TO CHANGE TO MANUAL DRIVING MODE. CHANGE TO MANUAL DRIVING MODE 10 SECONDS AFTER NOTICE IS PROVIDED. | OTHER SERVER | OTHER SERVER |

* Traffic Sign Detection software by Mobileye

AUTONOMOUS VEHICLE AND METHOD OF CONTROLLING THE SAME

CROSS REFERENCE TO RELATED APPLICATIONS

This application is a U.S. National Stage Application of International Application No. PCT/KR2016/008351, filed on Jul. 29, 2016, which claims the benefit under 35 USC 119(a) and 365(b) of U.S. Provisional Patent Application No. 62/199,180, filed on Jul. 30, 2015; Korean Patent Application No. 10-2016-0054125, filed on May 2, 2016, in the Korean Intellectual Property Office; and Korean Patent Application No. 10-2016-0096661, filed on Jul. 29, 2016, in the Korean Intellectual Property Office.

TECHNICAL FIELD

The present invention relates to an autonomous vehicle and a method of controlling the same.

BACKGROUND ART

The interest in autonomous vehicles has recently increased. In particular, in order to reduce traffic congestion according to increasing demand for vehicles and to safely avoid obstacles such as pedestrians or other vehicles, various additional functions related to autonomous driving have been continuously developed. For example, many algorithms related to lane keeping systems have been developed. Also, as Internet connectivity has expanded, the amount of data generated from a variety of devices or vehicles has rapidly increased and various services using the data have been provided. Accordingly, various studies have been conducted on methods of enabling users of autonomous vehicles to experience familiar autonomous driving by using a variety of data.

DETAILED DESCRIPTION OF THE INVENTION

Technical Problem

A method of controlling an autonomous vehicle by monitoring a path and an autonomous vehicle are disclosed.

Technical Solution

A method of controlling an autonomous vehicle to be more useful for a user by monitoring a path and an autonomous vehicle are provided.

Advantageous Effects of the Invention

A method of controlling an autonomous vehicle that autonomously travels along a path and an autonomous vehicle may be provided.

DESCRIPTION OF THE DRAWINGS

FIG. 8 is a view illustrating an example where the autonomous vehicle matches an obtained image to a pre-stored image according to an embodiment.

FIG. 13 is a view for explaining a case where the autonomous vehicle approaches an event zone according to an embodiment.

BEST MODE

Figure 1:
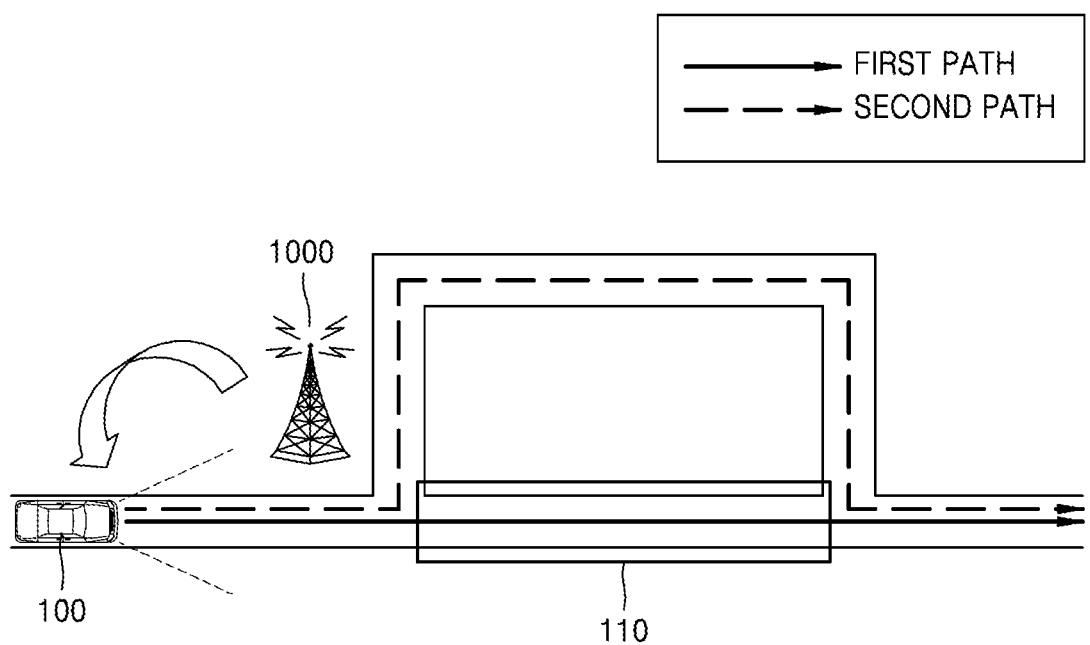
FIG. 1 is a view illustrating an example where an autonomous vehicle obtains a plurality of travel paths according to an embodiment.

According to an aspect of the present disclosure, a method of controlling an autonomous vehicle includes: monitoring an event occurring on a first path while the autonomous vehicle travels along the first path in an autonomous driving mode; obtaining a second path when the event is detected; and determining whether to travel along the second path in the autonomous driving mode by comparing a first cost expected when the autonomous vehicle travels along the first path with a second cost expected when the autonomous vehicle travels along the second path.

Also, the determining whether to travel along the second path in the autonomous driving mode may include, when a difference between the first cost and the second cost is equal to or less than a threshold value, determining that the autonomous vehicle is to travel along the second path in the autonomous driving mode.

Also, the determining whether to travel along the second path in the autonomous driving mode may include, when a difference between the first cost and the second cost is greater than a threshold value, determining that the autonomous vehicle is to travel, in a manual driving mode, in an event area in which the event is detected.

Also, the determining whether to travel along the second path in the autonomous driving mode may include: when a difference between the first cost and the second costs is greater than a threshold value, providing a notice indicating that the autonomous driving mode is to be stopped; and when a response to the notice is received, determining that the autonomous vehicle is to travel, in a manual driving mode, in an event area in which the event is detected.

Also, when the response to the notice is not received, the method may further include controlling the autonomous vehicle that is travelling to stop.

Also, the determining whether to travel along the second path in the autonomous driving mode may further include, when the response to the notice is not received, determining that the autonomous vehicle is to travel along the second path in the autonomous driving mode.

Also, when a difference between the first cost and the second cost is greater than a threshold value, the method may further include controlling the autonomous vehicle that is travelling to stop.

Also, the event may indicate that an area in which the autonomous vehicle is determined to travel in a manual driving mode is on the first path.

Also, the monitoring of the event may include monitoring the event by using a road sign on the first path obtained by a camera included in the autonomous vehicle.

Also, the monitoring of the event may include monitoring the event by using travel environment information about the first path received from an external device.

Also, the obtaining of the second path may include obtaining the second path that is one of a plurality of detour paths according to priorities of the plurality of detour paths that replace the first path.

Also, the determining whether to travel along the second path in the autonomous driving mode may include, when a difference between the first cost including a travel time or a travel distance expected when the autonomous vehicle travels along the first path and the second cost including a travel time or a travel distance expected when the autonomous vehicle travels along the second path is equal to or less than a threshold value, determining that the autonomous vehicle is to travel along the second path in the autonomous driving mode.

Also, the determining whether to travel along the second path in the autonomous driving mode may include, when a difference between the first cost and the second cost is equal to or less than a threshold value and a travel distance expected when the autonomous vehicle travels along the second path is less than a drivable distance, determining that the autonomous vehicle is to travel along the second path in the autonomous driving mode.

Also, the method may further include obtaining schedule information of a rider of the autonomous vehicle, wherein the determining whether to travel along the second path in the autonomous driving mode includes, when a difference between the first cost and the second cost is equal to or less than a threshold value and an arrival time expected when the autonomous vehicle travels along the second path is before a time of the schedule information, determining that the autonomous vehicle is to travel along the second path in the autonomous driving mode.

Also, the method may further include obtaining rider state information indicating whether a rider of the autonomous vehicle is able to drive the autonomous vehicle, wherein the determining whether to travel along the second path in the autonomous driving mode includes determining whether to travel along the second path in the autonomous driving mode by further considering the rider state information.

Also, according to a second aspect of the present disclosure, an autonomous vehicle includes: an interface configured to monitor an event occurring on a first path while the autonomous vehicle travels along the first path in an autonomous driving mode; and a processor configured to obtain a second path when the event is detected, and determine whether to travel along the second path in the autonomous driving mode by comparing a first cost expected when the autonomous vehicle travels along the first path with a second cost expected when the autonomous vehicle travels along the second path.

Also, according to a third aspect of the present disclosure, a computer-readable recording medium has embodied thereon a program for executing the method of the first aspect.

MODE OF THE INVENTION

Hereinafter, the present invention will be described more fully with reference to the accompanying drawings, in which exemplary embodiments of the invention are shown. The invention may, however, be embodied in many different forms and should not be construed as being limited to the embodiments set forth herein. It is to be understood that other embodiments may be derived by one of ordinary skill in the art from the detailed description and the embodiments without departing from the scope of the invention.

Throughout the present application, when a part "includes" or "comprises", it is not to be understood that the part includes all of elements or steps, and it is to be understood that the part may not include some of the elements or the steps or may further include additional elements or steps. Also, the term such as " . . . unit", "module", or the like used in the present application indicates a unit, which processes at least one function or motion, and the unit may be implemented by hardware or software, or by a combination of hardware and software.

It will be understood that although the terms "first", "second", etc. may be used herein to describe various elements, these elements should not be limited by these terms. These elements are only used to distinguish one element from another.

The present invention will now be described more fully with reference to the accompanying drawings, in which embodiments of the invention are shown.

Embodiments of the present invention relate to an autonomous vehicle and a method of controlling the same, and detailed explanations of related functions or configurations that are well known to one of ordinary skill in the art are omitted.

Also, the term 'autonomous vehicle' used in the specification may include a vehicle that may autonomously travel through additional settings or additional processes later. Accordingly, the autonomous vehicle may include not only a vehicle that may autonomously travel now but also a vehicle that may not autonomously travel yet. For example, the autonomous vehicle in the specification may include a general vehicle that is manually driven.

FIG. 1 is a view illustrating an example where an autonomous vehicle 100 obtains a plurality of travel paths according to an embodiment.

The autonomous vehicle 100 may refer to a vehicle that may autonomously travel without a rider's involvement.

Referring to FIG. 1, the autonomous vehicle 100 may determine one of a plurality of paths from an origin to a destination as a travel path and may autonomously travel along the determined path. For example, the autonomous vehicle 100 may determine a first path from among a plurality of paths as a travel path and may autonomously travel along the first path.

The autonomous vehicle 100 may monitor an event occurring on a path along which the autonomous vehicle 100 is travelling. For example, the autonomous vehicle 100 may monitor an event occurring on the first path along which the autonomous vehicle 100 is travelling.

The autonomous vehicle 100 may monitor an event occurring on a path along which the autonomous vehicle 100 is travelling by using a sensor included in the autonomous vehicle 100. For example, the autonomous vehicle 100 may monitor an event by obtaining information of a road sign on a path along which the autonomous vehicle 100 is travelling by using a camera included in the autonomous vehicle 100.

The autonomous vehicle 100 may monitor an event occurring on a path along which the autonomous vehicle 100 is travelling by using an external device 1000. For example, the autonomous vehicle 100 may monitor an event on a path along which the autonomous vehicle 100 is travelling by using information received from a server. Alternatively, the autonomous vehicle 100 may monitor an event on a path along which the autonomous vehicle 100 is travelling by using information received from a mobile device owned by the rider of the autonomous vehicle 100.

An event monitored by the autonomous vehicle 100 that is travelling along a preset path in an autonomous driving mode may indicate that there is an area in which the autonomous vehicle 100 may not travel in an autonomous driving mode on the preset path along which the autonomous vehicle 100 is currently driving. When there is an event area 110 on a path along which the autonomous vehicle 100 is currently driving, an event may be detected. The event area 110 may include an area in which the autonomous vehicle 100 is requested to travel in a manual driving mode.

In embodiments, an event may correspond to an area that is determined from among a plurality of areas by the autonomous vehicle 100 as an area in which it is difficult for the autonomous vehicle 100 to travel in an autonomous driving mode. Accordingly, the event area 110 may be an area in which the autonomous vehicle 100 is requested to travel in a manual driving mode.

When the event area 110 on the first path along which the autonomous vehicle 100 is travelling is detected, the autonomous vehicle 100 may obtain a second path via which the autonomous vehicle 100 detours around the event area 110. The autonomous vehicle 100 may determine one of a plurality of paths via which the autonomous vehicle 100 detours around the event area 110 as the second path according to a preset standard. For example, the autonomous vehicle 100 may determine a path having a shortest distance to a destination from among five paths via which the autonomous vehicle 100 detours around the event area 110 as the second path.

The autonomous vehicle 100 may travel along the first path or the second path in an autonomous driving mode or a manual driving mode.

A case where an event is detected while the autonomous vehicle 110 travels along the first path in an autonomous driving mode will be explained. For example, when an event occurring in the event area 110 is determined as an insignificant event according to the preset standard, the autonomous vehicle 100 that is travelling along the first path may continuously travel in an autonomous driving mode.

In contrast, when an event occurring in the event area 110 is determined as a significant event according to the preset standard and a response indicating that manual driving is possible is received from the rider of the autonomous vehicle 100, the autonomous vehicle 100 that is travelling along the first path may change a driving mode to a manual driving mode.

When an event occurring in the event area 110 is determined as a significant event according to the preset standard and a difference between a travel time expected when the autonomous vehicle 100 travels along the first path and a travel time expected when the autonomous vehicle 100 travels along the second path is within a predetermined period of time (e.g., 10 minutes), the autonomous vehicle 100 may travel along the second path in an autonomous driving mode.

In embodiments, the first path may refer to an initial travel path set when the autonomous vehicle 100 departs, and the second path may refer to a detour path via which the autonomous vehicle 100 detours around the event area 110.

In more detail, the first path may refer to a path along which the autonomous vehicle 100 is currently travelling, and the second path may refer to a path that replaces the first path. For example, the first path may be a travel path indicating an area from a current location of the autonomous vehicle 100 to a destination on a path (e.g., an initially set path) along which the autonomous vehicle 100 is currently travelling, and the second path may be a travel path indicating an area from a current location of the autonomous vehicle 100 to a destination on a path (e.g., a detour path) that replaces the first path. In this case, the destinations of the first path and the second path may be the same.

A case where the autonomous vehicle 100 travels along the first path or the second path in an autonomous driving mode or a manual driving mode will be explained below in detail with reference to FIG. 4.

Figure 2:
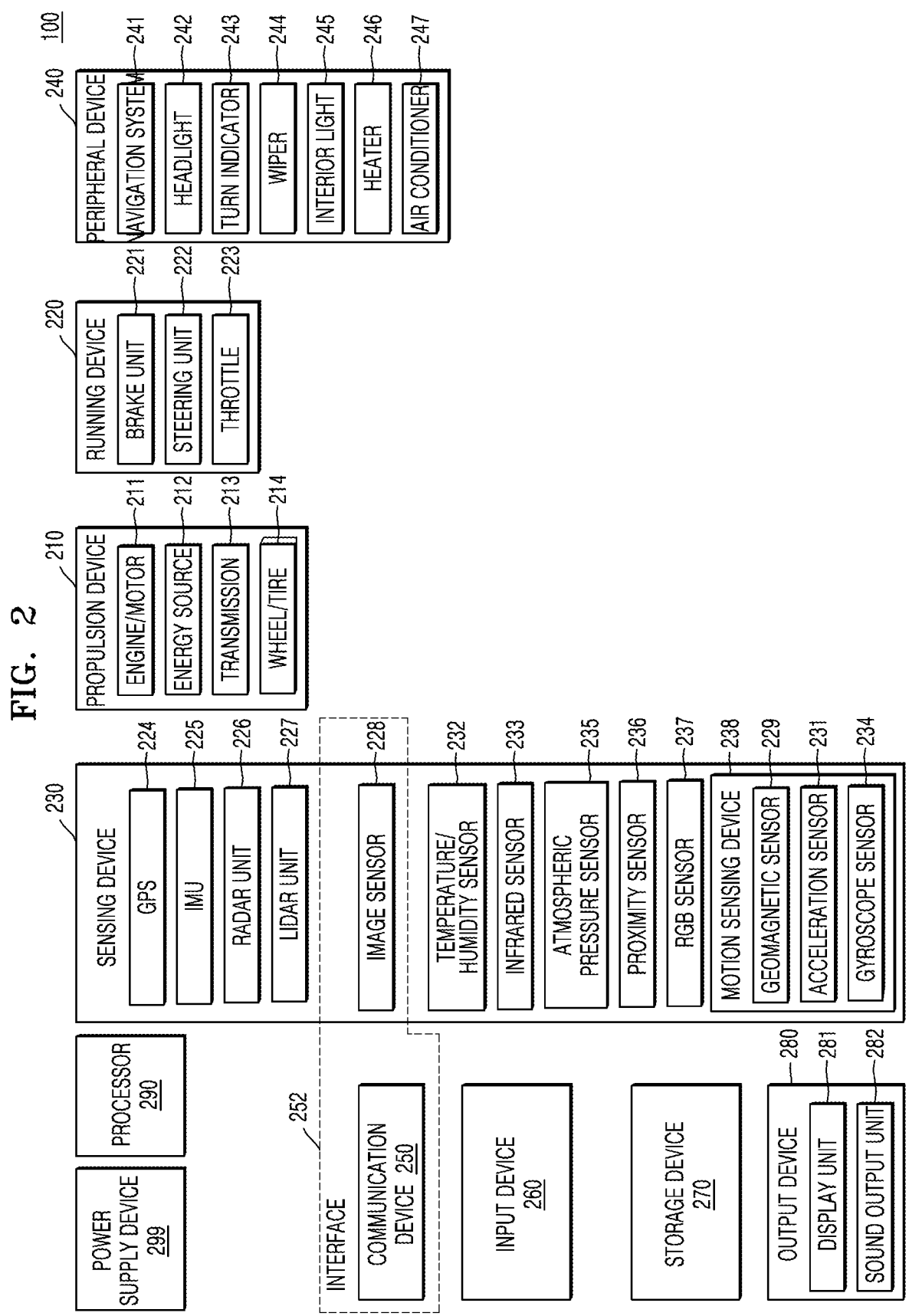
FIG. 2 is a block diagram illustrating detailed hardware elements of the autonomous vehicle according to an embodiment.

FIG. 2 is a block diagram illustrating detailed hardware elements of the autonomous vehicle 100 according to an embodiment.

The autonomous vehicle 100 may include a propulsion device 210, a power supply device 299, a communication device 250, an input device 260, an output device 280, a storage device 270, a running device 220, a sensing device 230, a peripheral device 240, and a processor 290. However, it will be understood by one of ordinary skill in the art that the autonomous vehicle 100 may further include general-purse elements other than the elements illustrated in FIG. 2 or may not include some of the elements illustrated in FIG. 2.

The propulsion device 210 may include an engine/motor 211, an energy source 212, a transmission 213, and a wheel/tire 214.

The engine/motor 211 may be an arbitrary combination of an internal-combustion engine, an electric motor, a steam engine, and a Stirling engine. For example, when the autonomous vehicle 100 is a gas-electric hybrid car, the engine/motor 211 may be a gasoline engine or an electric motor.

The energy source 212 may be an energy supply source that entirely or partially supplies power to the engine/motor 211. That is, the engine/motor 211 may be configured to convert the energy source 212 into mechanical energy. The energy source 212 may be at least one of gasoline, diesel, propane, other compressed gas-based fuels, ethanol, a solar panel, a battery, and other electric power sources. Alternatively, the energy source 212 may be at least one of a fuel tank, a battery, a capacitor, and a flywheel. The energy source 212 may supply energy to a system and a device of the autonomous vehicle 100.

The transmission 213 may be configured to transmit mechanical power from the engine/motor 211 to the wheel/tire 214. For example, the transmission 213 may include at least one of a gearbox, a clutch, a differential gear, and a driving shaft. When the transmission 213 includes driving shafts, the driving shafts may include one or more axles configured to be coupled to the wheel/tire 214.

One or more wheel/tires 214 may be included in the autonomous vehicle 100. For example, the autonomous vehicle 100 may include two, three, four, five, or more wheel/tires 214. Examples of the autonomous vehicle 100 may include a two-wheeled vehicle, a three-wheeled vehicle, and a four-wheeled vehicle. The wheel/tire 214 may include at least one wheel fixedly attached to the transmission 213 and at least one tire coupled to a rim of the wheel that may contact a driving surface.

The running device 220 may include a brake unit 221, a steering unit 222, and a throttle 223.

The steering unit 222 may be a combination of mechanisms configured to adjust a direction of the autonomous vehicle 100.

The throttle 223 may be a combination of mechanisms configured to control a speed of the autonomous vehicle 100 by controlling an operating speed of the engine/motor 211. Also, the throttle 223 may adjust the amount of a mixed gas of fuel air introduced to the engine/motor 211 by adjusting a degree to which the throttle 223 is open and may control power and a propulsive force by adjusting a degree to which the throttle 223 is open.

The brake unit 221 may be a combination of mechanisms configured to decelerate the autonomous vehicle 100. For example, the brake unit 221 may use friction in order to reduce a speed of the wheel/tire 214.

The sensing device 230 may include a plurality of sensors configured to detect information about an environment in which the autonomous vehicle 10 is located, and may include one or more actuators configured to correct positions and/or orientations of the sensors. For example, the sensing device 230 may include a global positioning system (GPS) 224, an inertial measurement unit (IMU) 225, a RADAR unit 226, a LIDAR unit 227, and an image sensor 228. Also, the sensing device 230 may include at least one of, but not limited to, a temperature/humidity sensor 232, an infrared sensor 233, an atmospheric pressure sensor 235, a proximity sensor 236, and an RGB sensor (or an illuminance sensor) 237. Functions of the sensors may be intuitively understood by one of ordinary skills from their names, and thus a detailed explanation thereof is omitted.

Also, the sensing device 230 may include a motion sensing device 238 that may sense a motion of the autonomous vehicle 100. The motion sensing device 238 may include a geomagnetic sensor 229, an acceleration sensor 231, and a gyroscope sensor 234.

The GPS 224 may be a sensor configured to estimate a geographical location of the autonomous vehicle 100. That is, the GPS 224 may include a transmitter and a receiver configured to estimate a location of the autonomous vehicle 100 on the earth.

The IMU 225 may be a combination of sensors configured to detect changes in a location and an orientation of the autonomous vehicle 100 based on inertial acceleration. For example, the combination of the sensors may include accelerometers and gyroscopes.

The RADAR unit 226 may be a sensor configured to detect objects in the environment in which the autonomous vehicle 100 is located by using a wireless signal. Also, the RADAR unit 226 may be configured to detect speeds and/or directions of the objects.

The LIDAR unit 227 may be a sensor configured to detect the objects in the environment in which the autonomous vehicle 100 is located by using a laser. In more detail, the LIDAR unit 227 may include a laser source and/or a laser scanner configured to emit a laser beam and a detector configured to detect a reflected laser beam. The LIDAR unit 227 may be configured to operate in a coherent detection mode using heterodyne detection or an incoherent detection mode.

The peripheral device 240 may include a navigation system 241, a headlight 242, a turn indicator 243, a wiper 244, an interior light 245, a heater 246, and an air conditioner 247.

The navigation system 241 may be a system configured to determine a navigation route of the autonomous vehicle 100. The navigation system 241 may be configured to dynamically update a navigation route while the autonomous vehicle 100 is travelling. For example, the navigation system 241 may use data from the GPS 224 and maps in order to determine a navigation route of the autonomous vehicle 100.

The storage device 270 may include a magnetic disk drive, an optical disk drive, or a flash memory. Alternatively, the storage device 270 may be a portable universal serial bus (USB) data storage device. The storage device 270 may store system software.

An interface 252 may include the communication device 250 and the image sensor 228. The interface 252 may obtain information related to a path along which the autonomous vehicle 100 is travelling by using the communication device 250 and/or the image sensor 228. For example, the interface 252 may monitor an event on a path along which the autonomous vehicle 100 is travelling or an event in an area within a predetermined distance from a current location of the autonomous vehicle 100.

The image sensor 228 may be a still camera or a video camera configured to record three-dimensional (3D) images of the inside of the autonomous vehicle 100. For example, the image sensor 228 may include a plurality of cameras, and the plurality of cameras may be arranged at a plurality of positions inside and outside the autonomous vehicle 100. Also, the image sensor 228 may monitor an event occurring on a path along which the autonomous vehicle 100 is travelling by obtaining information of a road sign on the path and visual information about a road condition.

The communication device 250 may include at least one communication hardware (e.g., an antenna) for wirelessly communicating with another device. For example, the communication device 250 may be used to wirelessly communicate with a cellular network or another wireless protocol and a system through WiFi or Bluetooth. The communication device 250 controlled by the processor 290 may transmit/receive a wireless signal. For example, the processor 290 may execute a program included in the storage device 270 in order for the communication device 250 to transmit/receive a wireless signal to/from a cellular network. Also, the communication device 250 may receive information related to a path along which the autonomous vehicle 100 is travelling from a server and may monitor an event on the path by using the received information.

The input device 260 refers to a unit that inputs data for controlling the autonomous vehicle 100. Examples of the input device 260 may include, but not limited to, a keypad, a dome switch, a touch pad (e.g., a contact capacitive touch pad, a press resistive touch pad, an infrared sensing touch pad, a surface ultrasound conductive touch pad, an integration tension measurement touch pad, or a piezoelectric touch pad), a jog wheel, and a jog switch. Also, the input device 260 may include a microphone, and the microphone may be configured to receive an audio (e.g., a voice command) from the rider of the autonomous vehicle 100.

The output device 280 may output an audio signal or a video signal, and may include a display unit 281 and a sound output unit 282.

The display unit 281 may include at least one of a liquid crystal display, a thin film transistor-liquid crystal display, an organic light-emitting diode, a flexible display, a 3D display, and an electrophoretic display. The output device 280 may include two or more display units 281 according to a type of the output device 280.

The sound output unit 282 outputs audio data received from the communication device 250 or stored in the storage device 270. Also, the sound output unit 282 may include a speaker or a buzzer.

Each of the input device 260 and the output device 280 may include a network interface, and may be a touchscreen.

The processor 290 typically controls an overall operation of the autonomous vehicle 100. For example, the processor 290 may generally control the propulsion device 210, the running device 220, the sensing device 230, the peripheral device 240, the communication device 250, the input device 260, the storage device 270, the output device 280, and the power supply device 299 by executing programs stored in the storage device 270.

The power supply device 299 may be configured to supply power to some or all of elements of the autonomous vehicle 100. For example, the power supply device 299 may include a rechargeable lithium ion or lead-acid battery.

The autonomous vehicle 100 may include a rider monitoring unit (not shown). The rider monitoring unit may obtain state information of the rider. For example, the rider monitoring unit may sense a bio-signal of the rider, may analyze the bio-signal, and may determine whether the rider is able to manually drive the autonomous vehicle 100, for example, whether the rider has a physical disorder or is sleeping. To this end, the rider monitoring unit may include a bio-signal sensor. Alternatively, the rider monitoring unit may determine whether the rider is able to manually drive the autonomous vehicle 100 by receiving a bio-signal of the rider sensed by a device worn by the rider from the device or receiving a result obtained after the device analyzes a bio-signal. In addition, the rider monitoring unit may determine whether the rider is dozing by monitoring the head or the eyes of the rider. To this end, the rider monitoring unit may include a camera. In addition, the rider monitoring unit may further include various sensors or other elements for obtaining state information of the rider.

Figure 3:
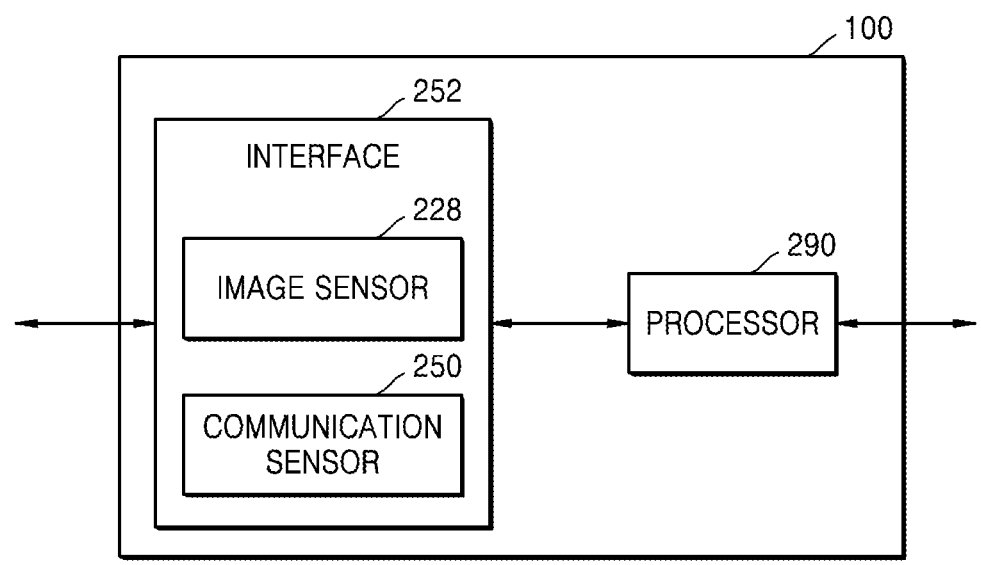
FIG. 3 is a block diagram illustrating a configuration of the autonomous vehicle according to an embodiment.

FIG. 3 is a block diagram illustrating a configuration of the autonomous vehicle 100 according to an embodiment.

As shown in FIG. 3, the autonomous vehicle 100 may include the interface 252 and the processor 290. Only elements related to an embodiment of the autonomous vehicle 100 are illustrated in FIG. 3. Accordingly, it will be understood by one of ordinary skill in the art that general-purpose elements other than the elements illustrated in FIG. 3 may be further included in the autonomous vehicle 100.

The elements will now be sequentially explained.

The interface 252 may include the image sensor 228 and the communication device 250 as described with reference to FIG. 2.

The interface 252 may monitor an event occurring on a path along which the autonomous 100 is travelling by using the image sensor 228 and/or the communication device 250 while the autonomous vehicle 100 travels in an autonomous driving mode. For example, the interface 252 may monitor a road sign on an initial travel path by using the image sensor 228. Also, the interface 252 may monitor a travel environment on the initial travel path by using the communication device 250.

A camera that is an example of the image sensor 228 may obtain an image frame such as a still image or a moving image outside the autonomous vehicle 100. An image captured by the image sensor 228 may be processed by the processor 290 or an additional image processor (not shown).

The communication device 250 may perform communication between the autonomous vehicle 100 and another device. For example, the communication device 250 may communicate with the external device 1000 such as a server or a mobile terminal.

The processor 290 may control the autonomous vehicle 100. The processor 290 may control the interface 252 to monitor an event, may determine one of a plurality of paths as a travel path according to a detected event, and may control the autonomous vehicle 100 to autonomously travel along the determined path. Also, the processor 290 may obtain a detour path via which the autonomous vehicle 100 detours around an event area on an initial travel path based on the detected event, and may determine whether to travel along the detour path in an autonomous driving mode by comparing a first cost expected when the autonomous vehicle 100 travels along the initial travel path with a second cost expected when the autonomous vehicle 100 travels along the detour path.

A method of controlling the autonomous vehicle 100 and the autonomous vehicle 100 according to various embodiments will now be explained in detail.

Figure 4:
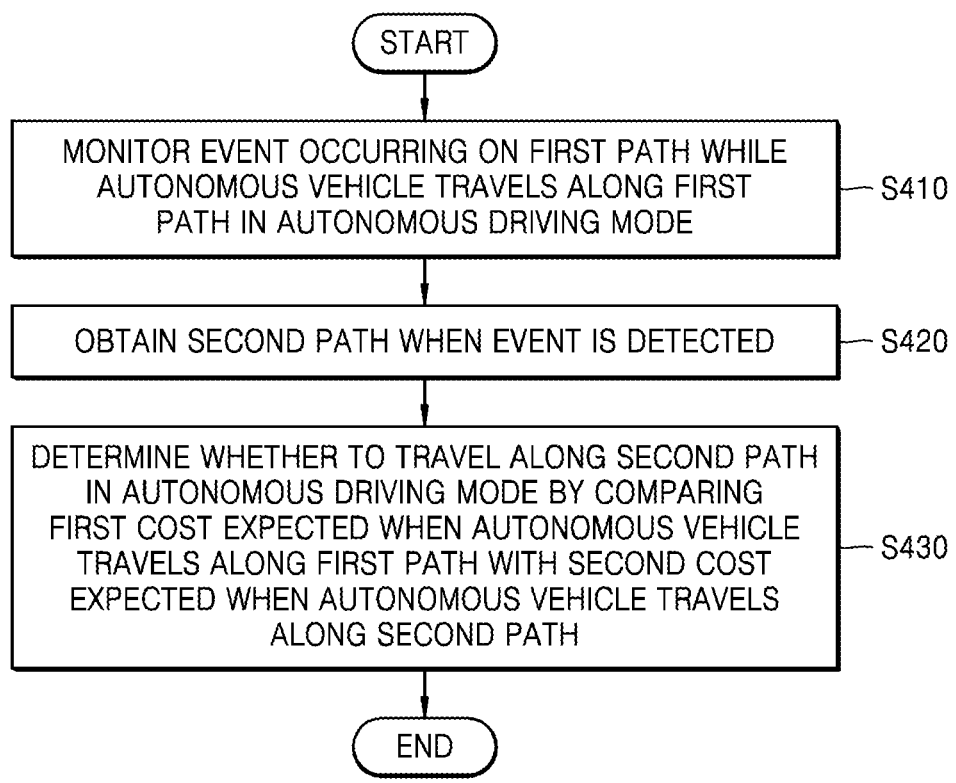
FIG. 4 is a flowchart of a method of controlling the autonomous vehicle by using information obtained through monitoring according to an embodiment.

FIG. 4 is a flowchart of a method of controlling the autonomous vehicle 100 by using information obtained through monitoring according to an embodiment.

In operation S410, the autonomous vehicle 100 monitors an event occurring on a first path while the autonomous vehicle 100 travels along the first path in an autonomous driving mode.

The autonomous vehicle 100 may perform monitoring while the autonomous vehicle 100 travels along the first path that is a current travel path. Accordingly, the autonomous vehicle 100 may monitor an event occurring on the first path by using information obtained after the first path is set as a travel path. For example, the autonomous vehicle 100 may obtain construction zone information on the first path that is not received yet when the first path is set as a travel path from a server after the first path is set as a travel path. Alternatively, the autonomous vehicle 100 may obtain school zone information on the first path that is not obtained yet when the first path is set as a travel path by recognizing a road sign by using a sensor included in the autonomous vehicle 100 after the first path is set as a travel path.

In more detail, the autonomous vehicle 100 may perform monitoring by using the external device 1000.

For example, the autonomous vehicle 100 may perform monitoring on the first path by using a server. For example, the autonomous vehicle 100 may perform monitoring on the first path by using a server used for monitoring while the autonomous vehicle 100 travels along the first path that is determined by using information received from the server that stores map information. The autonomous vehicle 100 may receive from the server information about a falling rock warning area on the first path through monitoring using the server.

Instead of directly receiving monitoring information from the server, the autonomous vehicle 100 may perform monitoring on the first path by using a mobile device owned by a rider of the autonomous vehicle 100. The mobile device of the autonomous vehicle 100 may obtain information about a school zone on the first path by communicating with the server while the autonomous vehicle 100 travels along the first path, and then the autonomous vehicle 100 may obtain the information about the school zone on the first path from the mobile device.

The autonomous vehicle 100 may perform monitoring by using a device included in the autonomous vehicle 100. For example, the autonomous vehicle 100 may perform monitoring by using the image sensor 228. A case where the autonomous vehicle 100 performs monitoring by using an image obtained during travelling of the autonomous vehicle 100 by using a camera that is an example of the image sensor 228 will now be explained. The obtained image may be an image of a road sign. The autonomous vehicle 100 may obtain an image of a road sign on a travel path by using the camera, may determine an image corresponding to the obtained image from among a plurality of images stored in the storage device 270 of the autonomous vehicle 100, and may carry out a command corresponding to the determined image. The camera may be located at any of various positions. For example, the camera may be included in a black box or may be provided on a car window. Alternatively, the autonomous vehicle 100 may obtain a road sign image indicating that construction is underway ahead the autonomous vehicle 100 by using the camera, may determine an image corresponding to the obtained road sign image as a file construction002.jpg that is one of a plurality of images stored in the storage device 270, and may carry out a command corresponding to the determined file construction002.jpg. The command corresponding to the file construction002.jpg may include a command to search for a detour path via which the autonomous vehicle 100 detours around a construction area. A detailed method of controlling the autonomous vehicle 100 according to a monitoring result will be explained with reference to operations S420 and S430.

In operation S420, when an event is detected, the autonomous vehicle 100 obtains a second path.

The second path may be a detour path via which the autonomous vehicle 100 detours around an event area in which the event monitored by the autonomous vehicle 100 occurs.

When the event is detected and the detected event is a preset event, the autonomous vehicle 100 may obtain the second path via which the autonomous vehicle 100 detours around the event area. For example, when a zone close to school for the deaf on a path along which the autonomous vehicle 100 is currently travelling is detected and the zone close to school for the deaf is a preset event, the autonomous vehicle 100 may obtain one of a plurality of detour paths via which the autonomous vehicle 100 detours around the zone close to school for the deaf as the second path. A detailed method of determining the second path from among a plurality of detour paths will be explained below with reference to FIG. 15.

When an event is detected and the detected event is not a preset event, the autonomous vehicle 100 may not obtain the second path via which the autonomous vehicle 100 detours around an event area. For example, when a fine dust zone on a path along which the autonomous vehicle 100 is currently travelling is detected and the fine dust zone is not a preset event, the autonomous vehicle 100 may not obtain the second path via which the autonomous vehicle 100 detours around the fine dust zone and may travel along the path along which the autonomous vehicle 100 is currently travelling.

In operation S430, the autonomous vehicle 100 determines a travel path by comparing a first cost expected when the autonomous vehicle 100 travels along the first path with a second cost expected when the autonomous vehicle 100 travels along the second path.

The term 'cost' may include tangible or intangible loss or value incurred as the autonomous vehicle 100 travels. For example, the cost may include a time taken for the autonomous vehicle 100 to travel, the amount of fuel consumed as the autonomous vehicle 100 travels, and a travel distance of the autonomous vehicle 100.

The first cost may refer to a cost expected when the autonomous vehicle 100 travels along the first path. The first cost may include a travel time, a travel distance, and fuel consumption expected when the autonomous vehicle 100 travels in an event area on the first path in a manual driving mode and travels in areas other than the event area in an autonomous driving mode. However, the meaning of the first cost is not limited thereto. According to another embodiment, the first cost may be calculated based on a case where the autonomous vehicle 100 travels along the first path only in an autonomous driving mode or travels only an event area in a manual driving mode.

The second cost may refer to a cost expected when the autonomous vehicle 100 travels along the second path. The second cost may include a travel time, a travel distance, and fuel consumption expected when the autonomous vehicle 100 travels along the second path in an autonomous driving mode. However, the meaning of the second cost is not limited thereto. According to another embodiment, the second cost may be calculated based on a detour area from a branch point at which the first path and the second path separate from each other to a junction point at which the first path and the second path meet each other. In this case, the second cost may include a travel time, a travel distance, and fuel consumption expected as the autonomous vehicle 100 travels in the detour area from the branch point to the junction point in an autonomous driving mode.

The autonomous vehicle 100 may obtain information about the first cost. The autonomous vehicle 100 may obtain information about a travel time, a travel distance, and fuel consumption expected when the autonomous vehicle 100 travels in an event area on the first path in a manual driving mode and travels in areas other than the event area in an autonomous driving mode. Alternatively, according to another embodiment, the autonomous vehicle 100 may obtain information about a travel time, a travel distance, and fuel consumption expected when the autonomous vehicle 100 travels along the first path from a current location to a destination only in an autonomous driving mode.

The autonomous vehicle 100 may obtain information about the second cost. For example, the autonomous vehicle 100 may include information about a travel time, a travel distance, and fuel consumption expected when the autonomous vehicle 100 travels along the second path obtained in operation S420 from the current location to the destination.

The autonomous vehicle 100 may determine whether to travel along the first path or the second path by comparing the first cost with the second cost. For example, the autonomous vehicle 100 may travel along the second path when a difference between the first cost and the second cost is equal to or less than a threshold value, and may travel along the first path when the difference between the first cost and the second cost is greater than the threshold value. When the autonomous vehicle 100 travels along the first path, the autonomous vehicle 100 may travel in an event area in which an event is detected in operation S410 in a manual driving mode.

A detailed method in which the autonomous vehicle 100 determines a travel path by comparing the first cost with the second cost will now be explained.

A case where a difference between the first cost and the second cost is equal to or less, or less than a threshold value will be explained.

When the first cost and the second cost are compared with each other, a difference between the first cost and the second cost may be equal to or less than, or less than a threshold value. For example, when a travel time expected when the autonomous vehicle 100 travels in an event area on the first path in a manual driving mode and travels in areas other than the event area in an autonomous driving mode is 30 minutes, a travel time expected when the autonomous vehicle 100 travels along the second path in an autonomous driving mode is 50 minutes, and a threshold value is 30 minutes, a difference between the first cost and the second cost may be equal to or less than, or less than the threshold value.

Alternatively, when the first cost is a travel distance of 3 km, the second cost is a travel distance of 2.5 km, and a threshold value is 1 km, a difference between the first cost and the second cost may be equal to or less than, or less than the threshold value.

The threshold value may be set when the autonomous vehicle 100 was shipped, or may be set based on a user input.

The threshold value may be determined as a specific value of a cost, or may be determined as a percentage of a cost. For example, the threshold value may be determined as 30 minutes, 10 km, or fuel of 10 liters. Alternatively, the threshold value may be determined as 30% of the second cost or 20% of the first cost.

When the first cost and the second cost are compared with each other and a difference between the first cost and the second cost is equal to or less than, or less than the threshold value, the autonomous vehicle 100 may travel along the second path in an autonomous driving mode.

For example, when the first cost is a travel time of 1 hour, the second cost is a travel time of 1 hour and 20 minutes, and the threshold value is 30 minutes, the autonomous vehicle 100 may compare the first cost with the second cost and may travel along the second path in an autonomous driving mode because a difference between the first cost and the second cost is equal to or less than, or less than the threshold value.

Alternatively, when the first cost is a travel distance of 8 km, the second cost is a travel distance of 10 km, and the threshold value is determined as 30% of the second cost, the autonomous vehicle 100 may travel along the second path in an autonomous driving mode because a difference between the first cost and the second cost is equal to or less than, or less than the threshold value.

Unlike in a case where the autonomous vehicle 100 travels along the second path when a difference between the first cost and the second cost is equal to or greater than, or greater than the threshold value, loss incurred when the autonomous vehicle 100 travels along the second path when a difference between the first cost and the second cost is equal to or less than, or less than the threshold value is equal to or less than, or less than a preset level. Accordingly, a case where the autonomous vehicle 100 travels along the second path when a difference between the first cost and the second cost is equal to or less than, or less than the threshold value may be economical in cost or distance.

A case where a difference between the first cost and the second cost is equal to or greater than, or greater than the threshold value will be explained.

When the first cost and the second cost are compared with each other, a difference between the first cost and the second cost may be equal to or greater than, or greater than the threshold value. For example, when fuel consumption expected when the autonomous vehicle 100 travels in an event area on the first path in a manual driving mode and travels in areas other than the event area in an autonomous driving mode is 10 liters, a travel time expected when the autonomous vehicle 100 travels along the second path in an autonomous driving mode is 12 liters, and the threshold value is 1 liter, a difference between the first cost and the second cost may be equal to or greater than, or greater than the threshold value.

When the first cost and the second cost are compared with each other and a difference between the first cost and the second cost is equal to or greater than, or greater than the threshold value, the autonomous vehicle 100 may provide a notice indicating that there is an event area on the first path to the rider of the autonomous vehicle 100. For example, the autonomous vehicle 100 may provide a notice indicating that the autonomous vehicle 100 has to travel in the event area on the first path in a manual driving mode to the rider.

When a user response to the notice provided to the rider is received, the autonomous vehicle 100 may travel in the event area of the first path in a manual driving mode and may travel in areas other than the event area in an autonomous driving mode.

When a user response to the notice provided to the rider is not received, the autonomous vehicle 100 may operate according to a preset method. For example, when a user response to the notice provided to the rider is not received, the autonomous vehicle 100 may travel along the second path in an autonomous driving mode. Alternatively, when a user response to the notice provided to the rider is not received, the autonomous vehicle 100 may stop according to a preset method. Alternatively, when a user response to the notice provided to the rider is not received, the autonomous vehicle 100 may travel along the first path in an autonomous driving mode.

When the first cost and the second cost are compared with each other and a difference between the first cost and the second cost is equal to or greater than, or greater than the threshold value, the autonomous vehicle 100 may determine the first path as a travel path.

For example, when the first cost is a travel distance of 15 km, the second cost is a travel distance of 20 km, and the threshold value is 3 km, the autonomous vehicle 100 may compare the first cost with the second cost and may determine the first path as a travel path because a difference between the first cost and the second cost is greater than 3 km.

Alternatively, when the first cost is fuel consumption of 10 liters, the second cost is fuel consumption of 14 liters, and the threshold value is determined as 30% of the first cost, the autonomous vehicle 100 may determine the first path as a travel path because a difference between the first cost and the second cost is greater than the threshold value.

Alternatively, when a cost expected when the autonomous vehicle 100 travels along the first path in an autonomous driving mode is greater than a cost expected when the autonomous vehicle 100 travels along the second path in an autonomous driving mode, the autonomous vehicle 100 may travel along the first path in an autonomous driving mode.

When the autonomous vehicle 100 determines the first path as a travel path, the autonomous vehicle 100 may travel in an event area of the first path in a manual driving mode and may travel in areas other than the event area in an autonomous driving mode.

A case where the first cost and the second cost are compared with each other and the first cost is greater than the second cost will be explained.

When a travel time, a travel distance, or fuel consumption expected when the autonomous vehicle 100 travels in an event area of the first path in a manual driving mode and travels in areas other than the event area in an autonomous driving mode is greater than a travel time, a travel distance, or fuel consumption expected when the autonomous vehicle 100 travels along the second path in an autonomous driving mode, the autonomous vehicle 100 may determine the second path as a travel path. When the second path is determined as a travel path, the autonomous vehicle 100 may travel along the second path in an autonomous driving mode.

The autonomous vehicle 100 may travel along the first path in an autonomous driving mode or a manual driving mode. For example, when the autonomous vehicle 100 travels along the first path, the autonomous vehicle 100 may travel in an event area of the first path in a manual driving mode and may travel in areas other than the event area in an autonomous driving mode. Alternatively, when the autonomous vehicle 100 travels along the first path, the autonomous vehicle 100 may travel along the entire first path in an autonomous driving mode.

For example, when the first cost is a cost expected when the autonomous vehicle 100 travels along the first path in an autonomous driving mode, the autonomous vehicle 100 may compare the first cost with the second cost that is a cost expected when the autonomous vehicle 100 travels along the second path in an autonomous driving mode and may travel along the first path in an autonomous driving mode when the first cost is less than or equal to the second cost.

Figure 5:
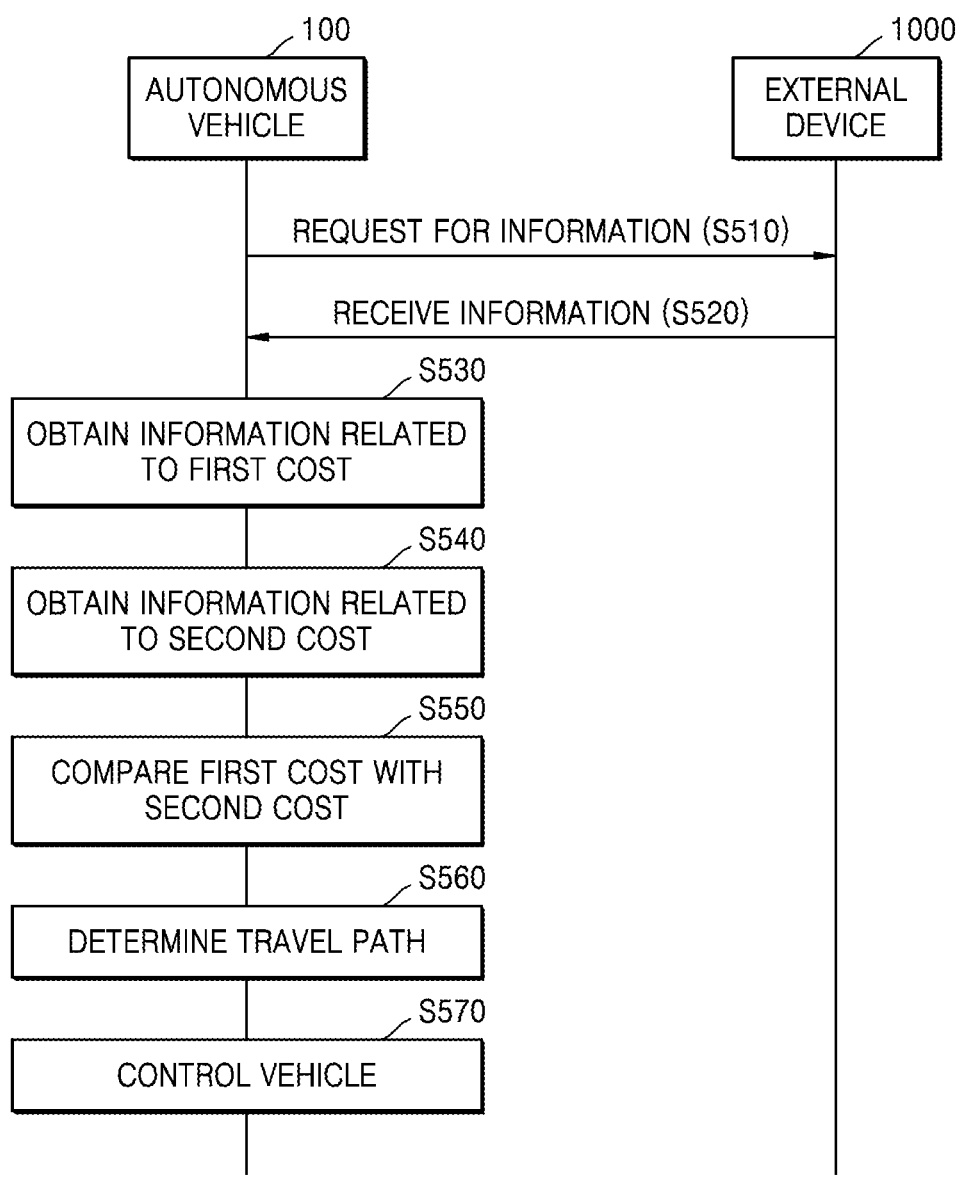
FIG. 5 is a flowchart of a method of controlling the autonomous vehicle by using information received from an external device according to an embodiment.

FIG. 5 is a flowchart of a method of controlling the autonomous vehicle 100 by using information received from the external device 1000 according to an embodiment.

In operation S510, the autonomous vehicle 100 may request the external device 1000 for information.

The autonomous vehicle 100 may request the external device 100 for event information that is information about an event occurring on a path along which the autonomous vehicle 100 is currently travelling. In this case, the autonomous vehicle 100 may request for information about an event occurring on the first path after the first path is set as a travel path. The event information may include travel environment information such as weather information, road condition information, surrounding region information, and news information.

Furthermore, the autonomous vehicle 100 may additionally request the external device 1000 for rider information that is information related to a rider of the autonomous vehicle 100. For example, the rider information may be schedule information of the rider.

The travel environment information may include information indicating a condition related to travelling of the autonomous vehicle 100. For example, the travel environment information may include weather information, road condition information, surrounding region information, and news information.

The weather information may include information about a temperature, a humidity, snow, rain, fine dust, and air pollution. Also, the weather information may include information about weather around a current location of the autonomous vehicle 100, information about weather around a destination of the autonomous vehicle 100, and information about weather around a movement path of the autonomous vehicle 100. The weather information may include information about past or future weather as well as current weather.

For example, the weather information may include information indicating that snow fell around the movement path of the autonomous vehicle 100 two hours ago. Alternatively, the weather information may include information indicating that a heavy rain warning has currently been issued around the destination.

The road condition information may include information indicating a road condition of a surrounding region such as the current location, the destination, or the movement path of the autonomous vehicle 100.

For example, the road condition information may include road surface state information, traffic condition information, traffic accident information, road construction information, traffic control information, and warning area information (e.g., an icy road warning area, a sharp curve warning area, a pedestrian warning area, or a school area) about a road around the current location, the destination, or the movement path of the autonomous vehicle 100.

The surrounding region information may include information indicating a condition of the surrounding region such as the current location, the destination, or the movement path of the autonomous vehicle 100.

For example, the surrounding region information may include surrounding facility information (e.g., a sewage disposal plant around the destination), surrounding landscape information, surrounding building information (e.g., information about a school for the deaf), and surrounding performance information (e.g., information about a famous singer's concert).

The news information may include news information related to the weather information, the road condition information, and the surrounding region information.

For example, the news information may include news information related to travelling of the autonomous vehicle 100 such as news saying that a famous singer's concert expected to be held in the surrounding region has been abruptly cancelled, news saying that protesters have abruptly gathered and thus the road has been congested, news saying that some roads have been damaged and thus have been blocked, news saying that a parade is being held in some areas of the road, or news saying that fire broke out at a specific building.

In operation S520, the autonomous vehicle 100 may receive the information from the external device 1000. The autonomous vehicle 100 may receive the information from the external device 1000 without requesting the external device 1000.

For example, the autonomous vehicle 100 may receive the event information, the rider information (e.g., the schedule information), or the travel environment information (e.g., the weather information, the road condition information, the surrounding region information, or the news information) described in operation S510 from the external device 1000.

In operation S530, the autonomous vehicle 100 obtains information related to a first cost. The autonomous vehicle 100 may obtain information about the first cost expected when the autonomous vehicle 100 travels along a first path. For example, the autonomous vehicle 100 may obtain information about a travel time, a travel distance, or fuel consumption expected when the autonomous vehicle 100 travels in an event area of the first path in a manual driving mode and travels in areas other than the event area in an autonomous driving mode. Alternatively, the autonomous vehicle 100 may obtain information about a travel time, a travel distance, or fuel consumption expected when the autonomous vehicle 100 travels along the first path in an autonomous driving mode.

In operation S540, the autonomous vehicle 100 obtains information related to a second cost. The autonomous vehicle 100 may obtain information about the second cost that is a cost when the autonomous vehicle 100 travels along a second path. For example, the autonomous vehicle 100 may include information about a travel time, a travel distance, or fuel consumption expected when the autonomous vehicle 100 travels along the second path.

The autonomous vehicle 100 compares the first cost with the second cost in operation S550 and determines a travel path in operation S560.

For a method of determining a travel path by comparing the first cost with the second cost, the description of operation S430 may be referred to.

In operation S570, the autonomous vehicle 100 may travel along the travel path determined in operation S560. The processor 290 may control the autonomous vehicle 100 to travel along the travel path and/or in a driving mode determined in operation S560.

For example, the processor 290 may control the autonomous vehicle 100 to travel along the first path in an autonomous driving mode. Alternatively, the processor 290 may control the autonomous vehicle 100 to travel along the second path in an autonomous driving mode. Alternatively, the processor 290 may control the autonomous vehicle 100 to travel in an event area of the first path in a manual driving mode and to travel in areas other than the event area in an autonomous driving mode.

Also, the autonomous vehicle 100 may determine whether to change to a manual driving mode during travelling, and may be controlled according to a determination result. A method of controlling the autonomous vehicle 100 when a manual driving switch area is found will now be explained.

The autonomous vehicle 100 may travel along a path including autonomous drivable areas in an autonomous driving mode.

A plurality of areas constituting a plurality of paths from an origin to the destination may include autonomous drivable areas or manual driving switch areas. For example, the first path may include only a plurality of autonomous drivable areas. Alternatively, the second path may include a plurality of autonomous drivable areas and a manual driving switch area.

Alternatively, a third path may include a plurality of autonomous drivable areas, and one of the plurality of autonomous drivable areas included in the third path may change to a manual driving switch area while the autonomous vehicle 100 travels.

When a manual driving switch area is found on a path, the autonomous vehicle 100 may determine whether to travel in the manual driving switch area according to driving mode setting information.

The manual driving switch area may include an area in which the autonomous vehicle 100 autonomously or manually travels according to the driving mode setting information. For example, the manual driving switch area may include the event area 110 of FIG. 1.

When the manual driving switch area is found while the autonomous vehicle 100 travels in an autonomous driving mode, the autonomous vehicle 100 may determine whether to continuously travel in the manual driving switch area or to change a travel path to another path according to the driving mode setting information. A method of determining a travel path according to event or driving node setting information will be explained below in detail with reference to FIG. 9.

The driving mode setting information may include information indicating how to set a driving mode in each case. For example, the driving mode setting information may include information indicating whether to maintain autonomous driving according to a type of an event occurring in the event area 110. Alternatively, the driving mode setting information may include information indicating whether to maintain a current path according to a type of an event occurring in the event area 110.

The autonomous vehicle 100 may be controlled according to a result obtained after determining whether to travel in the manual driving switch area.

For example, when it is determined that the autonomous vehicle 100 is to travel in the manual driving switch area according to the driving mode setting information, the autonomous vehicle 100 may change a driving mode to a manual driving mode and may travel in the manual driving switch area. Alternatively, when it is determined that the autonomous vehicle 100 is not to travel in the manual driving switch area according to the driving mode setting information, the autonomous vehicle 100 may maintain an autonomous driving mode and may travel along a new travel path via which the autonomous vehicle 100 detours around the manual driving switch area. Alternatively, when it is determined that the autonomous vehicle 100 is to travel in the manual driving switch area in an autonomous driving mode according to the driving mode setting information, the autonomous vehicle 100 may maintain an autonomous driving mode and may travel in the manual driving switch area.

Figure 6:
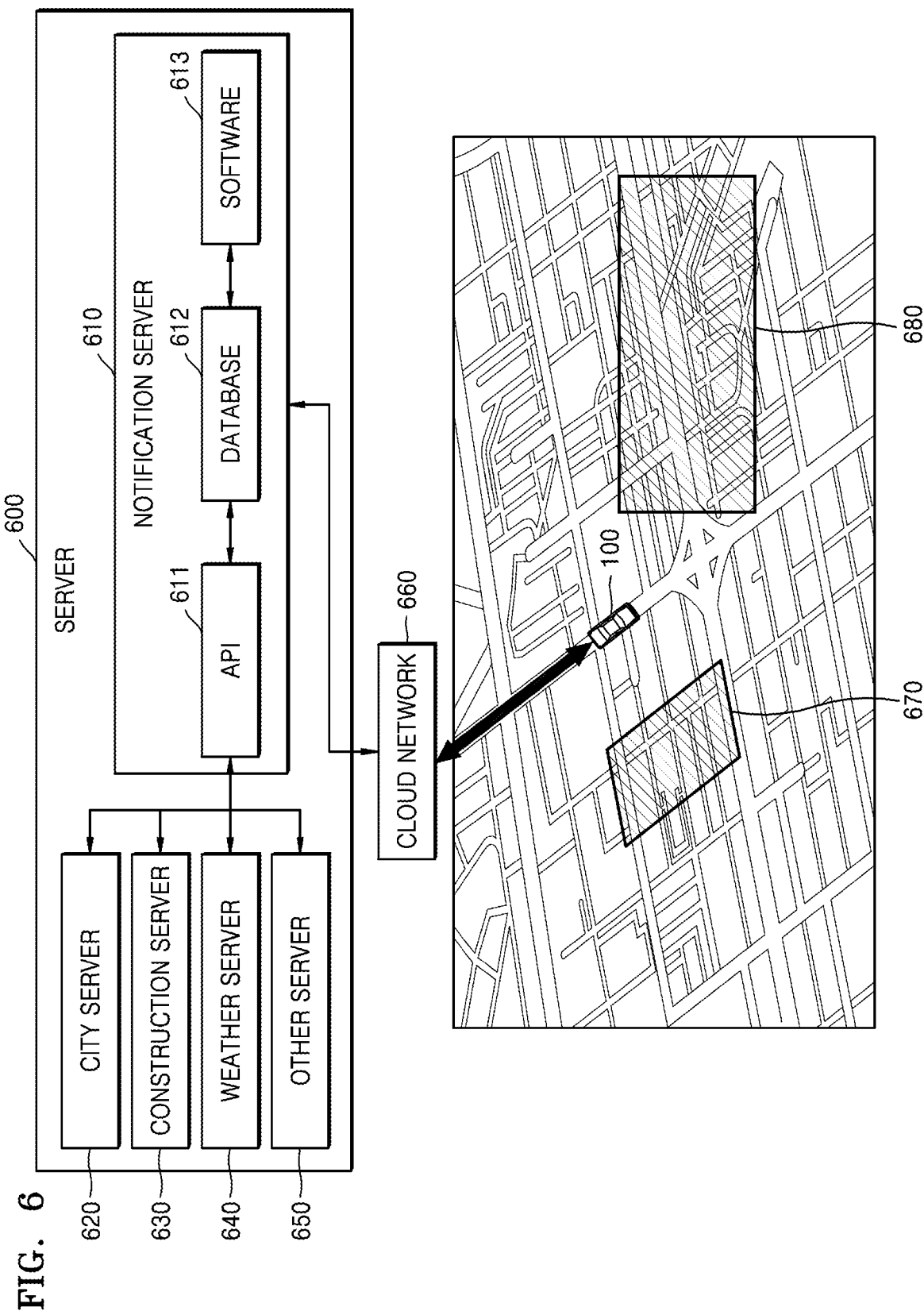
FIG. 6 is a view illustrating an example where the autonomous vehicle is controlled by using a server according to an embodiment.

FIG. 6 is a view illustrating an example where the autonomous vehicle 100 is controlled by using a server 600 according to an embodiment.

The autonomous vehicle 100 may communicate with the server 600 through a cloud network 660. For example, the autonomous vehicle 100 may communicate with a notification server 610 through the cloud network 660.

The server 600 may include one or more servers. For example, the server 600 may include the notification server 610, a city server 620, a construction server 630, a weather server 640, and other sever 650.

The notification server 610 may transmit/receive notification information to/from the autonomous vehicle 100. For example, the notification server 610 may transmit/receive event information to/from the autonomous vehicle 100 through the cloud network 660. The event information may include information about an event zone.

The city server 620 refers to a server that deals with information related to cities, the construction server 630 refers to a server that deals with information related to construction, and the weather server 640 refers to a server that deals with information related to weather.

The city server 620, the construction server 630, the weather server 640, and the other server 650 may communicate with the notification server 610. For example, the city server 620 may transmit traffic control information to the notification server 610, the construction sever 630 may transmit information about a construction area to the notification server 610, and the weather server 640 may transmit information about a heavy rain region or a strong wind region to the notification server 610. Alternatively, the construction server 630 may transmit current construction information of a region around the autonomous vehicle 100 to an application program interface (API) 611 of the notification server 610.

The notification server 610 may include the API 611, a database 612, and software 613. A variety of event information may be uploaded to the API 611. Also, the information uploaded to the API 611 may be stored in the database 612. The software 613 may transmit control information of the autonomous vehicle 100 according to the information stored in the database 612 through the cloud network 660 or directly to the autonomous vehicle 100.

An event zone may be located around the autonomous vehicle 100. A school for the deaf zone 670 and a construction zone 680 may be located around the autonomous vehicle 100. The autonomous vehicle 100 may receive information about the school for the deaf zone 670 and the construction zone 680 from the notification server 610.

The autonomous vehicle 100 may be controlled according to information received from the notification server 610. The autonomous vehicle 100 may receive information about positions of the school for the deaf zone 670 and the construction zone 680 from the notification server 610 and may travel in a region close to the school for the deaf zone 670 or the construction zone 680 in an autonomous driving mode at a low speed. Alternatively, the autonomous vehicle 100 may travel along a second path via which the autonomous vehicle 100 detours around the region close to the school for the deaf zone 670 or the construction zone 680 in an autonomous driving mode.

Information received by the autonomous vehicle 100 from the server 600 may be determined based on information transmitted by the autonomous vehicle 100 to the server 600. In more detail, the autonomous vehicle 100 may transmit information obtained by a sensor included in the autonomous vehicle 100 to the notification server 610, and the server 600 may transmit autonomous vehicle control information determined according to the information obtained from the autonomous vehicle 100 to the autonomous vehicle 100. For example, a case where the autonomous vehicle 100 transmits image information to the notification server 610 will be explained. The image sensor 228 may obtain an image of a road sign on a path along which the autonomous vehicle 100 is travelling and may transmit the obtained image of the road sign to the notification server 610. The notification server 610 may transmit information corresponding to the image of the road sign received from the autonomous vehicle 100 to the autonomous vehicle 100. For example, the notification server 610 may transmit information indicating meaning of the image of the road sign to the autonomous vehicle, or may transmit autonomous vehicle control information according to analysis of the image of the road sign to the autonomous vehicle 100.

For example, when the autonomous vehicle 100 transmits an image of a road sign indicating that construction is underway obtained by a camera included in the autonomous vehicle 100 on a path along which the autonomous vehicle 100 is currently travelling to the notification server 610, the notification server 610 may transmit to the autonomous vehicle 100 information indicating that the image received from the autonomous vehicle 100 indicates that construction is underway or control information instructing to slowly travel in a construction area.

Figure 7:
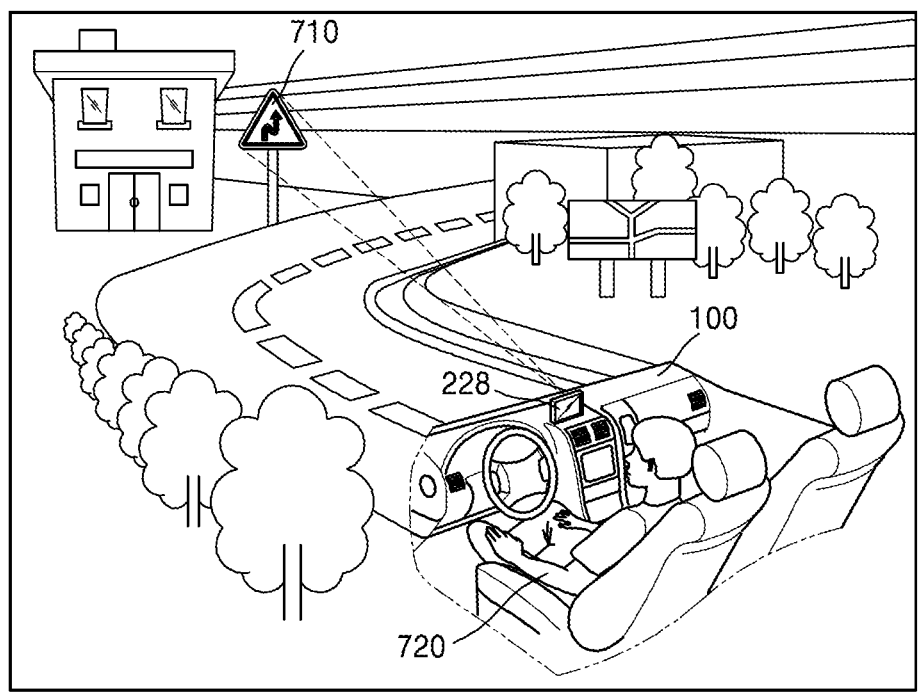
FIG. 7 is a view illustrating an example where the autonomous vehicle obtains event information on a path along which the autonomous vehicle is travelling according to an embodiment.

FIG. 7 is a view illustrating an example where the autonomous vehicle 100 obtains event information on a path along which the autonomous vehicle 100 is travelling according to an embodiment.

Event information may include information about a road sign 710.

The autonomous vehicle 100 may obtain the information about the road sign 710 on a path along which the autonomous vehicle 100 is currently travelling. For example, the autonomous vehicle 100 may obtain an image of the road sign 710 on the path by using the image sensor 228 provided in the autonomous vehicle 100.

The image sensor 228 may include a camera, and may be attached to an inner surface or an outer surface of the autonomous vehicle 100. For example, the image sensor 228 may include a vehicle black box provided in the autonomous vehicle 100 or one or more cameras provided at various positions of the autonomous vehicle 100.

The image sensor 228 may obtain an image in any of directions including front, back, left, and right directions of the autonomous vehicle 100. For example, the image sensor 228 may obtain an image of the road sign 710 that is located ahead the autonomous vehicle 100 that is autonomously travelling without additional manipulation of a rider 720.

FIG. 8 is a view illustrating an example where the autonomous vehicle 100 matches an obtained image to a pre-stored image according to an embodiment.

The autonomous vehicle 100 may store a plurality of images indicating a plurality of zones. For example, a plurality of images respectively corresponding to a blind zone 810, a construction zone 820, a railroad zone 830, a school zone 840, a tollgate zone 850, a deaf zone 860, a dead end zone 870, and a detour zone 880 may be stored in the autonomous vehicle 100.

The autonomous vehicle 100 may obtain event information on a path along which the autonomous vehicle 100 is currently travelling by determining an image, from among the plurality of stored images, matched to an image obtained by the image sensor 228. For example, when the image obtained by the image sensor 228 is matched to one from among a plurality of images included in the construction zone 820, the autonomous vehicle 100 may obtain event information indicating that a construction zone exists on the path along which the autonomous vehicle 100 is currently travelling.

The autonomous vehicle 100 may determine an image matched to the image of the road sign obtained by the image sensor 228, from among the plurality of pre-stored images.

For example, the autonomous vehicle 100 may determine the obtained image of the road sign as a railroad sign according to a type of the image of the road sign obtained by the image sensor 228. When it is determined that the obtained image of the road sign is a railroad sign, the autonomous vehicle 100 may determine a current location as a region close to a railroad and may change a driving mode to a manual driving mode.

Alternatively, the autonomous vehicle 100 may determine that the image of the road sign obtained by a camera is matched to an image Toll_booth003.jpg. Since the image Toll_booth003.jpg is an image indicating a tollgate zone, the autonomous vehicle 100 may determine that the current location is a region close to a tollgate. When the current location is determined as a region close to a tollgate, the autonomous vehicle 100 may change a driving mode to a manual driving mode after 10 seconds.

When the image of the road sign obtained by the camera is matched to one of a plurality of pre-stored images indicating an event, the autonomous vehicle 100 may obtain a second path that may replace a first path that is a path along which the autonomous vehicle is currently travelling. The second path may include a path via which the autonomous vehicle 100 detours around an event zone indicated by the obtained image of the road sign. A method of determining one of a plurality of paths as the second path will be explained below with reference to FIG. 15.

Also, the embodiments of FIG. 8 may be performed by the external device 1000. For example, the external device 1000 may store a plurality of images indicating a plurality of zones, and may transmit information needed to control the autonomous vehicle 100 by using the plurality of stored images to the autonomous vehicle 100.

Figure 9:
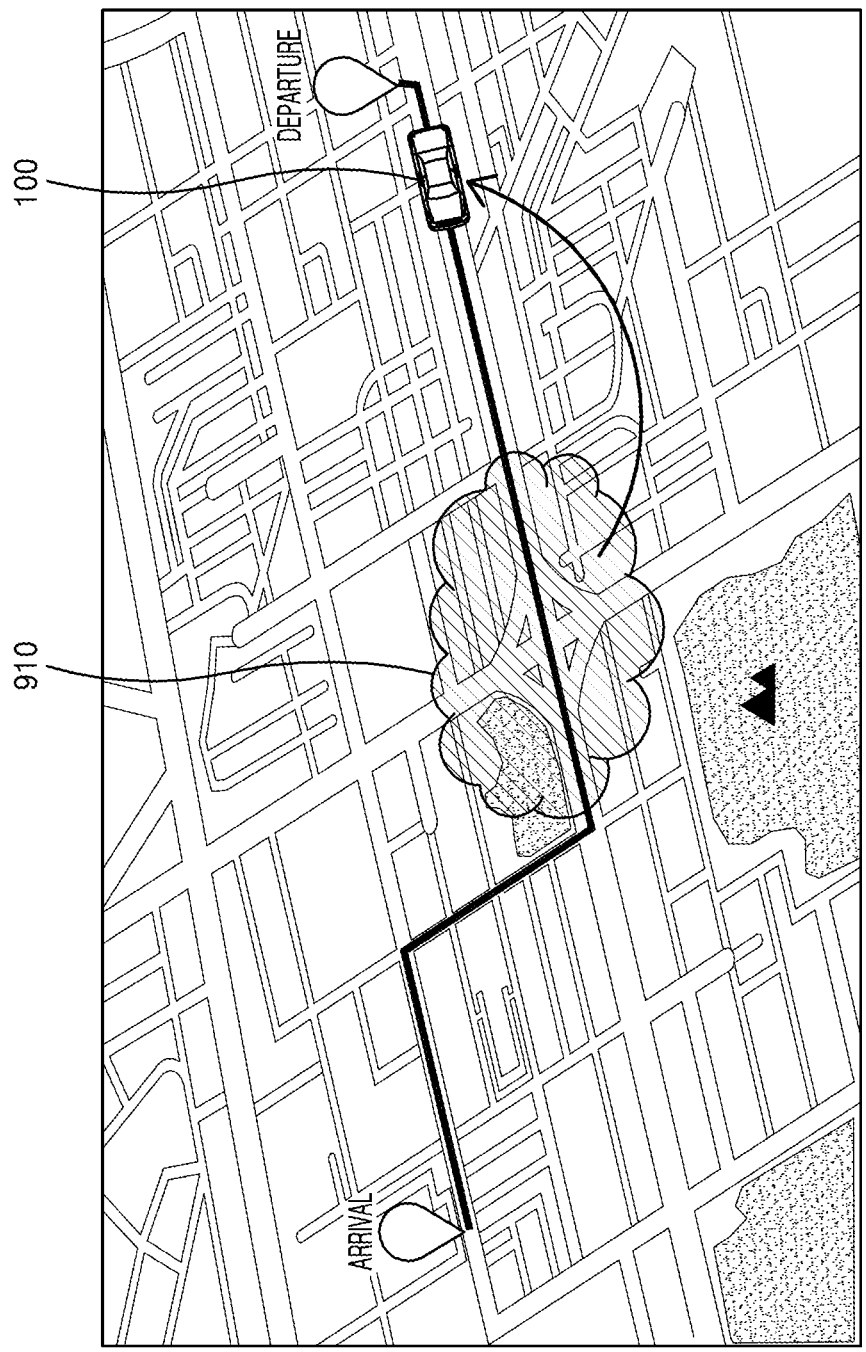
FIG. 9 is a view illustrating an example where the autonomous vehicle obtains weather information according to an embodiment.

FIG. 9 is a view illustrating an example where the autonomous vehicle 100 obtains weather information according to an embodiment.

The autonomous vehicle 100 may obtain weather information on a first path that is a path along which the autonomous vehicle 100 is currently travelling. For example, the autonomous vehicle 100 may receive information about a temperature, a humidity, snow, rain, fine dust, or air pollution around the first path by using the external device 1000 or the sensing device 230. Alternatively, the autonomous vehicle 100 may obtain information indicating that a passing rain is falling in the event zone 910 on the first path from the server 600.

The autonomous vehicle 100 may determine whether to obtain a second path via which the autonomous vehicle 100 detours around the event zone 910 according to the obtained weather information. For example, when a heavy rain falls in the event zone 910, the autonomous vehicle 100 may determine an event of the event zone 910 as a significant event and may obtain the second path via which the autonomous vehicle 100 detours around the event zone 910. Alternatively, when a humidity of the event zone 910 is high, the autonomous vehicle 100 may determine an event of the event zone 910 as an insignificant event and may not obtain the second path via which the autonomous vehicle 100 detours around the event zone 910.

Figure 10:
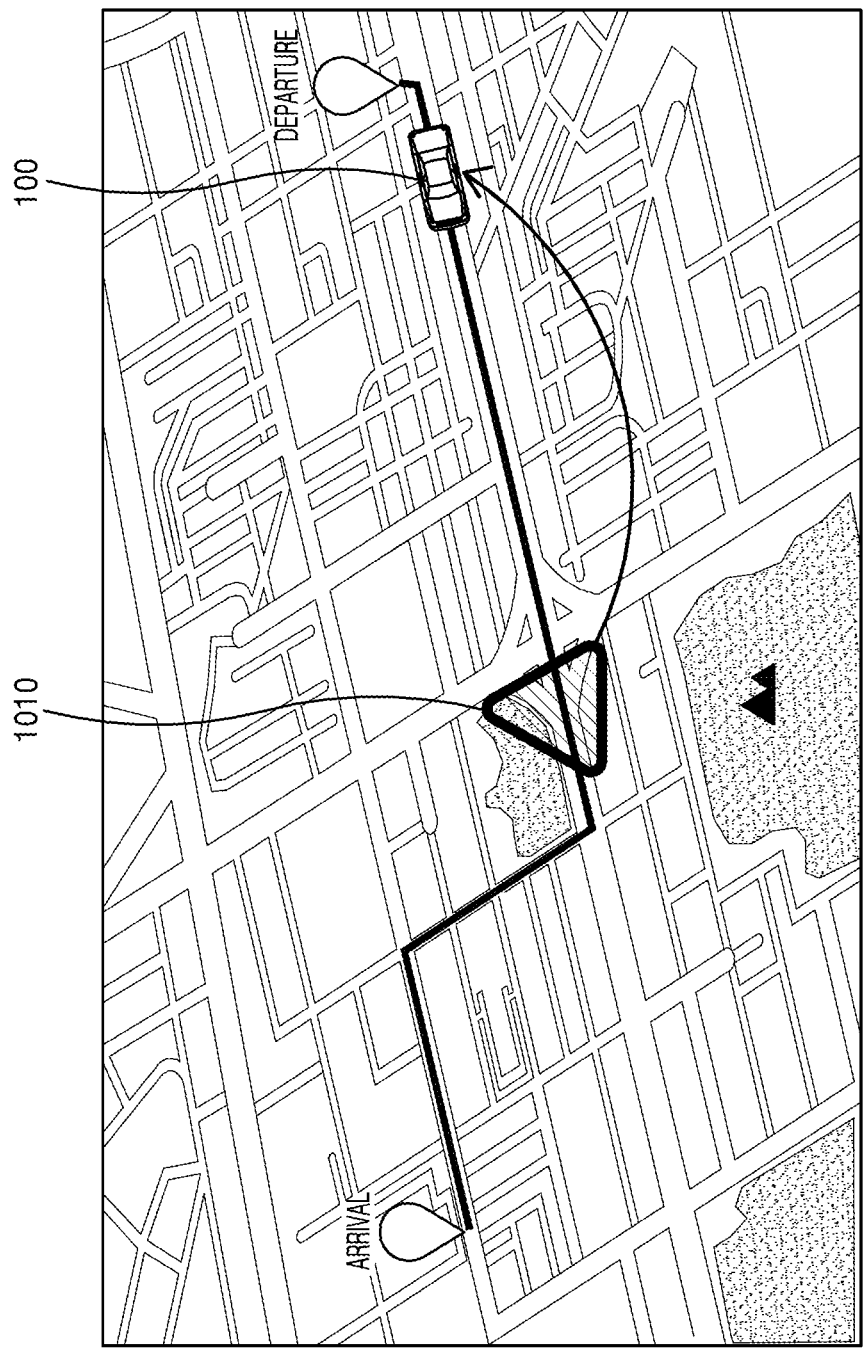
FIG. 10 is a view illustrating an example where the autonomous vehicle obtains road condition information according to an embodiment.

FIG. 10 is a view illustrating an example where the autonomous vehicle 100 obtains road condition information according to an embodiment.

The autonomous vehicle 100 may obtain road condition information around a first path that is a path along which the autonomous vehicle 100 is currently travelling. For example, the autonomous vehicle 100 may receive road surface state information, traffic condition information, traffic accident information, road construction information, traffic control information, or warning area information around the first path by using the external device 1000 or the sensing device 230. Alternatively, the autonomous vehicle 100 may obtain information indicating that a traffic accident has occurred in an event zone 1010 on the first path from the server 600.

The autonomous vehicle 100 may determine whether to obtain a second path via which the autonomous vehicle 100 detours around the event zone 1010 according to the obtained road condition information. For example, when a traffic accident has occurred in the event zone 1010 and thus traffic congestion is heavy, the autonomous vehicle 100 may determine an event of the event zone 1010 as a significant event and may obtain the second path via which the autonomous vehicle 100 detours around the event zone 1010. Alternatively, when the event zone 1010 is a drowsy driving warning area, the autonomous vehicle 100 may determine an event of the event zone 1010 as an insignificant event and may not obtain the second path via which the autonomous vehicle 100 detours around the event zone 1010.

Figure 11:
FIG. 11 is a view illustrating an example where the autonomous vehicle obtains surrounding region information according to an embodiment.

FIG. 11 is a view illustrating an example where the autonomous vehicle 100 obtains surrounding region information according to an embodiment.

The autonomous vehicle 100 may obtain surrounding region information around a first path that is a path along which the autonomous vehicle 100 is currently travelling. For example, the autonomous vehicle 100 may receive surrounding facility information, surrounding landscape information, surrounding building information, and surrounding performance information around the first path by using the external device 1000 or the sensing device 230. Alternatively, the autonomous vehicle 100 may obtain information indicating that a famous singer's performance is held in a first event zone 1110 of a region close to the first path and a second event zone 1120 on the first path is a region close to a school for the deaf from the server 600.

The autonomous vehicle 100 may determine whether to obtain a second path via which the autonomous vehicle 100 detours around the first event zone 1110 or the second event zone 1120 according to the obtained road condition information. For example, when the famous singer's concert has been held in the first event zone 1110 and thus traffic congestion is heavy, the autonomous vehicle 100 may determine an event of the first event zone 1110 as a significant event and may obtain the second path via which the autonomous vehicle 100 detours around the first event zone 1110. Alternatively, when the second event zone 1120 is a region around a sewage disposal plant, the autonomous vehicle 100 may determine an event of the second event zone 1120 as an insignificant event and may not obtain the second path via which the autonomous vehicle 100 detours around the second event zone 1120.

Figure 12:
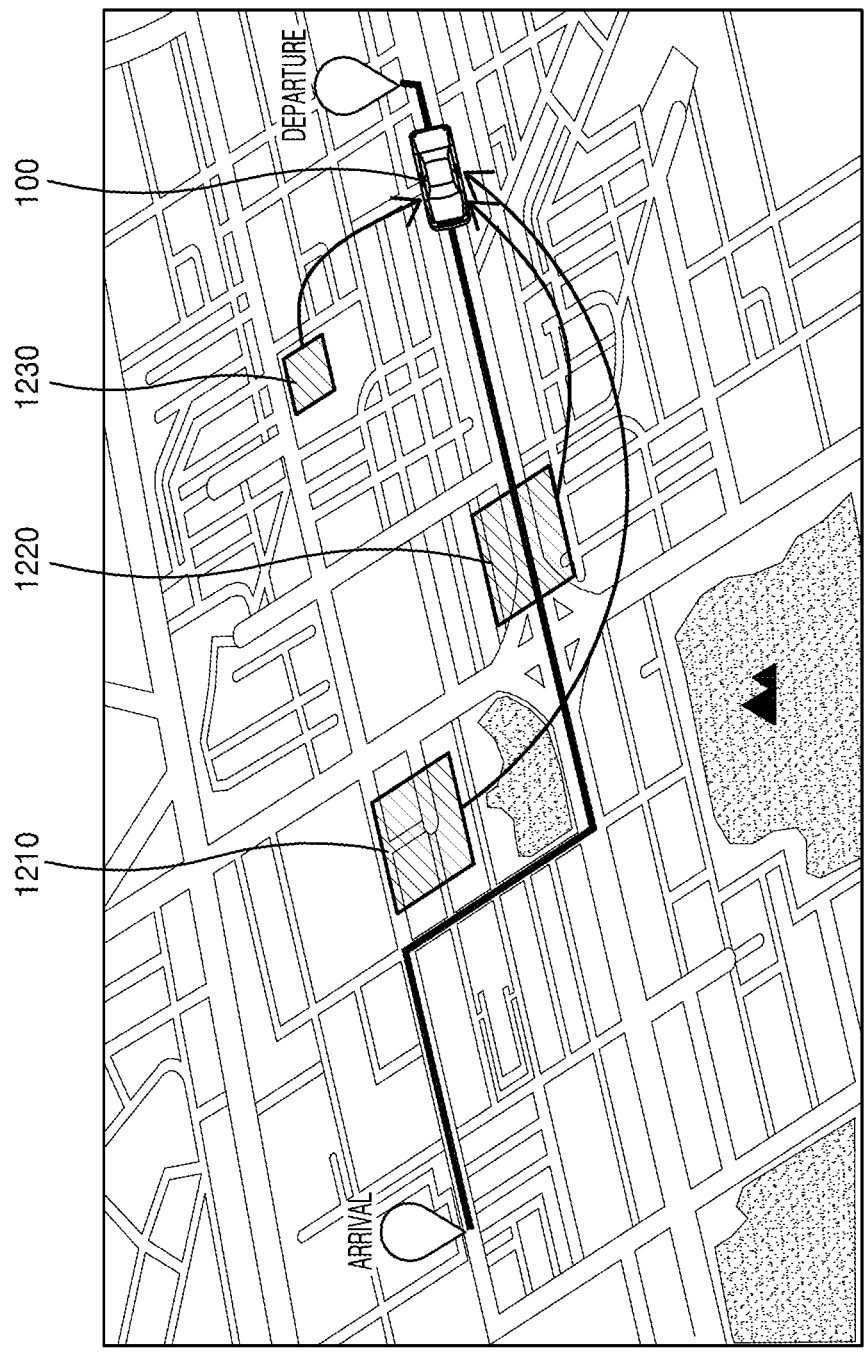
FIG. 12 is a view illustrating an example where the autonomous vehicle obtains news information according to an embodiment.

FIG. 12 is a view illustrating an example where the autonomous vehicle 100 obtains news information according to an embodiment.

The autonomous vehicle 100 may obtain news information around a first path that is a path along which the autonomous vehicle 100 is currently travelling. For example, the autonomous vehicle 100 may receive news information related to weather information, road condition information, or surrounding region information around the first path by using the external device 1000 or the sensing device 100. Alternatively, the autonomous vehicle 100 may obtain news information saying that a famous singer's concert in a first event zone 1210 of a region close to the first path has been cancelled, news information saying that a sinkhole has been abruptly formed in a road of a second event zone 1220 on the first path, or news information saying that a protest has abruptly taken place in a third event zone 1230 from the server 600.

The autonomous vehicle 100 may determine whether to obtain a second path that replaces the first path along which the autonomous vehicle 100 is currently travelling according to the obtained news information.

FIG. 13 is a view for explaining a case where the autonomous vehicle 100 approaches an event zone according to an embodiment.

The autonomous vehicle 100 may store position information of a plurality of areas indicating a plurality of event zones. For example, position information of a speed limit zone 1310 and a liquor-free zone 1320 may be stored in the city server 620. Position information of a bad weather zone 1330 may be stored in the weather server 640. Position information of a construction zone 1340 may be stored in the construction server 630. Position information of a blind zone 1350 and a school zone 1360 may be stored in the city server 620. Position information of a tollgate zone 1370 and a patrol zone 1380 may be stored in the other server 650.

When a current location is close to an event zone stored in the autonomous vehicle 100, the autonomous vehicle 100 may provide a notice to a rider of the autonomous vehicle 100. For example, when the autonomous vehicle 100 receives the position information of the speed limit zone 1310 from the city server 620 and is close to the speed limit zone 1310 that is an event zone, the autonomous vehicle 100 may provide a notice indicating that the autonomous vehicle 100 is to enter the speed limit zone 1310 to the rider of the autonomous vehicle 100.

When the autonomous vehicle 100 receives position information of an event zone from the server 600 and is close to the event zone, the autonomous vehicle 100 may provide a notice indicating that the autonomous vehicle 100 is close to the event zone to the rider of the autonomous vehicle 100 and may travel by using a preset method according to a response received from the rider.

For example, when the autonomous vehicle 100 receives the position information of the bad weather zone 1330 from the weather server 640 and is close to the bad weather zone 1330 that is an event zone, the autonomous vehicle 100 may provide a notice indicating that a driving mode is to change to a manual driving mode to the rider of the autonomous vehicle 100. When the autonomous vehicle 100 provides the notice to the rider and then receives an acknowledgement response from the rider, the autonomous vehicle 100 may travel in a manual driving mode. When the autonomous vehicle 100 provides the notice to the rider and then does not receive an acknowledgement response from the rider, the autonomous vehicle 100 may travel in an autonomous driving mode in which a speed that is 20 km/h less than a speed limit is set as a maximum speed.

Alternatively, when the autonomous vehicle 100 receives the position information of the construction zone 1340 from the construction server 630 and is close to the construction zone 1340 that is an event zone, the autonomous vehicle 100 may provide a notice indicating that a driving mode is to change to a manual driving mode to the rider of the autonomous vehicle 100. When the autonomous vehicle 100 provides the notice to the rider and then receives an acknowledgement response from the rider within 10 seconds, the autonomous vehicle 100 may travel in a manual driving mode. When the autonomous vehicle 100 provides the notice to the rider and then does not receive an acknowledgement response from the rider within a certain period of time (e.g., 10 seconds), the autonomous vehicle 100 may stop according to a preset method.

Alternatively, when the autonomous vehicle 100 receives the position information of the school zone 1360 from the city server 620 and is close to the school zone 1360 that is an event zone, the autonomous vehicle 100 may provide a notice indicating that a driving mode is to change to a manual driving mode to the rider of the autonomous vehicle 100. When the autonomous vehicle 100 provides the notice to the rider and then receives an acknowledgement response from the rider within 10 seconds, the autonomous vehicle 100 may travel in a manual driving mode. When the autonomous vehicle 100 provides the notice to the rider and then does not receive an acknowledgement response from the rider within 10 seconds, the autonomous vehicle 100 may travel along a second path via which the autonomous vehicle 100 detours around the school zone 1360 in an autonomous driving mode.

Also, the embodiments of FIG. 13 may be performed by the external device 1000. For example, the external device 1000 may store position information of a plurality of areas indicating a plurality of event zones and may transmit information needed to control the autonomous vehicle 100 by using the stored position information to the autonomous vehicle 100.

Figure 14:
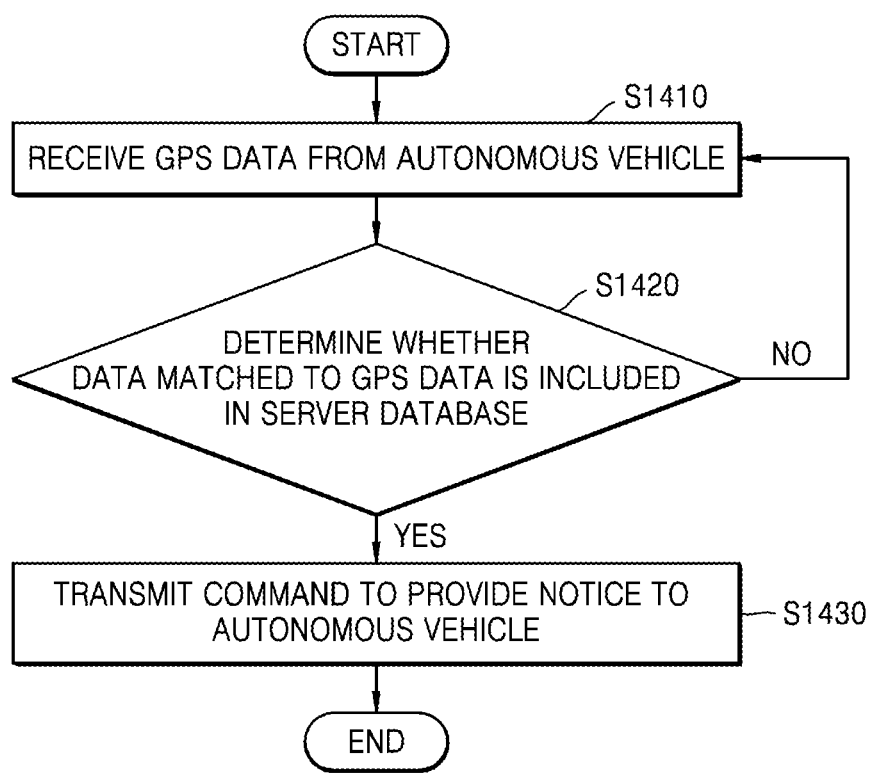
FIG. 14 is a flowchart of a method in which the server transmits a command to the autonomous vehicle according to a current location of the autonomous vehicle according to an embodiment.

FIG. 14 is a flowchart of a method in which the server 600 transmits a command to the autonomous vehicle 100 according to a current location of the autonomous vehicle 100 according to an embodiment.

In operation S1410, the server 600 receives GPS data of the autonomous vehicle 100 from the autonomous vehicle 100. The server 600 may determine a location of the autonomous vehicle 100 by using the GPS data of the autonomous vehicle 100.

In operation S1420, the server 600 determines whether data matched to the GPS data received in operation S1410 is included in a server database. The server 600 may determine whether the location of the autonomous vehicle 100 determined according to the GPS data received in operation S1410 corresponds to an event zone stored in the server 600. For example, the server 600 may determine whether the location of the autonomous vehicle 100 is within a predetermined distance from a construction zone stored in the server 600.

When the data matched to the GPS data received in operation S1410 is included in the server database, in operation S1430, the server 600 transmits a command for controlling the autonomous vehicle 100 to provide a notice to a rider of the autonomous vehicle 100 to the autonomous vehicle 100. For example, when the location of the autonomous vehicle 100 is within a predetermined distance from a construction zone, the server 600 may transmit a command to provide a notice indicating that a driving mode is to change to a manual driving mode to the autonomous vehicle 100.

Figure 15:
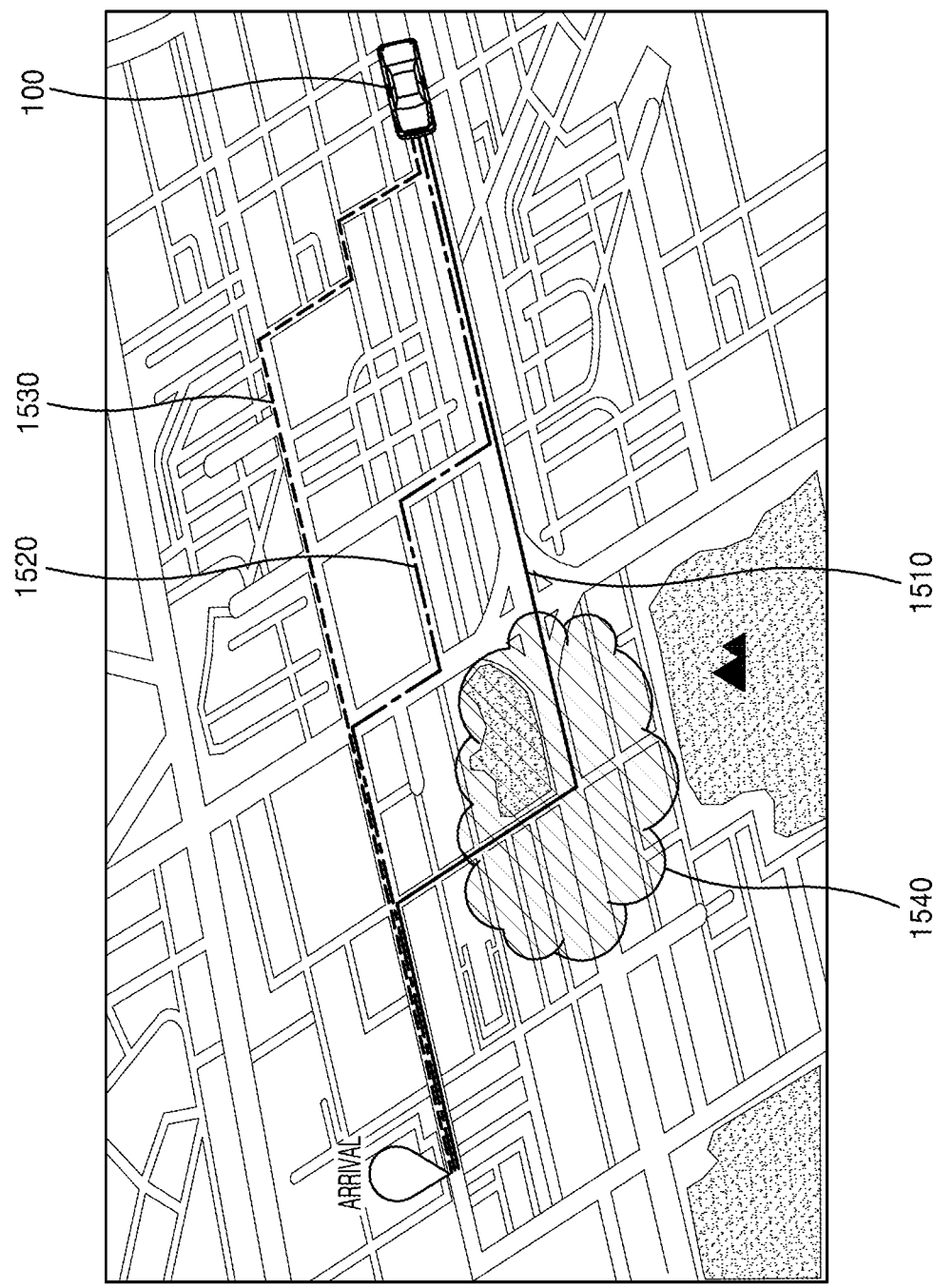
FIG. 15 is a view illustrating an example where the autonomous vehicle determines one of a plurality of detour paths via which the autonomous vehicle detours around an event area as a second path according to an embodiment.

FIG. 15 is a view illustrating an example where the autonomous vehicle 100 determines one of a plurality of detour paths via which the autonomous vehicle 100 detours around an event area as a second path according to an embodiment.

When an event occurring on a path along which the autonomous vehicle 100 is currently travelling is detected, the autonomous vehicle 100 may obtain a plurality of detour paths via which the autonomous vehicle 100 detours around an event area in which the detected event occurs. For example, when an event such as icy road warning sign is detected on a first path 1510 along which the autonomous vehicle 100 is currently travelling, the autonomous vehicle 100 may obtain a 2-1 path 1520 and a 2-2 path 1530 that are a plurality of detour paths via which the autonomous vehicle 100 detours around an icy rod warning area 1540. The plurality of detour paths that replace the first path 1510 may include a path from a current location to a destination along the first path 1510.

The autonomous vehicle 100 may determine one of the obtained plurality of detour paths as a second path according to preset priorities. For example, when a priority is a distance or a time, the autonomous vehicle 100 may determine one path whose expected travel distance or expected travel time is the shortest from among the plurality of detour paths as the second path. Alternatively, when a priority is fuel consumption, the autonomous vehicle 100 may determine one path whose expected fuel consumption is the smallest from among the plurality of detour paths as the second path.

A priority used to determine one path from among the plurality of detour paths may be determined when the autonomous vehicle 100 was shipped or may be determined based on a user input. For example, a priority may be determined as a time when the autonomous vehicle 100 was shipped and may be changed to a distance based on a user input.

A priority used to determine one path from among the plurality of detour paths may be determined without a user input. The autonomous vehicle 100 may determine one of a plurality of priorities as a priority used to determine one path from among the plurality of detour paths by using information stored in the storage device 270, information obtained from the external device 1000, and information obtained from the sensing device 230. For example, when time information about a schedule of a user is stored in the storage device 270, the autonomous vehicle 100 may determine a priority used to determine one path from among the plurality of detour paths as a time, and may determine one path whose expected travel time is the shortest from among the plurality of detour paths as the second path. Alternatively, when the autonomous vehicle 100 obtains information indicating that the amount of remaining fuel is equal to or less than a predetermined level, the autonomous vehicle 100 may determine a priority used to determine one path from among the plurality of detour paths as fuel consumption and may determine one path whose expected fuel consumption is the smallest from among the plurality of detour paths as the second path. Alternatively, when the autonomous vehicle 100 obtains information indicating that the amount of tire wear of the autonomous vehicle 100 is equal to or greater than a predetermined level, the autonomous vehicle 100 may determine a priority used to determine one path from among the plurality of detour paths as fuel consumption and may determine one path whose expected fuel consumption is the smallest from among the plurality of detour paths as the second path.

Figure 16:
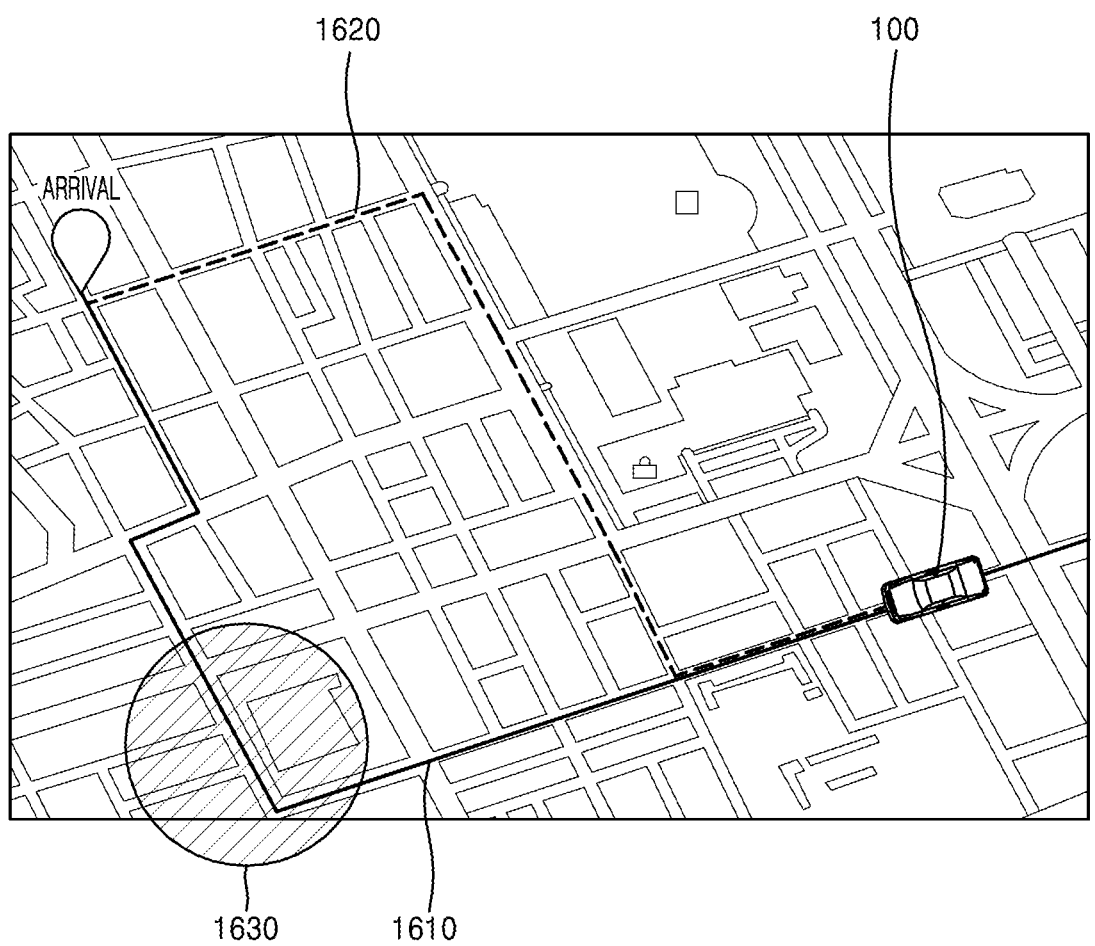
FIG. 16 is a view illustrating an example where the autonomous vehicle operates by comparing a travel time or a travel distance expected when the autonomous vehicle travels along a first path with a travel time or a travel distance expected when the autonomous vehicle travels along a second path according to an embodiment.

FIG. 16 is a view illustrating an example where the autonomous vehicle 100 operates by comparing a travel time or a travel distance expected when the autonomous vehicle 100 travels along a first path with a travel time or a travel distance expected when the autonomous vehicle 100 travels along a second path according to an embodiment.

A case where the first cost or the second cost is a travel time or a travel distance will be explained with reference to FIG. 16.

The autonomous vehicle 100 may operate based on a difference between a travel time expected when the autonomous vehicle 100 travels along a first path 1610 and a travel time expected when the autonomous vehicle 100 travels along a second path 1620. For example, the autonomous vehicle 100 may determine the second path 1620 as a travel path when the difference between the travel time expected when the autonomous vehicle 100 travels along the first path 1610 and the travel time expected when the autonomous vehicle 100 travels along the second path 1620 is equal to or less than a threshold value, and may determine the first path 1610 as a travel path when the difference between the travel time expected when the autonomous vehicle 100 travels along the first path 1610 and the travel time expected when the autonomous vehicle 100 travels along the second path 1620 is greater than the threshold value.

The threshold value may be determined as a specific value, or may be determined as a percentage of a distance or a time as described with reference to FIG. 4.

The autonomous vehicle 100 may be controlled according to whether the difference between the travel time expected when the autonomous vehicle 100 travels along the first path 1610 and the travel time expected when the autonomous vehicle 100 travels along the second path 1620 is greater than the threshold value.

For example, the autonomous vehicle 100 may travel along the second path 1620 in an autonomous driving mode when the difference between the travel time expected when the autonomous vehicle 100 travels along the first path 1610 and the travel time expected when the autonomous vehicle 100 travels along the second path 1620 is equal to or less than the threshold value.

Alternatively, a case where the difference between the travel time expected when the autonomous vehicle 100 travels along the first path 1610 and the travel time expected when the autonomous vehicle 100 travels along the second path 1620 is greater than the threshold value will be explained. The autonomous vehicle 100 may provide a notice indicating that an event area 1630 is on the first path 1610 to a rider of the autonomous vehicle 100 or may determine the first path 1610 as a travel path.

A notice provided to the rider of the autonomous vehicle 100 when a difference between a first cost including the travel time expected when the autonomous vehicle 100 travels along the first path 1610 and a second cost including the travel time expected when the autonomous vehicle 100 travels along the second path 1620 is equal to or greater than, or greater than a threshold value will be explained below in detail with reference to FIGS. 26 through 29.

The method of determining a travel path by comparing travel times of FIG. 16 may be used to determine a travel path by comparing travel distances.

Figure 17:
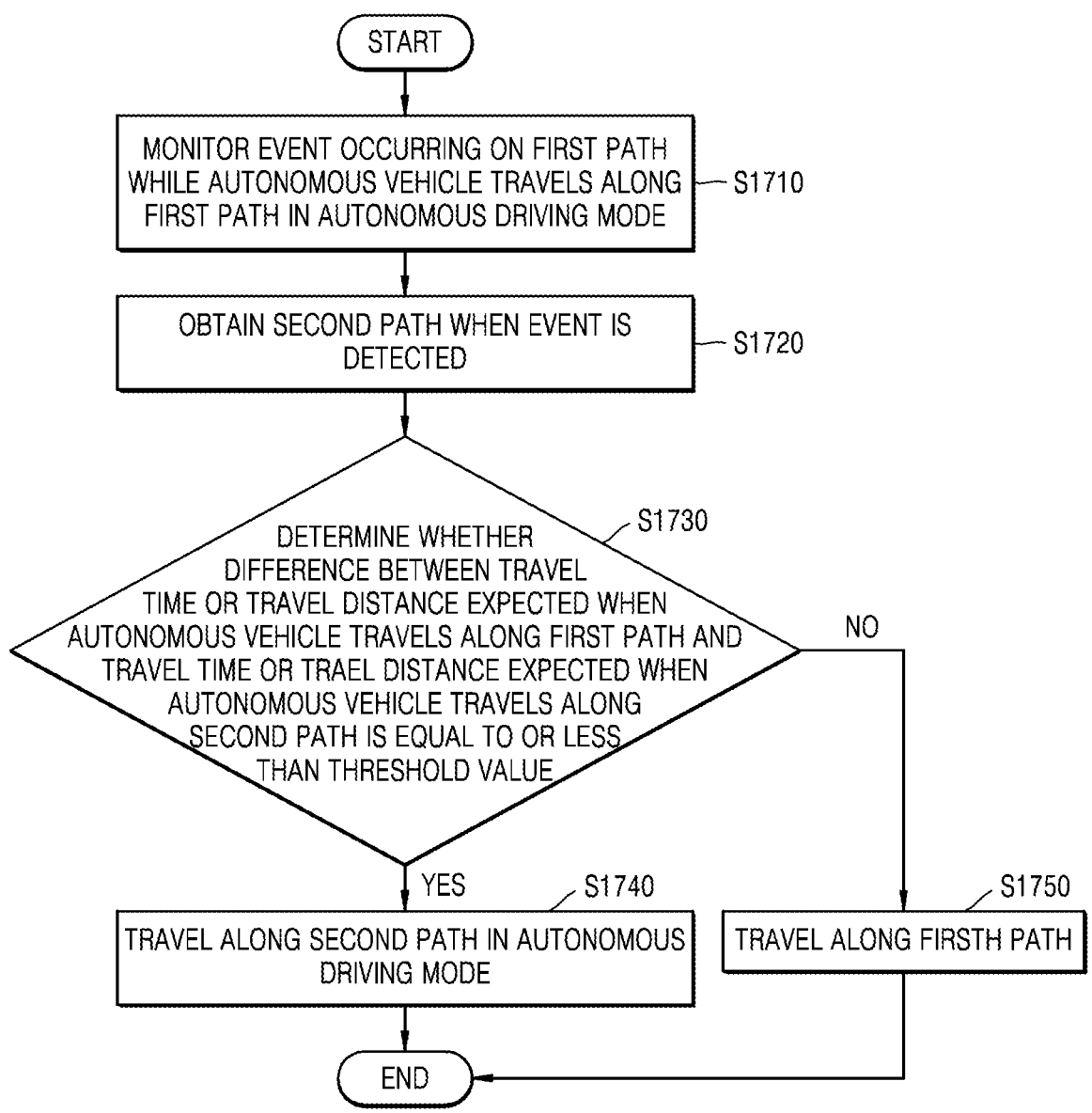
FIG. 17 is a flowchart illustrating a method in which the autonomous vehicle operates by comparing a travel time or a travel distance expected when the autonomous vehicle travels along a first path with a travel time or a travel distance expected when the autonomous vehicle travels along a second path according to an embodiment.

FIG. 17 is a flowchart illustrating a method in which the autonomous vehicle 100 operates by comparing a travel time or a travel distance expected when the autonomous vehicle 100 travels along a first path with a travel time or a travel distance expected when the autonomous vehicle 100 travels along a second path according to an embodiment.

In operation S1710, the autonomous vehicle 100 monitors an event occurring on a first path while the autonomous vehicle 100 travels along the first path in an autonomous driving mode.

In operation S1720, the autonomous vehicle 100 obtains a second path that may replace the first path when the event is detected in operation S1710.

In operation S1730, the autonomous vehicle 100 determines whether a difference between a travel time or a travel distance expected when the autonomous vehicle 100 travels along the first path and a travel time or a travel distance expected when the autonomous vehicle 100 travels along the second path is equal to or less than a threshold value.

In operation S1740, the autonomous vehicle 100 travels along the second path in an autonomous driving mode when the difference between the travel time or the travel distance expected when the autonomous vehicle 100 travels along the first path and the travel time or the travel distance expected when the autonomous vehicle 100 travels along the second path is equal to or less than the threshold value.

In operation S1750, the autonomous vehicle 100 travels along the first path when the difference between the travel time or the travel distance expected when the autonomous vehicle 100 travels along the first path and the travel time or the travel distance expected when the autonomous vehicle 100 travels along the second path is greater than the threshold value.

Figure 18:
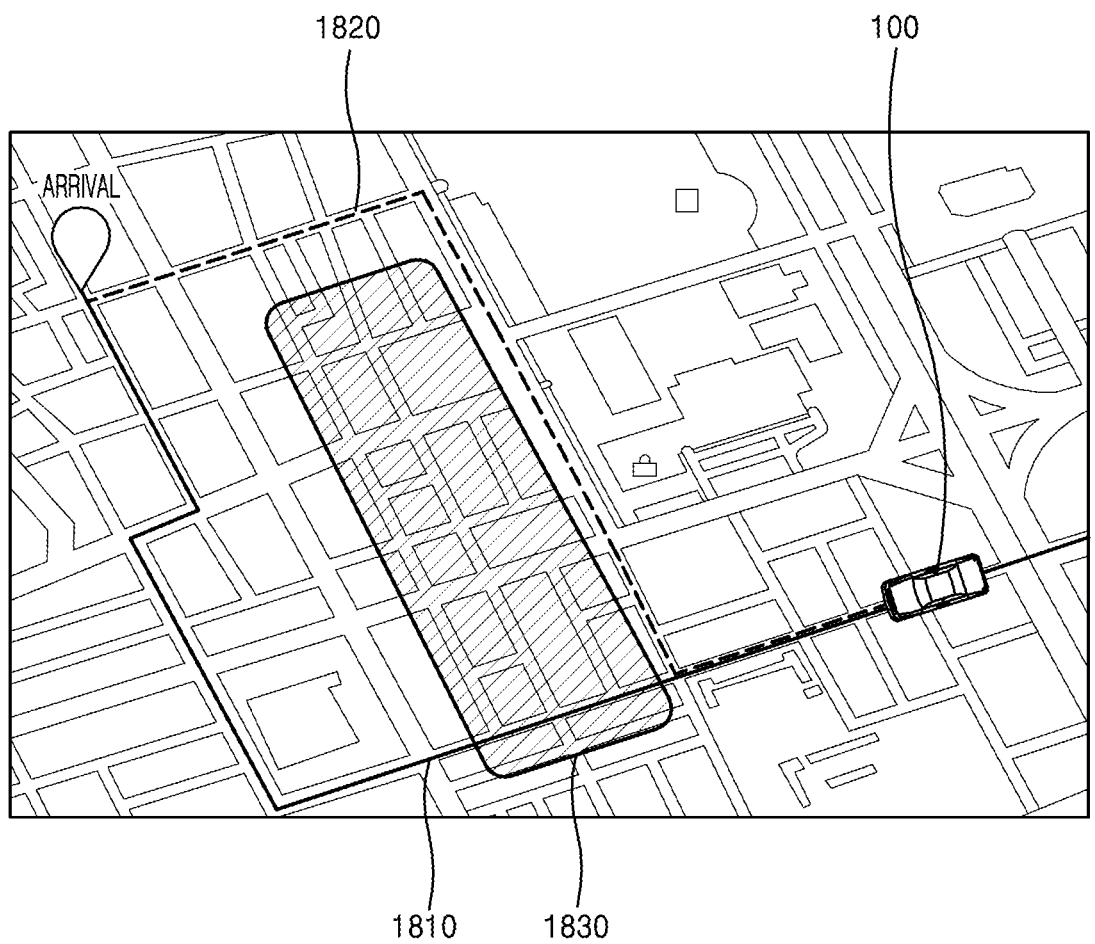
FIG. 18 is a view illustrating an example where the autonomous vehicle operates by comparing fuel consumption expected when the autonomous vehicle travels along a first path with fuel consumption expected when the autonomous vehicle travels along a second path according to an embodiment.

FIG. 18 is a view illustrating an example where the autonomous vehicle 100 operates by comparing fuel consumption expected when the autonomous vehicle 100 travels along a first path with fuel consumption expected when the autonomous vehicle 100 travels along a second path according to an embodiment.

A case where the first cost or the second cost is fuel consumption will be explained with reference to FIG. 18.

The autonomous vehicle 100 may operate based on a difference between fuel consumption expected when the autonomous vehicle 100 travels along a first path and fuel consumption expected when the autonomous vehicle 100 travels along a second path. For example, the autonomous vehicle 100 may determine the second path as a travel path when the difference between the fuel consumption expected when the autonomous vehicle 100 travels along the first path and the fuel consumption expected when the autonomous vehicle 100 travels along the second path is equal to or less than a threshold value, and may determine the first path as a travel path when the difference between the fuel consumption expected when the autonomous vehicle 100 travels along the first path and the fuel consumption expected when the autonomous vehicle 100 travels along the second path is greater than the threshold value.

The threshold value may be determined as a specific value, or may be determined as a percentage of fuel consumption as described with reference to FIG. 4.

For a detailed method of controlling the autonomous vehicle 100 according to whether the difference between the fuel consumption expected when the autonomous vehicle 100 travels along the first path and the fuel consumption expected when the autonomous vehicle 100 travels along the second path is greater than the threshold value, the description of FIG. 16 may be referred to.

Figure 19:
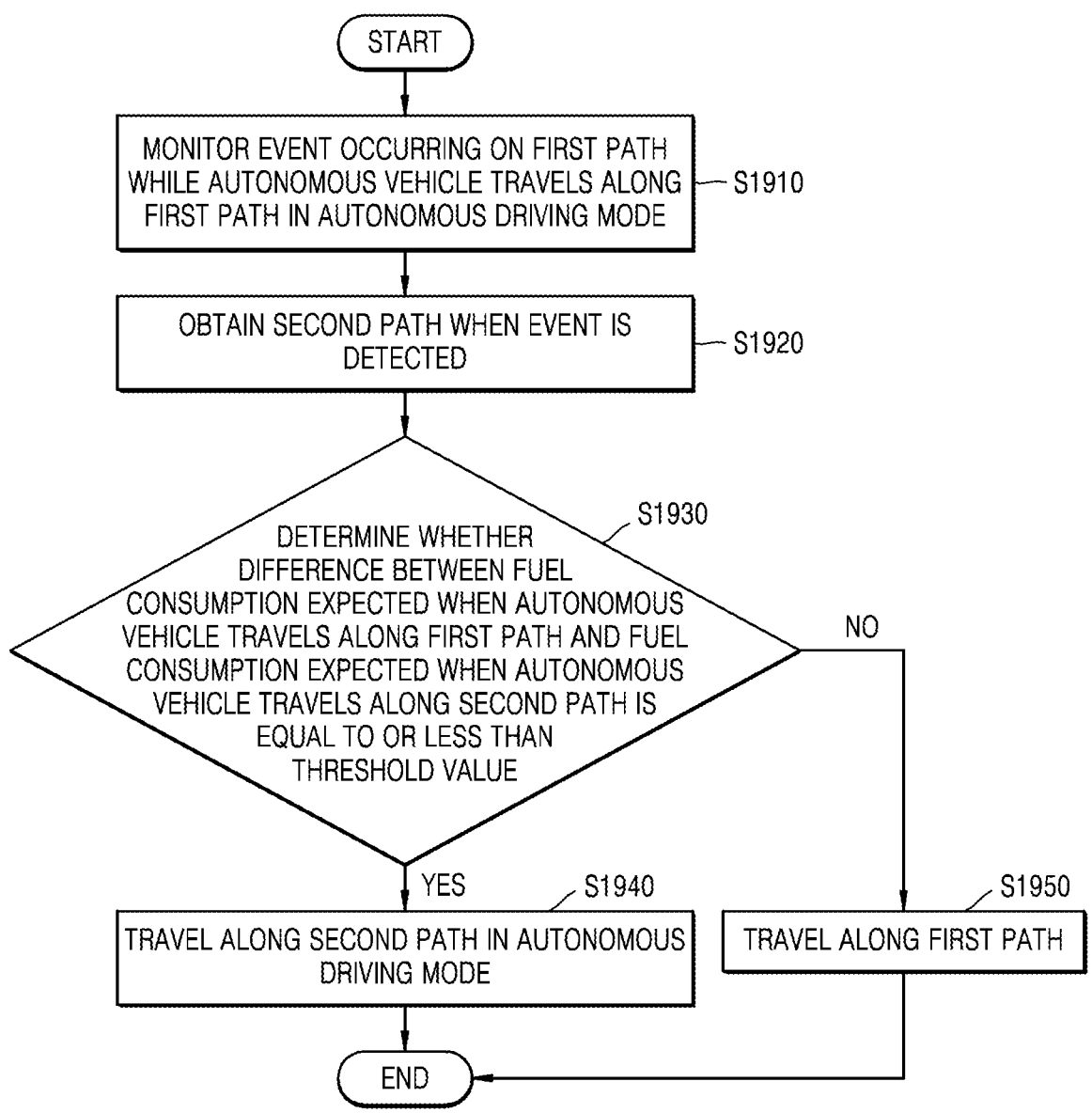
FIG. 19 is a flowchart illustrating a method in which the autonomous vehicle operates by comparing fuel consumption expected when the autonomous vehicle travels along a first path with fuel consumption expected when the autonomous vehicle travels along a second path according to an embodiment.

FIG. 19 is a flowchart illustrating a method in which the autonomous vehicle 100 operates by comparing fuel consumption expected when the autonomous vehicle 100 travels along a first path with fuel consumption expected when the autonomous vehicle 100 travels along a second path according to an embodiment.

Operations S1910 and S1920 respectively correspond to operations S1710 and S1720, and thus a detailed explanation thereof is omitted for brevity.

In operation S1930, the autonomous vehicle 100 determines whether a difference between fuel consumption expected when the autonomous vehicle 100 travels along a first path and fuel consumption expected when the autonomous vehicle 100 travels along a second path is equal to or less than a threshold value.

In operation S1940, the autonomous vehicle 100 travels along the second path in an autonomous driving mode when the difference between the fuel consumption expected when the autonomous vehicle 100 travels along the first path and the fuel consumption expected when the autonomous vehicle 100 travels along the second path is equal to or less than the threshold value.

In operation S1950, the autonomous vehicle 100 travels along the first path when the difference between the fuel consumption expected when the autonomous vehicle 100 travels along the first path and the fuel consumption expected when the autonomous vehicle 100 travels along the second path is greater than the threshold value.

Figure 20:
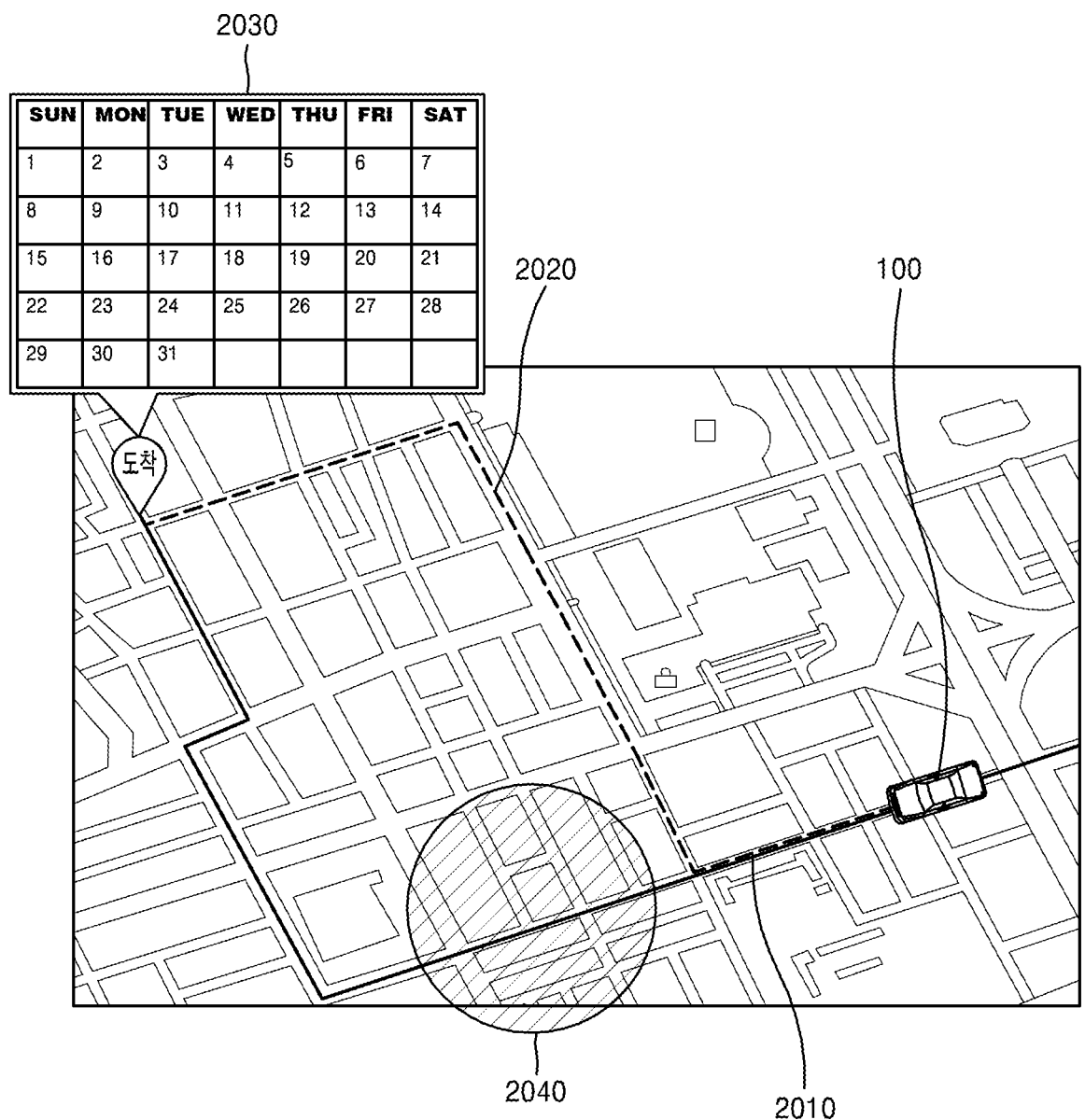
FIG. 20 is a view illustrating an example where the autonomous vehicle operates by using schedule information of a rider according to an embodiment.

FIG. 20 is a view illustrating an example where the autonomous vehicle 100 operates by using schedule information of a rider according to an embodiment.

The autonomous vehicle 100 may obtain schedule information of a rider of the autonomous vehicle 100. For example, the autonomous vehicle 100 may receive the schedule information of the rider from a mobile terminal owned by the rider. Alternatively, the autonomous vehicle 100 may receive the schedule information of the rider from the server 600. Alternatively, the autonomous vehicle 100 may use the schedule information stored in the storage device 270.

When the autonomous vehicle 100 performs monitoring on a first path 2010 and an event zone 2040 occurring on the first path 2010 is detected, the autonomous vehicle 100 obtains a second path 2020 that may replace the first path 2010. The autonomous vehicle 100 may obtain an expected arrival time expected when the autonomous vehicle 100 travels along the second path 2020.

The autonomous vehicle 100 may determine whether to travel along the second path 2020 by comparing a schedule time at a destination with the expected arrival time expected when the autonomous vehicle 100 travels along the second path 2020. For example, when the schedule time obtained from the schedule information is 6:00 pm and the expected arrival time expected when the autonomous vehicle 100 travels along the second path 2020 is 6:30 pm, the autonomous vehicle 100 may determine the first path 2010 as a travel path. Alternatively, when the schedule time obtained from the schedule information is 7:00 pm and the expected arrival time expected when the autonomous vehicle 100 travels along the second path 2020 is 6:30 pm, the autonomous vehicle 100 may determine the second path 2020 as a travel path. Alternatively, when the schedule time obtained from the schedule information is 7:00 pm, the expected arrival time expected when the autonomous vehicle 100 travels along the second path 2020 is 7:20 pm, and an allowable delay time set according to a user input is 30 minutes, the autonomous vehicle 100 may determine the second path 2020 as a travel path.

Figure 21:
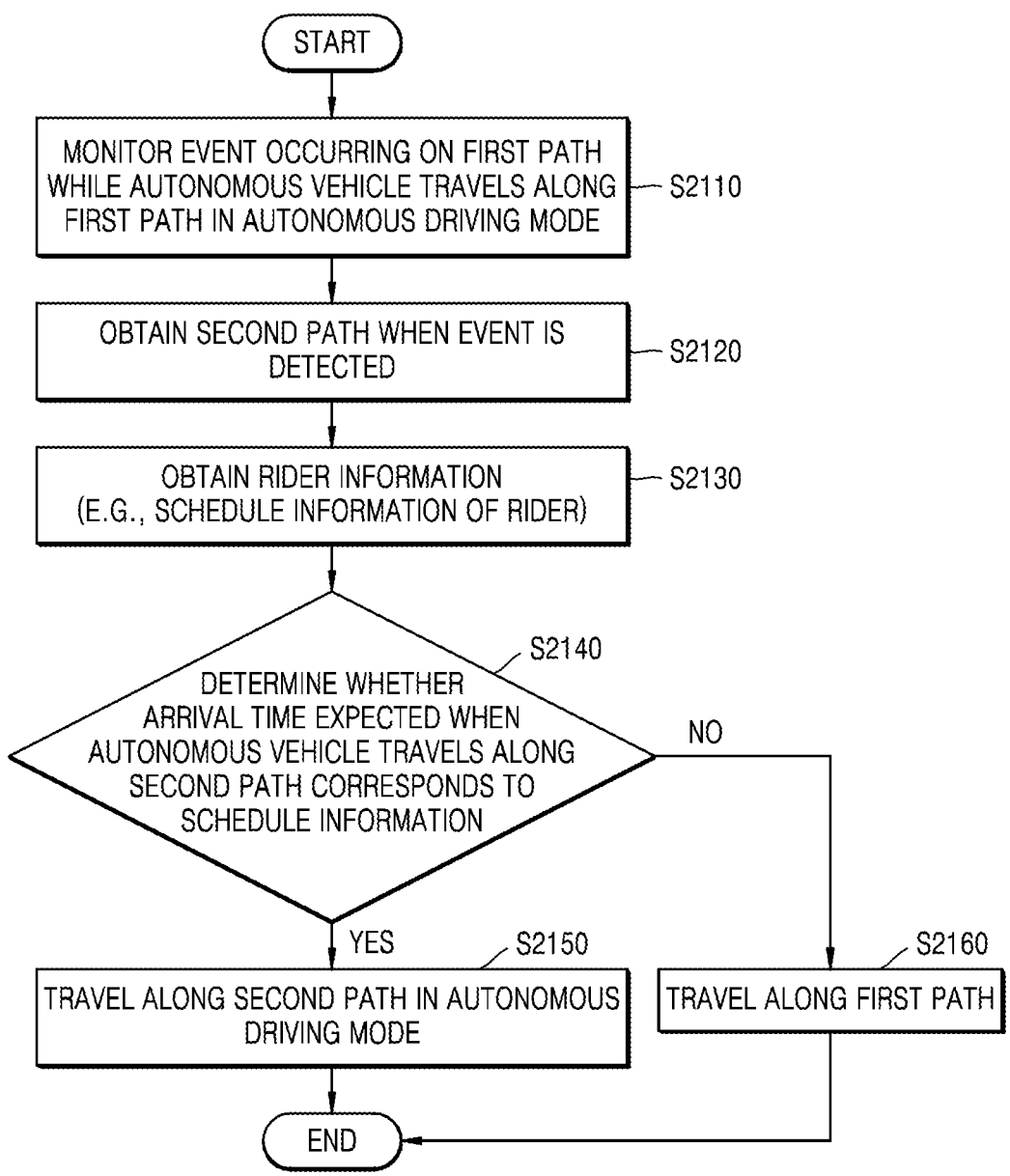
FIG. 21 is a flowchart illustrating a method in which the autonomous vehicle operates by using information of a rider according to an embodiment.

FIG. 21 is a flowchart illustrating a method in which the autonomous vehicle 100 operates by using information of a rider according to an embodiment.

Operations S2110 and S2020 respectively correspond to operations S1710 and S1720, and thus a detailed explanation thereof is omitted for brevity.

In operation S2130, the autonomous vehicle 100 obtains rider information. For example, the autonomous vehicle 100 may obtain schedule information of a rider. The schedule information of the rider may include information about a schedule start time.

In operation S2140, the autonomous vehicle 100 determines whether an arrival time expected when the autonomous vehicle 100 travels along a second path corresponds to the schedule information. The autonomous vehicle 100 may determine whether the arrival time expected when the autonomous vehicle 100 travels along the second path is less than the schedule start time according to the schedule information.

In operation S2150, the autonomous vehicle 100 travels along the second path in an autonomous driving mode when the arrival time expected when the autonomous vehicle 100 travels along the second path is before the schedule start time according to the schedule information.

In operation S2160, the autonomous vehicle 100 travels along a first path when the arrival time expected when the autonomous vehicle 100 travels along the second path is after the schedule start time according to the schedule information.

Figure 22:
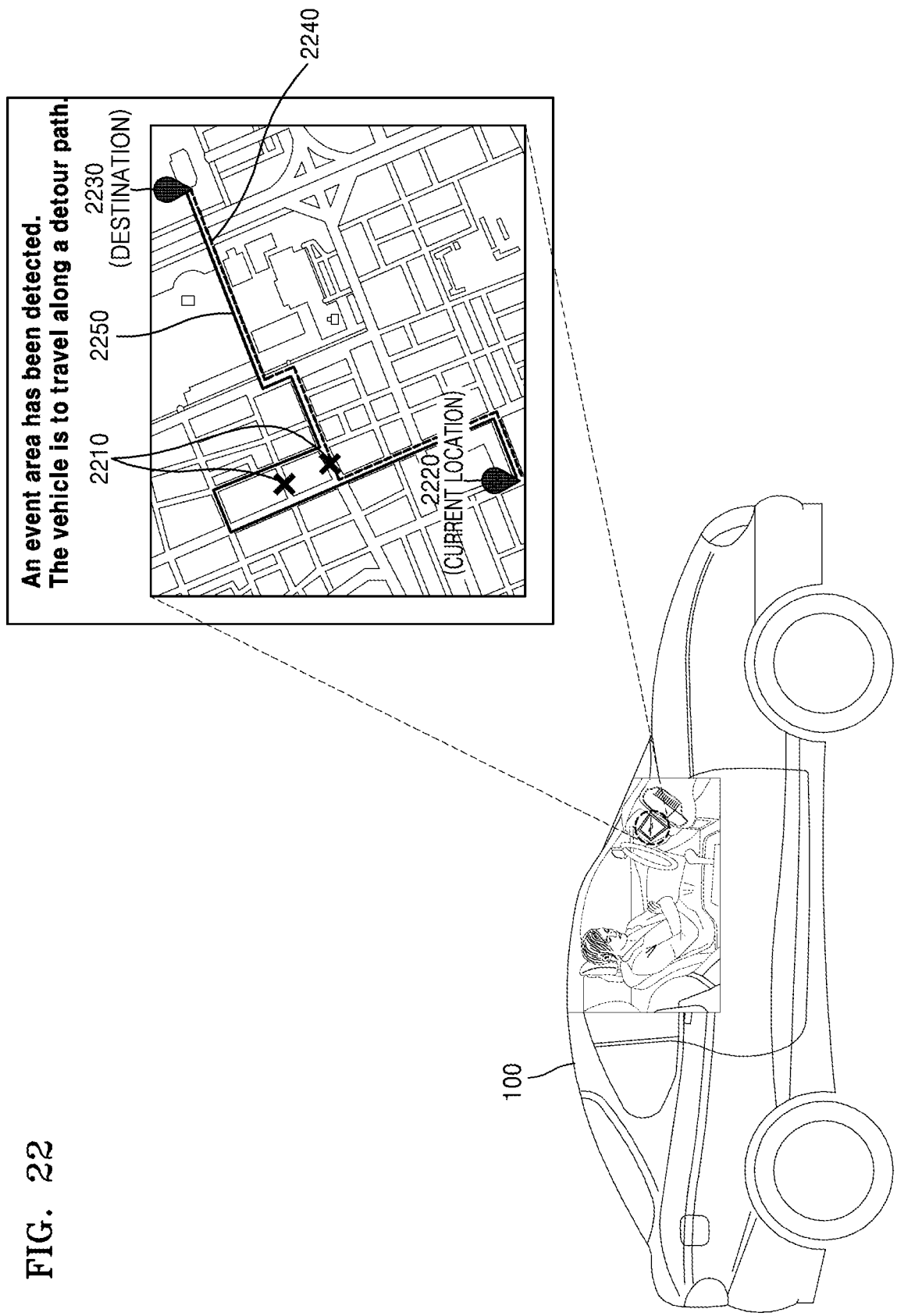
FIG. 22 is a view illustrating an example where when an event area on a first path is detected, the autonomous vehicle travels along the first path or a second path according to a cost expected when the autonomous vehicle travels along the first path or the second path, a state of a rider, or a type of the detected event according to an embodiment.

FIG. 22 is a view illustrating an example where when an event area on a first path is detected, the autonomous vehicle 100 travels along the first path or a second path according to a cost expected when the autonomous vehicle 100 travels along the first path or the second path, a state of a rider, or a type of the detected event according to an embodiment.

The autonomous vehicle 100 may travel along a first path 2240 that connects a current location 2220 and a destination 2230. When an event area 2210 occurring on the first path 2240 is detected while the autonomous vehicle 100 is travelling, the autonomous vehicle 100 may obtain information about a second path 2250 that replaces the first path 2240.

The autonomous vehicle 100 may determine a travel path by comparing a first cost expected when the autonomous vehicle 100 travels along the first path 2240 with a second cost expected when the autonomous vehicle 100 travels along the second path 2250. For example, when the second cost is greater than the first cost and a difference between the second cost and the first cost is equal to or greater than a threshold value, the autonomous vehicle 100 may travel along the first path 2240. Alternatively, when the second cost is greater than the first cost and a difference between the second cost and the first cost is less than the threshold value, the autonomous vehicle 100 may travel along the second path 2250. Alternatively, when the second cost is less than the first cost, the autonomous vehicle 100 may travel along the second path 2250.

The autonomous vehicle 100 may determine a travel path by additionally considering a state of a rider. The autonomous vehicle 100 may obtain rider state information indicating the state of the rider. The autonomous vehicle 100 may determine whether the rider is able to manually drive the autonomous vehicle 100 according to the rider state information. For example, when it is determined that the rider is sleeping, the autonomous vehicle 100 may determine that manual driving by the rider is impossible. The autonomous vehicle 100 may determine a travel path according to whether manual driving by the rider is possible. When the event area 2210 in which the autonomous vehicle 100 is to travel in a manual driving mode is included in the first path 2240 and it is determined that manual driving by the rider is impossible, the autonomous vehicle 100 may travel along the second path 2250 in an autonomous driving mode irrespective of a result obtained after comparing the first cost with the second cost. For example, when it is determined that the rider is sleeping, the autonomous vehicle 100 may display on the display unit 281 a message indicating that the autonomous vehicle 100 is to travel along a detour path and may travel along the second path 2250 in an autonomous driving mode irrespective of a result obtained after comparing the first cost with the second cost. A detailed method of determining a travel path according to the state of the rider will be explained below in detail with reference to FIG. 23.

The autonomous vehicle 100 may determine a travel path according to a type of an event occurring on the first path 2240. The autonomous vehicle 100 may monitor an event occurring on the first path 2240 and may determine a type of the detected event. The autonomous vehicle 100 may determine whether the event area 2210 is an area in which the autonomous vehicle 100 may travel. When the event area 2210 is a construction zone and thus is blocked, the autonomous vehicle 100 may determine the event area 2210 as an area in which the autonomous vehicle 100 may not travel.

Alternatively, when the event area 2210 is a fine dust warning area, the autonomous vehicle 100 may determine the event area 2210 as an area in which the autonomous vehicle 100 may travel in an autonomous driving mode. Alternatively, when the event area 2210 is an icy road warning area, the autonomous vehicle 100 may determine the event area 2210 as an area in which the autonomous vehicle 100 may travel in a manual driving mode or an autonomous driving mode at a low speed. Alternatively, when the event area 2210 is included in a zone close to a school for the deaf, the autonomous vehicle 100 may determine the event area 2210 as an area in which the autonomous vehicle 100 may not travel in an autonomous driving mode and may travel in a manual driving mode. The autonomous vehicle 100 may determine a travel path according to whether the event area 2210 is an area in which the autonomous vehicle 100 may travel in an autonomous driving mode or a manual driving mode. When it is determined that the event area 2210 is an area (e.g., a construction zone) in which the autonomous vehicle 100 may not travel in any of an autonomous driving mode and a manual driving mode, the autonomous vehicle 100 may travel along the second path 2250 in an autonomous driving mode irrespective of a result obtained after comparing the first cost with the second cost. Alternatively, when it is determined that the event area 2210 is an area (e.g., a fine dust warning area) in which the autonomous vehicle 100 may travel in an autonomous driving mode, the autonomous vehicle 100 may travel along the first path 2240 in an autonomous driving mode according to or irrespective of a result obtained after comparing the first cost with the second cost. Alternatively, when it is determined that the event area 2210 is an area (e.g., an icy road warning area) in which the autonomous vehicle 100 may travel in a manual driving mode or an autonomous driving mode at a low speed, the autonomous vehicle 100 may travel along the first path 2240 or the second path 2250 according to a result obtained after comparing the first cost with the second cost and whether manual driving by the rider is possible. Alternatively, when it is determined that the event area 2210 is an area (e.g., a zone close to a school for the deaf) in which the autonomous vehicle 100 may not travel in an autonomous driving mode and may travel only in a manual driving mode and it is determined that manual driving by the rider is impossible, the autonomous vehicle 100 may travel along the second path 2250 in an autonomous driving mode irrespective of a result obtained after comparing the first cost with the second cost.

Figure 23:
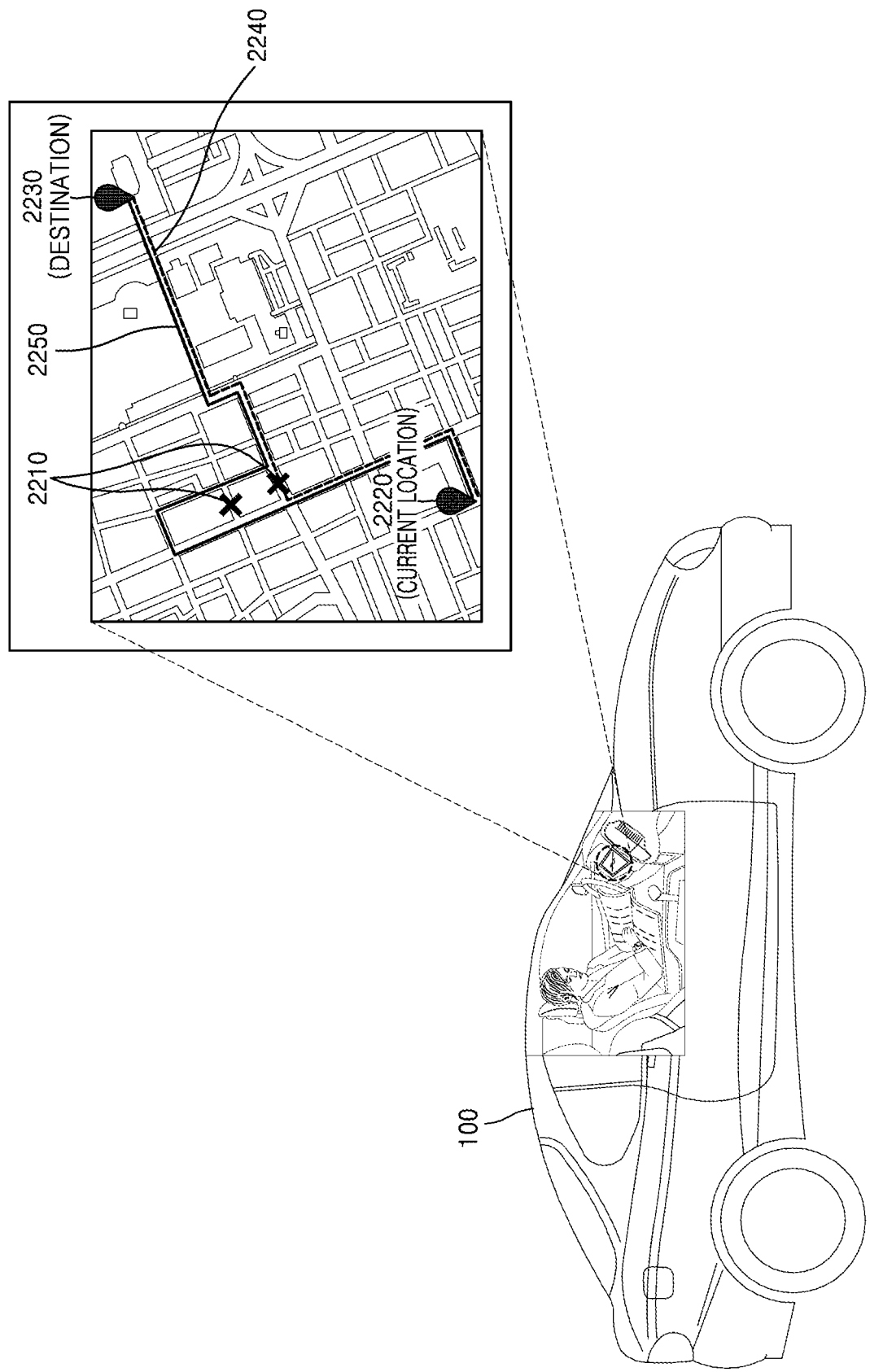
FIG. 23 is a view illustrating an example where when an event area on a first path is detected, the autonomous vehicle travels along the first path or a second path according to a state of a rider according to an embodiment.

FIG. 23 is a view illustrating an example where when an event area on a first path is detected, the autonomous vehicle 100 travels along the first path or a second path according to a state of a rider according to an embodiment.

The autonomous vehicle 100 may obtain rider state information. The autonomous vehicle 10 may determine a state of a rider as one of a plurality of states based on the obtained rider state information. For example, the autonomous vehicle 100 may determine the state of the rider as one of a state in which manual driving is impossible (e.g., there is no rider in the driver's seat or the rider's license information is not checked), a state in which manual driving is possible after a predetermined period of time elapses (e.g., the rider is sleeping in the driver's seat), and a state in which immediate manual driving is possible (e.g., the rider is reading in the driver's seat).

The autonomous vehicle 100 may determine a travel path based on the state of the rider. A case where the autonomous vehicle 100 determines the event area 2210 as an area in which the autonomous vehicle 100 has to travel in a manual driving mode will be explained.

When there is no rider in the driver's seat, the autonomous vehicle 100 may travel along the second path 2250 in an autonomous driving mode irrespective of a result obtained after comparing a first cost with a second cost.

Alternatively, when it is determined according to the rider state information that the state of the rider is a state in which the rider is sleeping in the driver's seat and a response to a notice indicating that a driving mode is to change to a manual driving mode is not received from the rider, the autonomous vehicle 100 may travel along the second path 2250 in an autonomous driving mode irrespective of a result obtained after comparing the first cost with the second cost.

Alternatively, when it is determined according to the rider state information that the state of the rider is a state in which the rider is reading in the driver's seat and a response to a notice indicating that a driving mode is to change to a manual driving mode is received from the rider, the autonomous vehicle 100 may travel along the first path 2240 irrespective of a result obtained after comparing the first cost with the second cost. When the autonomous vehicle 100 travels along the first path 2240, the autonomous vehicle 100 may travel in the event area 2210 of the first path 2240 in a manual driving mode and may travel in areas other than the event area 2210 in an autonomous driving mode.

Figure 24:
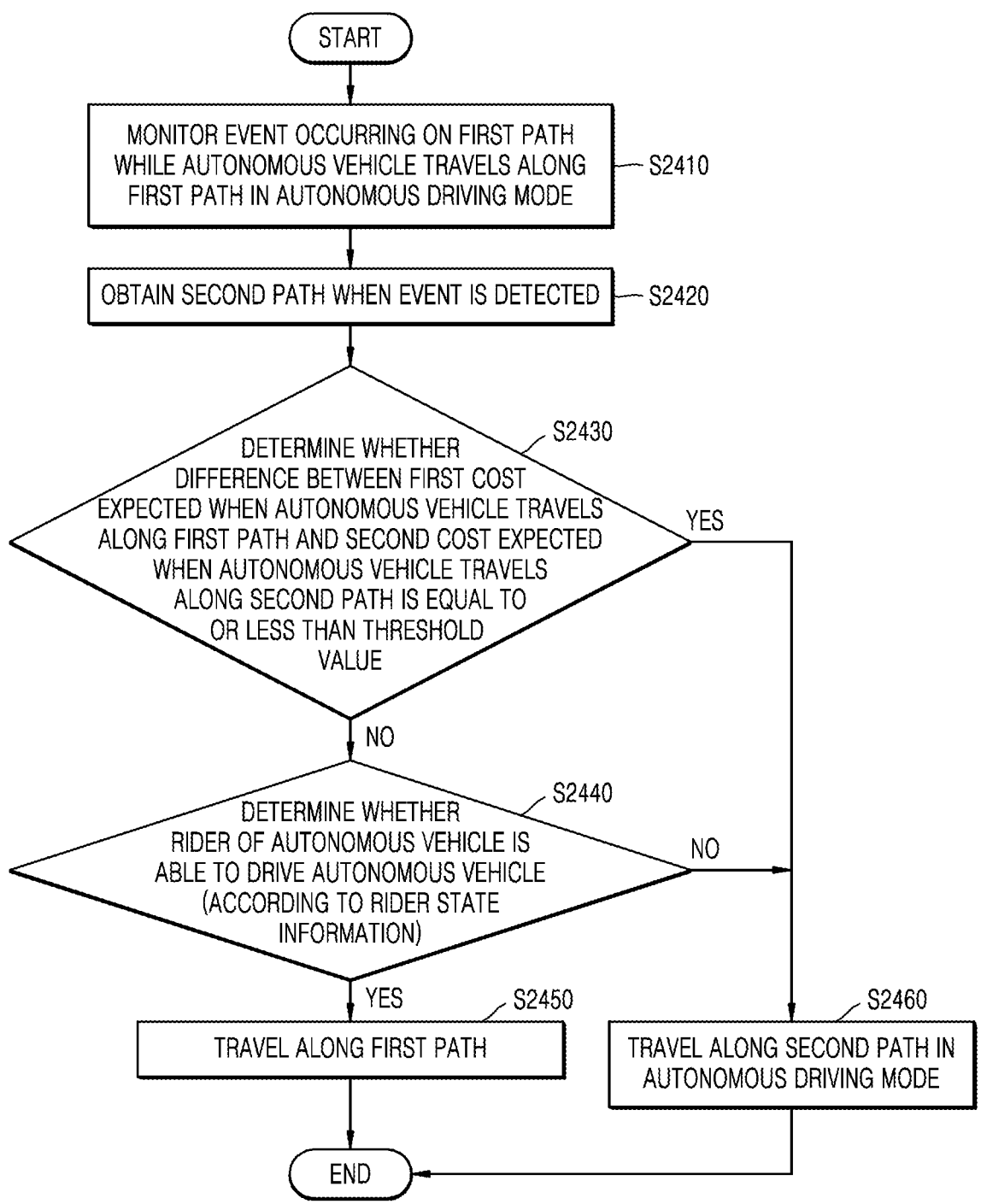
FIG. 24 is a flowchart for explaining a method in which when an event area on a first path is detected, the autonomous vehicle travels along the first path or a second path according to a state of a rider according to an embodiment.

FIG. 24 is a flowchart for explaining a method in which when an event area on a first path is detected, the autonomous vehicle 100 travels along the first path or a second path according to a state of a rider according to an embodiment.

Operations S2410 and S2420 respectively correspond to operations S1710 and S1720, and thus a detailed explanation thereof is omitted for brevity.

In operation S2430, the autonomous vehicle 100 determines whether a difference between a first cost expected when the autonomous vehicle 100 travels along a first path and a second cost expected when the autonomous vehicle 100 travels along a second path is equal to or less than a threshold value.

When the difference between the first cost expected when the autonomous vehicle 100 travels along the first path and the second cost expected when the autonomous vehicle 100 travels along the second path is greater than a threshold value, in operation S2440, the autonomous vehicle 100 determines whether a rider of the autonomous vehicle 100 is able to drive the autonomous vehicle 100. The autonomous vehicle 100 may obtain rider state information from the external device 1000 or the sensing device 230 and may determine whether the rider is able to drive the autonomous vehicle 100 according to the obtained rider state information.

In operation S2450, the autonomous vehicle 100 may determine the first path as a travel path when the difference between the first cost and the second cost is greater than the threshold value and the rider is able to drive the autonomous vehicle 100. The autonomous vehicle 100 may travel along the entire first path in a manual driving mode, or may travel in only some areas (e.g., an event area) of the first path in a manual driving mode.

In operation S2460, the autonomous vehicle 100 travels along the second path in an autonomous driving mode when the difference between the first cost and the second cost is equal to or less than the threshold value or the rider of the autonomous vehicle 100 is not able to drive the autonomous vehicle 100.

Figure 25:
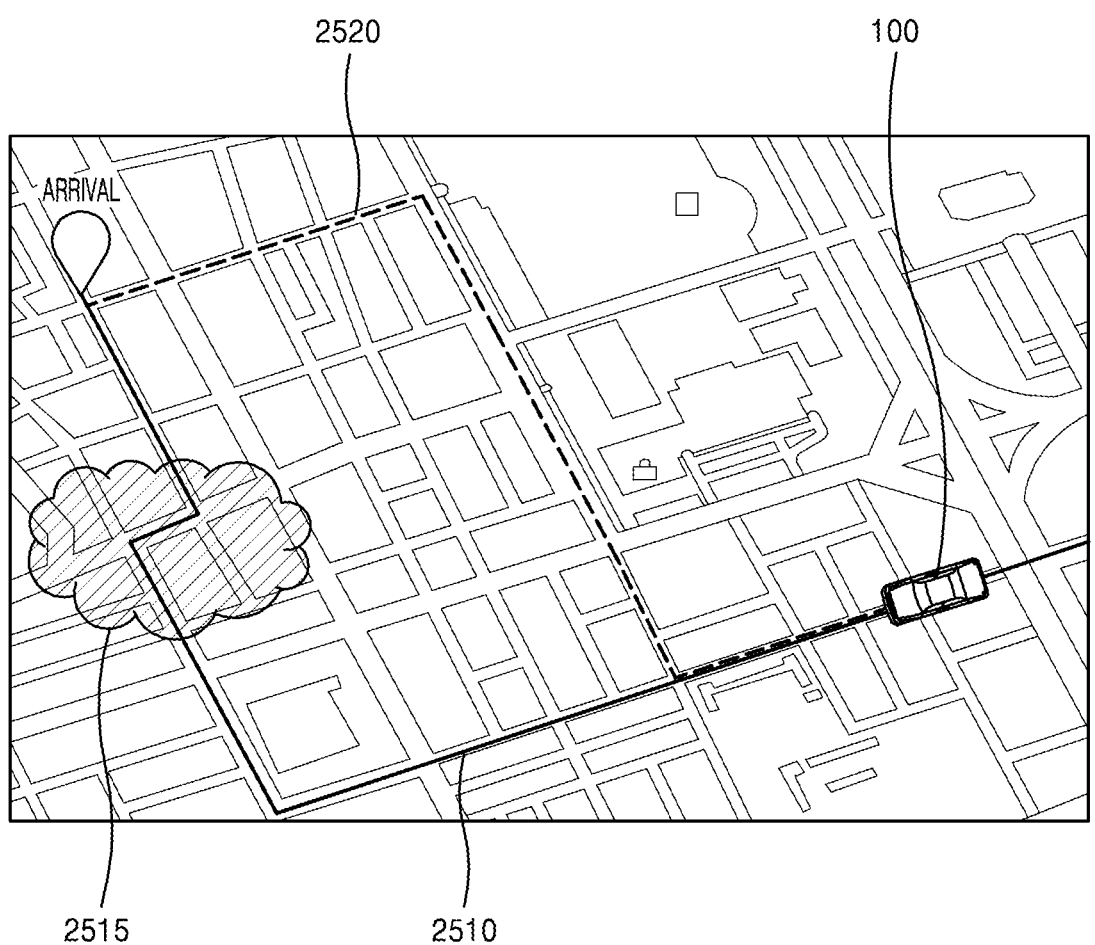
FIG. 25 is a view illustrating an example where the autonomous vehicle travels along a second path in an autonomous driving mode according to an embodiment.

FIG. 25 is a view illustrating an example where the autonomous vehicle 100 travels along a second path in an autonomous driving mode according to an embodiment.

A case where an event area 2515 is determined as an area in which the autonomous vehicle 100 has to travel in a manual driving mode will be explained.

The autonomous vehicle 100 may monitor a first path 2510 along which the autonomous vehicle 100 is currently travelling. When the event area 2515 on the first path 2510 is detected, the autonomous vehicle 100 may determine a second path 2520 via which the autonomous vehicle 100 detours around the event area 2515.

When a preset condition is satisfied, the autonomous vehicle 100 may travel along the second path 2520 in an autonomous driving mode. For example, when a difference between a first cost expected when the autonomous vehicle 100 travels along the first path 2510 and a second cost expected when the autonomous vehicle 100 travels along the second path 2520 is equal to or less than, or less than a threshold value, the autonomous vehicle 100 may travel along the second path 2520 in an autonomous driving mode. Alternatively, when the autonomous vehicle 100 determines whether manual driving by a rider is possible according to rider state information and it is determined that manual driving by the rider is impossible, the autonomous vehicle 100 may travel along the second path 2520 in an autonomous driving mode. Alternatively, when the autonomous vehicle 100 provides a notice indicating that a driving mode is to change to a manual driving mode to the rider in order to continuously travel along the first path 2510 and a response to the provided notice is not received, the autonomous vehicle 100 may travel along the second path 2520 in an autonomous driving mode. Alternatively, when an event detected on the first path 2510 is an event (e.g., a road blocking event) in which the autonomous vehicle 100 may not travel, the autonomous vehicle 100 may travel along the second path 2520 in an autonomous driving mode.

Figure 26:
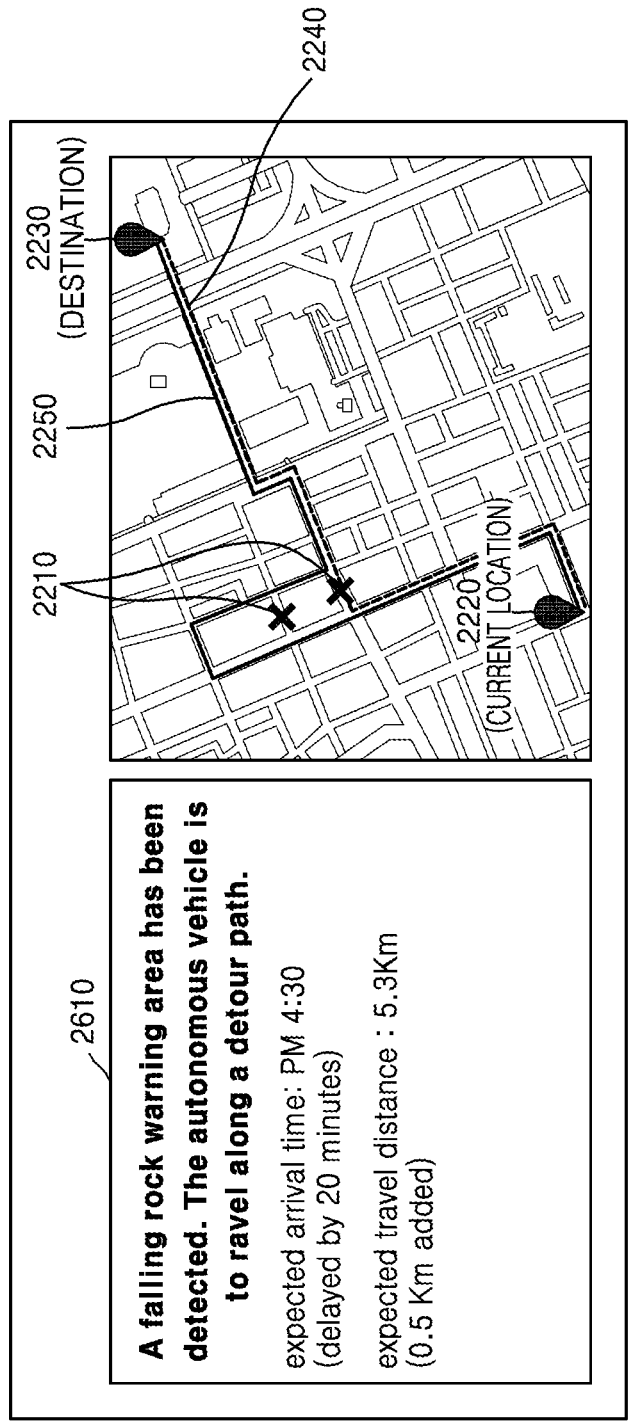
FIG. 26 is a view illustrating an example where when an event area on a first path is detected, the autonomous vehicle travels in an autonomous driving mode according to an embodiment.

FIG. 26 is a view illustrating an example where when an event area on a first path is detected, the autonomous vehicle 100 travels in an autonomous driving mode according to an embodiment.

When the event area 2210 on the first path 2240 is detected and a preset condition is satisfied, the autonomous vehicle 100 may not provide an additional notice to a rider and may travel along the second path 2250 via which the autonomous vehicle 100 detours around the event area 2210.

For example, when a difference between a travel time expected when the autonomous vehicle 100 travels along the first path 2240 and a travel time expected when the autonomous vehicle 100 travels along the second path 2250 is less than 30 minutes that is a threshold value, the autonomous vehicle 100 may travel along the second path 2250 in an autonomous driving mode without providing an additional notice to the rider. Alternatively, when the autonomous vehicle 100 recognizes that the rider is in the back seat from the sensing device 230, the autonomous vehicle 100 may travel along the second path 2250 in an autonomous driving mode without providing an additional notice to the rider. Alternatively, when the autonomous vehicle 100 may not actually travel along the first path 2240 (e.g., construction is underway), the autonomous vehicle 100 may travel along the second path 2250 without providing an additional notice to the rider.

When the autonomous vehicle 100 travels along the second path 2250 in an autonomous driving mode, the autonomous vehicle 100 may display on the display unit 281 a delay time and an added distance incurred as the autonomous vehicle 100 travels along the second path 2250.

Figure 27:
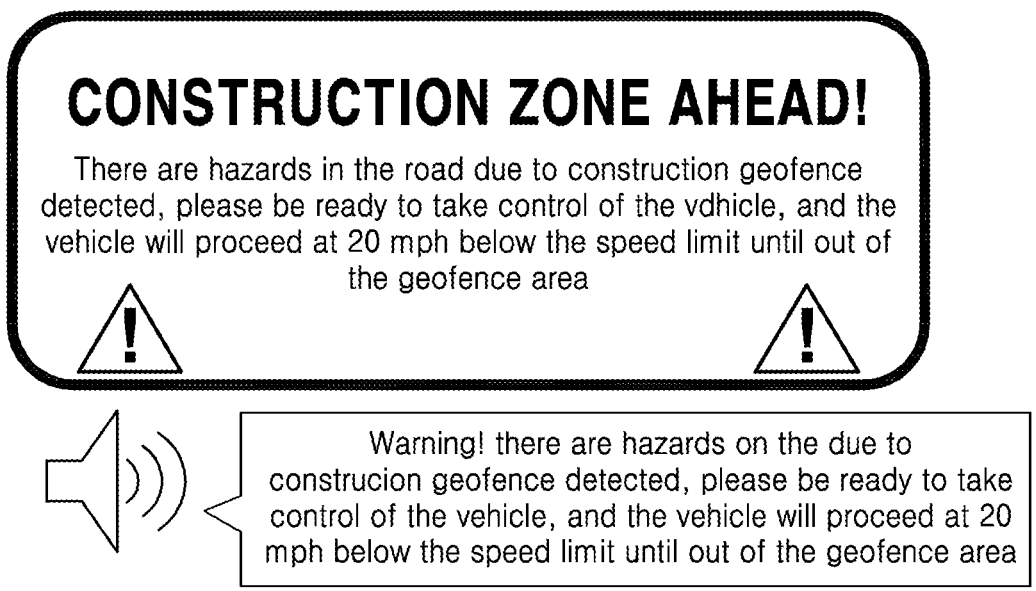
FIG. 27 is a view illustrating a notice provided by the autonomous vehicle to a rider when an event area on a first path along which the autonomous vehicle is currently driving is detected according to an embodiment.

FIG. 27 is a view illustrating a notice provided by the autonomous vehicle 100 to a rider when an event area on a first path along which the autonomous vehicle 100 is currently travelling is detected according to an embodiment.

When an event area on a first path is detected, the autonomous vehicle 100 may display a notice on the display unit 281. For example, when the autonomous vehicle 100 approaches a construction zone, the autonomous vehicle 100 may display a notice indicating that a driving mode may change to a manual driving mode. Alternatively, when the autonomous vehicle 100 approaches a school zone, the autonomous vehicle 100 may display a notice indicating that the autonomous vehicle 100 has to travel at a speed that is by a predetermined value less than a speed limit. Alternatively, when the autonomous vehicle 100 approaches an icy road warning area, the autonomous vehicle 100 may display a notice indicating that the autonomous vehicle 100 is to travel at a speed that is by a predetermined value less than a speed limit.

When an event area on the first path is detected, the autonomous vehicle 100 may output a notice by using the sound output unit 282. For example, when the autonomous vehicle 100 approaches a construction zone, the autonomous vehicle 100 may output as a sound a notice indicating that a driving mode may change to a manual driving mode, a notice indicating that the autonomous vehicle 100 has to travel in an autonomous driving mode at a speed that is by a predetermined value less than a speed limit, or a notice indicating that the autonomous vehicle 100 is to travel in an autonomous driving mode at a speed that is by a predetermined value less than a speed limit.

Figure 28:
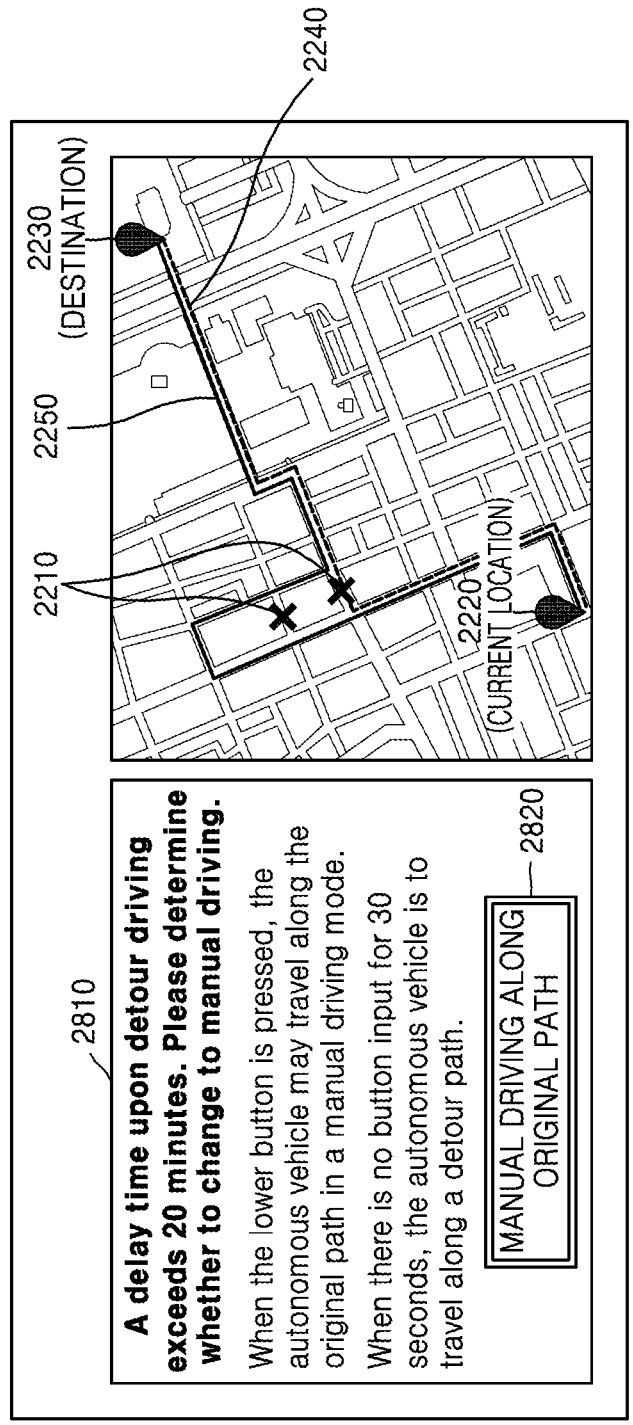
FIG. 28 is a view illustrating an example where when an event area on a first path is detected, the autonomous vehicle provides a notice to a rider and determines a travel path according to a user input received in response to the provided notice according to an embodiment.

FIG. 28 is a view illustrating an example where when an event area on a first path is detected, the autonomous vehicle 100 provides a notice to a rider and determines a travel path according to a user input received in response to the provided notice according to an embodiment.

A case where the event area 2210 is determined as an area in which the autonomous vehicle 100 has to travel in a manual driving mode will be explained.

When a difference between a first cost expected when the autonomous vehicle 100 travels along the first path 2240 and a second cost expected when the autonomous vehicle 100 travels along the second path 2250 is greater than a threshold value and the second cost is greater than the first cost, the autonomous vehicle 100 may provide a notice 2810 for receiving a permission to change a driving mode to a manual driving mode to the rider as the autonomous vehicle 100 travels along the first path 2240.

When a user input that permits the autonomous vehicle 100 is to travel along the first path 2240 in a manual driving mode is received (e.g., an input that touches a specific portion 2820 of the display unit 281 is received), the autonomous vehicle 100 may travel along the first path 2240. For example, the autonomous vehicle 100 may travel in an event area of the first path in a manual driving mode and may travel in areas other than the event area in an autonomous driving mode.

When a user input that permits the autonomous vehicle 100 to travel along the first path 2240 in a manual driving mode is not received (e.g., an input that touches the specific portion 2820 of the display unit 281 is not received for 30 seconds), the autonomous vehicle 100 may travel along the second path 2250 in an autonomous driving mode.

Figure 29:
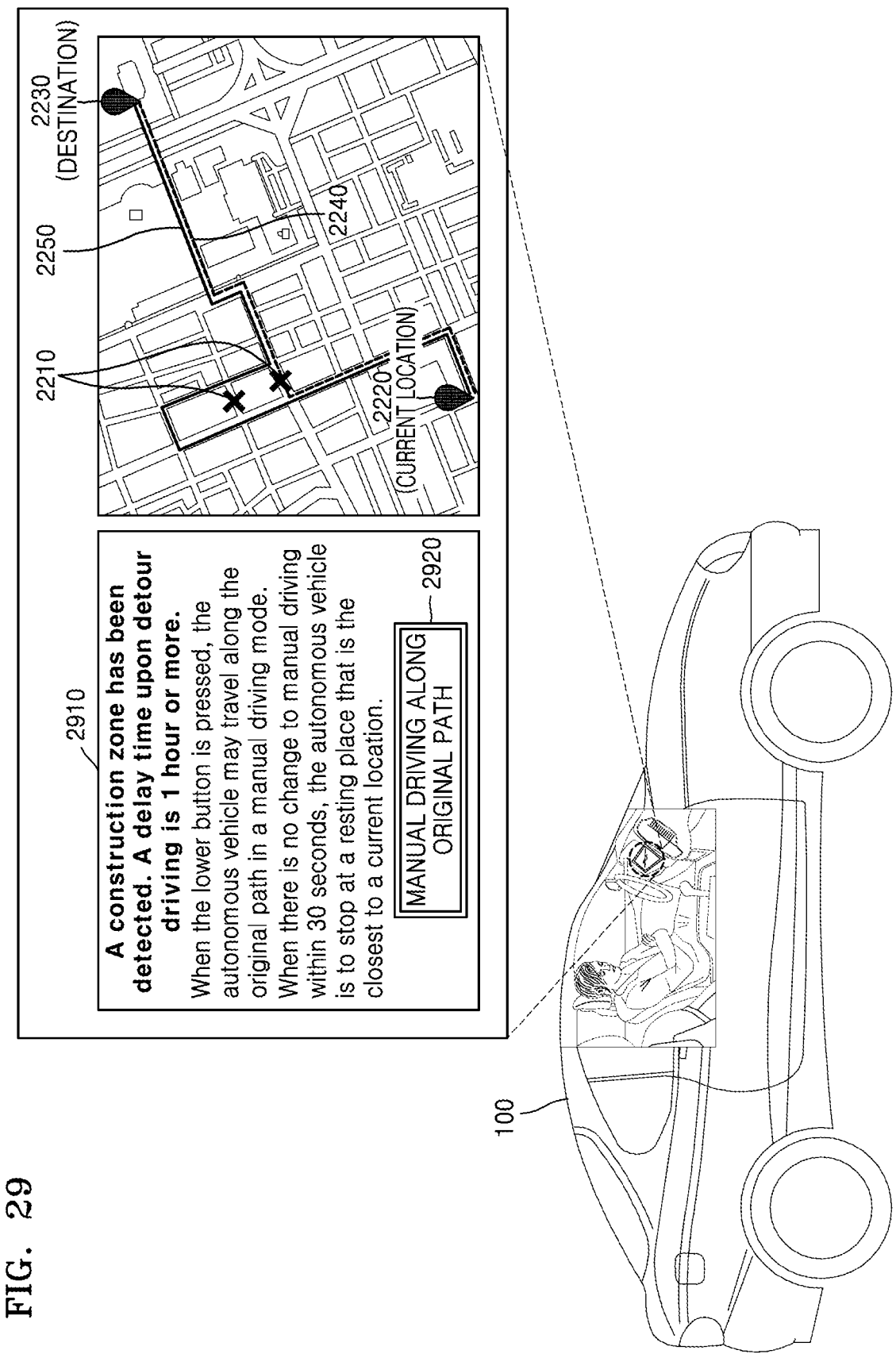
FIG. 29 is a view illustrating an example where when an event area on a first path is detected, the autonomous vehicle provides a notice to a rider and stops according to a user input received in response to the provided notice according to an embodiment.

FIG. 29 is a view illustrating an example where when an event area on a first path is detected, the autonomous vehicle 100 provides a notice to a rider and stops according to a user input received in response to the provided notice according to an embodiment.

For a method in which the autonomous vehicle 100 provides a notice 2910 to a rider and a case where a user input that permits the autonomous vehicle 100 to travel along the first path 2240 in a manual driving mode is received, the description of FIG. 28 may be referred to.

When a user input that permits the autonomous vehicle 100 to travel along the first path 2240 in a manual driving mode is not received (e.g., an input that touches a specific portion 2920 of the display unit 281 is not received for 30 seconds), the autonomous vehicle 100 may stop according to a preset method. For example, the autonomous vehicle 100 may stop at an area where the autonomous vehicle 100 may stop, for example, a side road or a resting place that is the closest to a current location.

When a user input is not received, whether the autonomous vehicle 100 travels along the second path 2250 in an autonomous driving mode or stops according to a predetermined method may be previously determined based on a user input.

Figure 30:
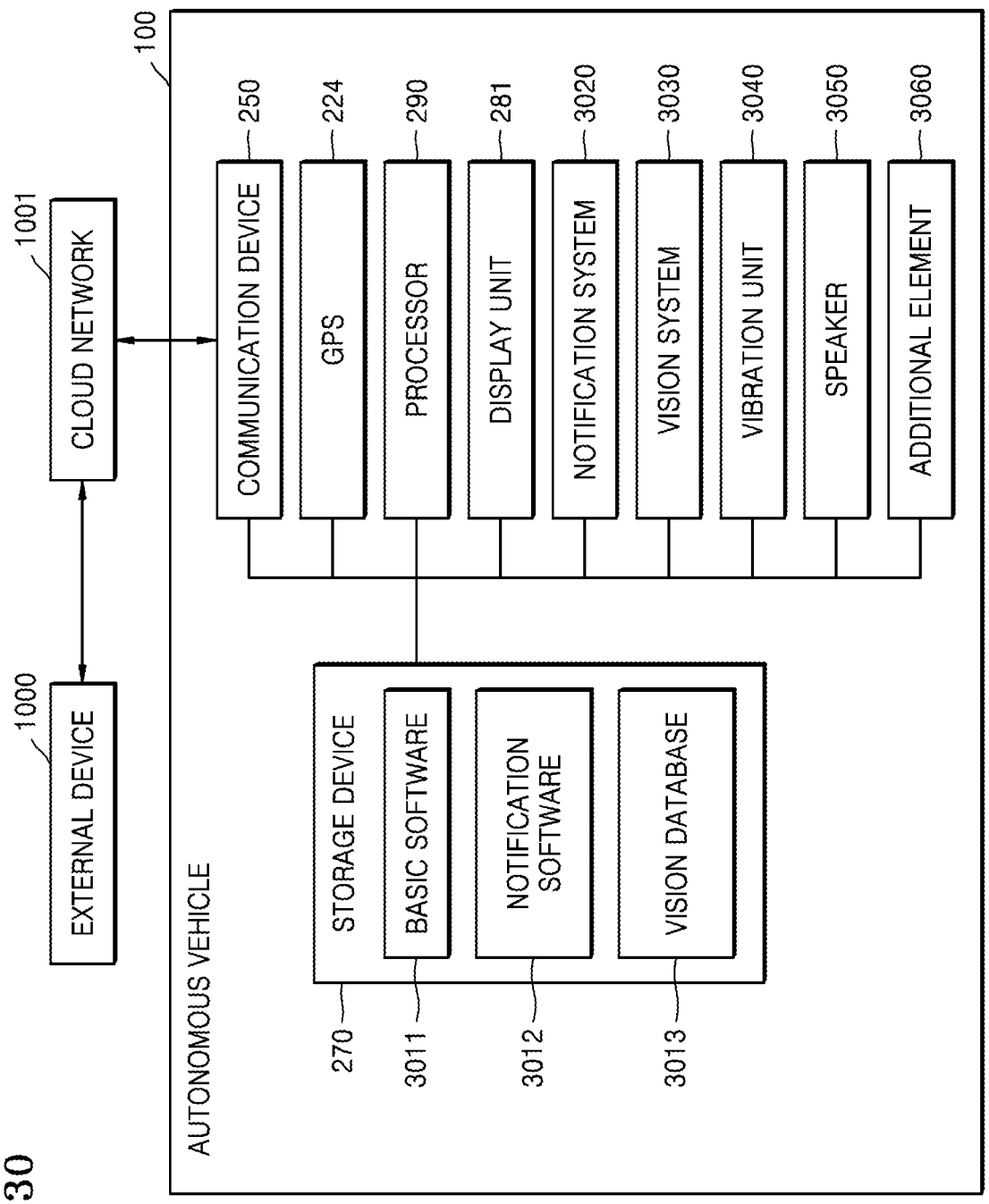
FIG. 30 is a block diagram illustrating a configuration of the autonomous vehicle that communicates with the external device according to an embodiment.

FIG. 30 is a block diagram illustrating a configuration of the autonomous vehicle 100 that communicates with the external device 1000 according to an embodiment.

The autonomous vehicle 100 may include the storage device 270, the communication device 250, the GPS 224, the processor 290, the display unit 281, a notification system 3020, a vision system 3030, a vibration unit 3040, a speaker 3050, and an additional element 3060. However, it will be understood by one of ordinary skill in the art that general-purpose elements other than the elements illustrated in FIG. 30 may be further included in the autonomous vehicle 100 or some elements from among the elements illustrated in FIG. 30 may not be included in the autonomous vehicle 100.

Also, the storage device 270 may include basic software 3011, notification software 3012, and a vision database 3013.

The basic software 3011 may include a command for performing a basic operation of the autonomous vehicle 100. The basic software 3011 may include an operating system (OS). The notification software 3012 may include a command needed to operate the notification system 3020. The vision database 3013 may include information used in the vision system 3030.

The notification system 3020 may obtain and process notice-related information received from a cloud network 1001 or may obtain and process notice-related information from the vision system 3030. For example, when an event occurs, the notification system 3020 may transmit a command to display a notice on the display unit 281 to the processor 290. The notification system 3020 may operate according to an algorithm of the notification software 3012. The vision system 3030 may include a system for processing an image obtained from the image sensor 228. For example, the vision system 3030 may recognize a type of the image obtained from the image sensor 228 and may determine meaning of the obtained image. For example, the vision system 3030 may determine an image having a type that is the most similar to the image obtained from the image sensor 228, from among a plurality of images stored in the vision database 3013, and may determine meaning of the obtained image by using information corresponding to the determined image.

The vibration unit 3040 may provide a vibration output. For example, the vibration unit 3040 may provide a notice as a vibration to a rider according to a request received from the notification system 3020.

The speaker 3050 may provide a sound output. For example, the speaker 3050 may provide a notice as a sound to the rider according to a request received from the notification system 3020. The speaker 3050 may be included in the sound output unit 282.

The additional element 3060 may include any additional element other than the above elements.

The autonomous vehicle 100 may communicate with the cloud network 1001 through the communication device 250. Also, the autonomous vehicle 100 may communicate with the external device 1000 through the cloud network 1001.

Figure 31:
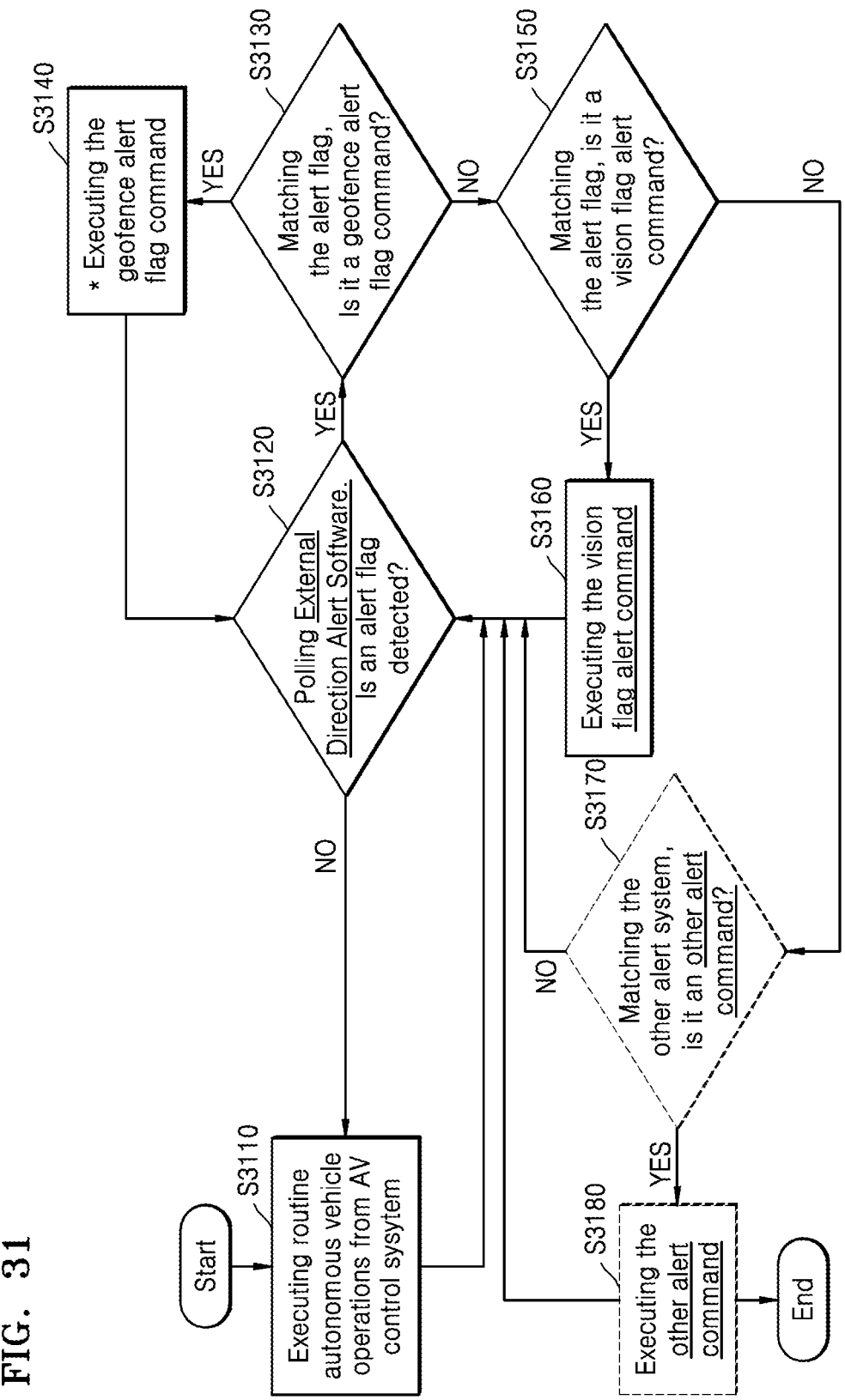
FIG. 31 is a flowchart for explaining a method in which when an event area on a first path is detected, the autonomous vehicle travels along the first path or a second path according to a state of a rider according to an embodiment.

FIG. 31 is a flowchart for explaining a method in which when an event area on a first path is detected, the autonomous vehicle 100 travels along the first path or a second path according to a state of a rider according to an embodiment.

In operation S3110, the autonomous vehicle 100 executes routine autonomous vehicle operations.

In operation S3120, the autonomous vehicle 100 polls the notification software 3012 in order to determine whether an alert flag is detected. The alert flag may indicate whether an event is detected. For example, the alert flag may be 1 when an event is detected, and may be 0 when an event is not detected. Alternatively, the alert flag may be one of 0000 through 1023 according to a type of a detected event.

When the alert flag is not detected, the method may return to operation S3110.

When the alert flag is detected, in operation S3130, the autonomous vehicle 100 determines whether the detected alert flag is matched to a preset value. For example, the autonomous vehicle 100 may determine whether the alert flag is included in a range of 0000 through 0511. Alternatively, the autonomous vehicle 100 may determine whether the detected event is a preset event by using the detected alert flag.

When the detected alert flag is matched to the preset value, in operation S3140, the autonomous vehicle 100 may execute a command corresponding to the detected alert flag. Also, the method may return to operation S3120.

In operation S3150, the autonomous vehicle 100 may determine whether the alert flag is related to a vision alert. The autonomous vehicle 100 may determine whether the detected alert flag is matched to a vision alert flag.

When it is determined that the alert flag is related to the vision alert, in operation S3160, the autonomous vehicle 100 may execute a command corresponding to the vision alert. Also, the method may return to operation S3120.

When it is determined that the alert flag is not related to the vision alert, in operation S3170, the autonomous vehicle 100 may determine whether the alert flag is related to an alert other than the vision alert.

When it is determined that the alert flag is related to an alert other than the vision alert, in operation S3180, the autonomous vehicle 100 may execute a command corresponding to the alert related to the alert flag.

Figure 32:
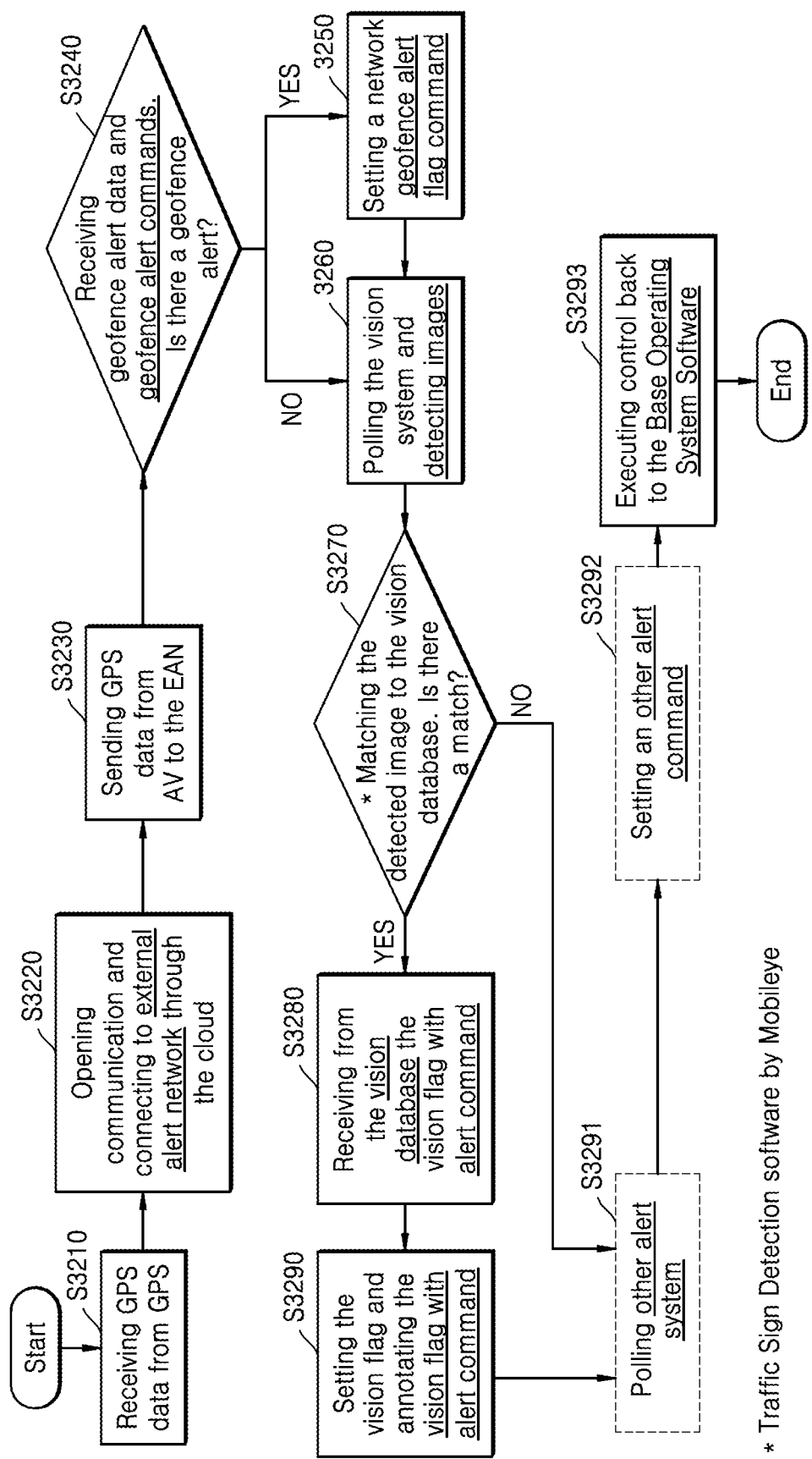
FIG. 32 is a flowchart for explaining a method in which when an event area on a first path is detected, the autonomous vehicle travels along the first path or a second path according to a state of a rider according to an embodiment.

FIG. 32 is a flowchart for explaining a method in which when an event area on a first path is detected, the autonomous vehicle 100 travels along the first path or a second path according to a state of a rider according to an embodiment.

In operation S3210, the autonomous vehicle 100 receives GPS data from the GPS 224.

In operation S3220, the autonomous vehicle 100 starts to communicate with an external alert network located outside the autonomous vehicle 100 through a cloud network.

In operation S3230, the autonomous vehicle 100 transmits the GPS data to the external alert network.

In operation S3240, the autonomous vehicle 100 determines whether to provide an alert by using the received GPS data and event zone information. For example, the autonomous vehicle 100 may determine that an alert has to be provided when a current location determined according to the received GPS data is within an event zone.

When it is determined that an alert has to be provided, in operation S3250, the autonomous vehicle 100 sets an alert flag. A value of the alert flag may be determined according to which event zone corresponds to the current location of the autonomous vehicle 100.

In operation S3260, the autonomous vehicle 100 detects an image by polling a vision system. For example, when the current location of the autonomous vehicle 100 corresponds to the event zone, the autonomous vehicle 100 may obtain an image by using the image sensor 228 by operating the vision system.

In operation S3270, the autonomous vehicle 100 determines whether the detected image is matched to the vision database 3013. For example, the autonomous vehicle 100 may match the image obtained by using the image sensor 228 to one image from among a plurality of images stored in the vision database 3013. Alternatively, the autonomous vehicle 100 may determine whether one image from among the plurality of images stored in the vision database 3013 is matched to the image obtained by using the image sensor 228.

When one image from among the plurality of images stored in the vision database 3013 is matched to the image obtained by using the image sensor 228, in operation S3280, the autonomous vehicle 100 receives a vision flag related to an alert command from the vision database 3013.

The vision flag may indicate a type of the obtained image. For example, the vision flag may be determined as one value from among 0000 through 1023 according to a type of the obtained image.

The alert command may refer to a command determined according to a type of the matched image. For example, when the matched image is an image of a road sign indicating a falling rock warning area, a command for controlling the autonomous vehicle 100 to travel according to the falling rock warning area may be the alert command.

In operation S3290, the autonomous vehicle 100 may set a vision flag related to the alert command.

In operation S3291, the autonomous vehicle 100 may poll a system other than the vision system.

In operation S3292, the autonomous vehicle 100 may set an alert command according to the system other than the vision system.

In operation S3293, the autonomous vehicle 100 may transmit all of the set alert commands to the basic software 3011 and may operate under the control of the basic software 3011.

Another embodiment related to controlling of the autonomous vehicle 100 will be further explained with reference to FIGS. 2 and 3. According to an embodiment, the autonomous vehicle 100 may set a path leading to a destination and may travel along the path in an autonomous driving mode. When an event area is detected through the interface 252 while the autonomous vehicle 100 is travelling, the processor 290 may determine whether to change to a manual driving mode or to continuously travel in an autonomous driving mode by searching for another path, according to driving mode setting information stored in the storage device 270.

The driving mode setting information may include information indicating how to determine a driving mode of the autonomous vehicle 100 when an event area is detected. For example, the driving mode setting information may include at least one of a mode in which an autonomous driving mode is preferentially performed, a mode in which an autonomous driving mode is continuously performed with conditions, and a mode in which a manual driving mode is preferentially performed. Other modifications or other setting information may be included in the driving mode setting information. The driving mode setting information may be previously set or may be set/changed by a user.

A case where an event area is an area in which autonomous driving is impossible or an area in which it is necessary to change to a manual driving mode will now be explained in more detail.

In the mode in which an autonomous driving mode is preferentially performed, the autonomous vehicle 100 is set to be guided to continuously autonomously travel to a destination. When the driving mode setting information is set to the mode and the interface 252 detects an event area, the processor 290 may search for a detour path along which the autonomous vehicle 100 may travel in an autonomous driving mode by using the navigation system 241. Next, the processor 290 may control the autonomous vehicle 100 to continuously autonomously travel along the detour path. The detour path may include an area via which the autonomous vehicle 100 detours around the event area of the entire path and meets the original path. According to an embodiment, however, the detour path may detour around the event area and may be connected to the original path at the destination of the original path.

The mode in which an autonomous driving mode is continuously performed with conditions may include a path-based driving mode and a rider-based driving mode.

When the driving mode setting information is set to the path-based driving mode and an event area is found, the processor 290 may search for a detour path along which the autonomous vehicle 100 may travel in an autonomous driving mode by using the navigation system 241. If a cost incurred when the autonomous vehicle 100 travels along the detour path is greater than a threshold value (e.g., a travel time or a travel distance is increased), the processor 290 may change a driving mode to a manual driving mode in the event area. However, when the cost of the detour path is equal to or less than the threshold value, the processor 290 may control the autonomous vehicle 100 to continuously autonomously travel along the detour path.

When the driving mode setting information is set to the rider-based driving mode and an event area is found, the processor 290 may check rider state information and may determine whether to search for a detour path. When it is determined by using the rider state information that manual driving is possible, the processor 290 may change the autonomous vehicle 100 to a manual driving mode in the event area without searching for the detour path. However, when it is determined that manual driving by the rider is difficult, the processor 290 may search for the detour path along which the autonomous vehicle 100 may travel in an autonomous driving mode by using the navigation system 241 and may control the autonomous vehicle 100 to continuously autonomously travel along the detour path.

When the driving mode setting information is set to the mode in which a manual driving mode is preferentially performed, the processor 290 may change the autonomous vehicle 100 to a manual driving mode in an event area.

According to an embodiment, the interface 252 may further include driving mode information according to a vehicle type in the event area. The driving mode information according to the vehicle type may include vehicle type information about a vehicle type that may travel in an autonomous driving mode in the event area. For example, the interface 252 may detect the event area and may detect information indicating that a truck may travel in an autonomous driving mode and other vehicles may travel in a manual driving mode in the event area. The driving mode information according to the vehicle type may be received through wireless communication from infrastructure or may be obtained when the communication device 250 obtains content displayed on a road sign and analyzes the content. When the event area and the driving mode information according to the vehicle type are obtained, the processor 290 may compare a vehicle type of the autonomous vehicle 100 with the driving mode information according to the vehicle type and may determine whether the autonomous vehicle 100 is to travel in the event area in an autonomous driving mode or a manual driving mode.

If the vehicle type of the autonomous vehicle 100 is a type that has to travel in the event area in a manual driving mode, the processor 290 may control the autonomous vehicle 100 to perform operations in association with other embodiments, for example, to search for a detour path.

The device according to the above embodiments may comprise a processor, a memory for storing and executing program data, a permanent storage such as a disk drive, a communication port for communicating with external devices, and a user interface device such as a touch panel, keys, or buttons. Any methods may be implemented as software modules or algorithms, and may be stored as program instructions or computer-readable codes executable by a processor on a computer-readable recording medium. Examples of the computer-readable recording medium include storage media such as magnetic storage media (e.g., read-only memories (ROMs), random-access memories (RAMs), floppy discs, or hard discs), optically readable media (e.g., compact disk-read only memories (CD-ROMs) or digital versatile discs (DVDs)), etc. The computer-readable recording medium may also be distributed over network coupled computer systems so that the computer-readable code is stored and executed in a distributed fashion. This medium may be read by the computer, stored in the memory, and executed by the processor.

The present embodiment may be described in terms of functional block components and various processing steps. Such functional blocks may be realized by any number of hardware and/or software components configured to perform specified functions. For example, the embodiment may employ various integrated circuit components, e.g., memory elements, processing elements, logic elements, look-up tables, and the like, which may carry out a variety of functions under the control of one or more microprocessors or other control devices. Similarly, where the elements of the present embodiment are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that are executed on one or more processors. Furthermore, the present embodiment could employ any number of conventional techniques for electronics configuration, signal processing and/or control, data processing, and the like. The words "mechanism", "element", "means", and "configuration" are used broadly and are not limited to mechanical or physical embodiments, but may include software routines in conjunction with processors, etc.

The particular implementations shown and described in the present embodiment are illustrative examples of the invention and are not intended to otherwise limit the scope of the invention in any way. For the sake of brevity, conventional electronics, control systems, software development, and other functional aspects of the systems may not be described in detail. Furthermore, connecting lines, or connectors shown in the various figures presented are intended to represent exemplary functional relationships and/or physical or logical couplings between various elements. It should be noted that many alternative or additional functional relationships, physical connections, or logical connections may be present in a practical device.

The use of the terms "a" and "an" and "the" and similar referents in the context of describing the invention (especially in the context of the following claims) is to be construed to cover both the singular and the plural. Furthermore, recitation of a range of values herein is merely intended to serve as a shorthand method of referring individually to each separate value falling within the range, unless otherwise indicated herein, and each separate value is incorporated into the specification as if it were individually recited herein. Finally, the steps of all methods described herein may be performed in any suitable order unless otherwise indicated herein or otherwise clearly contradicted by context. The use of any and all examples, or exemplary language (e.g., "such as") provided herein, is intended merely to better illuminate the inventive concept and does not pose a limitation on the scope of the invention unless otherwise claimed. It will be understood by one of ordinary skill in the art that numerous modifications, adaptations, and changes will be made according to design conditions and factors without departing from the spirit and scope of the appended claims.

What is claimed is:

1. An autonomous vehicle comprising:
   an interface configured to monitor an event occurring on a first path while the autonomous vehicle travels along the first path in an autonomous driving mode; and
   a processor configured to obtain a second path when the event is detected, and determine whether to travel along the second path in the autonomous driving mode by comparing a first cost expected when the autonomous vehicle travels along the first path with a second cost expected when the autonomous vehicle travels along the second path,
   wherein when a difference between the first cost and the second cost is greater than a threshold value, the processor determines that the autonomous vehicle is to travel, in a manual driving mode, in an event area in which the event is detected.

2. The autonomous vehicle of claim 1, wherein the processor is configured to determine that, when the difference between the first cost and the second cost is equal to or less than the threshold value, the autonomous vehicle is to travel along the second path in the autonomous driving mode.

3. The autonomous vehicle of claim 1, wherein when the difference between the first cost and the second is greater than the threshold value, the processor provides a notice indicating that the autonomous driving mode is to be stopped, and when a response to the notice is received, the processor determines that the autonomous vehicle is to travel, in the manual driving mode, in the event area in which the event is detected.

4. The autonomous vehicle of claim 3, wherein when the response to the notice is not received, the processor controls the autonomous vehicle that is travelling to stop.

5. The autonomous vehicle of claim 3, wherein when the response to the notice is not received, the processor determines that the autonomous vehicle is to travel along the second path in the autonomous driving mode.

6. The autonomous vehicle of claim 1, wherein when the difference between the first cost and the second cost is greater than the threshold value, the processor controls the autonomous vehicle that is travelling to stop.

7. The autonomous vehicle of claim 1, wherein the event indicates that the event area in which the autonomous vehicle is determined to travel in the manual driving mode is on the first path.

8. The autonomous vehicle of claim 1, wherein the interface monitors the event by using a road sign on the first path obtained by a camera included in the autonomous vehicle.

9. The autonomous vehicle of claim 1, wherein the interface monitors the event by using travel environment information about the first path received from an external device.

10. The autonomous vehicle of claim 1, wherein the processor obtains the second path that is one of a plurality of detour paths according to priorities of the plurality of detour paths that replace the first path.

11. The autonomous vehicle of claim 1, wherein when the difference between the first cost comprising a first travel time or a first travel distance expected when the autonomous vehicle travels along the first path and the second cost comprising a second travel time or a second travel distance expected when the autonomous vehicle travels along the second path is equal to or less than the threshold value, the processor determines that the autonomous vehicle is to travel along the second path in the autonomous driving mode.

12. The autonomous vehicle of claim 1, wherein when the difference between the first cost and the second cost is equal to or less than the threshold value and a travel distance expected when the autonomous vehicle travels along the second path is less than a drivable distance, the processor determines that the autonomous vehicle is to travel along the second path in the autonomous driving mode.

13. The autonomous vehicle of claim 1, wherein the processor obtains schedule information of a rider of the autonomous vehicle, and when the difference between the first cost and the second cost is equal to or less than the threshold value and an arrival time expected when the autonomous vehicle travels along the second path is before a time of the schedule information, determines that the autonomous vehicle is to travel along the second path in the autonomous driving mode.

14. The autonomous vehicle of claim 1, wherein the processor obtains rider state information indicating whether a rider of the autonomous vehicle is able to drive the autonomous vehicle, and determines whether to travel along the second path in the autonomous driving mode by further considering the rider state information.

15. A method of controlling an autonomous vehicle, the method comprising:
monitoring an event occurring on a first path while the autonomous vehicle travels along the first path in an autonomous driving mode;
obtaining a second path when the event is detected; and
determining whether to travel along the second path in the autonomous driving mode by comparing a first cost expected when the autonomous vehicle travels along the first path with a second cost expected when the autonomous vehicle travels along the second path,
wherein the determining whether to travel along the second path in the autonomous driving mode comprises, when a difference between the first cost and the second cost is greater than a threshold value, determining that the autonomous vehicle is to travel, in a manual driving mode, in an event area in which the event is detected.

16. The method of claim 15, wherein the determining whether to travel along the second path in the autonomous driving mode comprises, when the difference between the first cost and the second cost is equal to or less than the threshold value, determining that the autonomous vehicle is to travel along the second path in the autonomous driving mode.

17. A non-transitory computer-readable recording medium having embodied thereon a program for executing the method of any of claim 15.

* * * * *